United States Patent

Ikegami et al.

[11] Patent Number: 5,217,087
[45] Date of Patent: Jun. 8, 1993

[54] TWO-WHEELED VEHICLE CONTROL APPARATUS

[75] Inventors: Masahiko Ikegami, Tokyo; Kaoru Hatanaka, Niiza, both of Japan

[73] Assignee: Honda Giken Kogyo Kabushiki Kaisha, Tokyo, Japan

[21] Appl. No.: 743,975

[22] Filed: Aug. 12, 1991

[30] Foreign Application Priority Data

Aug. 12, 1990 [JP] Japan .................. 2-215327

[51] Int. Cl.⁵ .................. B62K 11/00; B62J 6/00
[52] U.S. Cl. .................. 180/219; 362/72; 364/424.05
[58] Field of Search .................. 180/219; 364/424.05, 364/426.02, 426.03; 307/9.1; 362/72

[56] References Cited

U.S. PATENT DOCUMENTS

| | | | |
|---|---|---|---|
| 4,024,388 | 5/1977 | Skoff | 362/72 |
| 4,868,720 | 9/1989 | Miyauchi et al. | 362/72 X |
| 4,870,545 | 9/1989 | Hatanaka et al. | 362/72 |
| 5,113,319 | 5/1992 | Sekiguchi et al. | 362/72 X |

FOREIGN PATENT DOCUMENTS 63-158701  7/1988  Japan .
1-101245   4/1989  Japan .
0229790    9/1989  Japan .................. 180/219

Primary Examiner—Robert J. Oberleitner
Assistant Examiner—Carla Mattix

[57] ABSTRACT

A two-wheeled vehicle control apparatus will compute banking angle and handlebar steering angle to control the vehicle. One feature of the vehicle which is controlled is light distribution from the headlight. A dynamic center value for the headlight will be utilized in this control unless the apparatus determines this value has a low level of accuracy. The control apparatus will store certain control values for a predetermined time after the vehicle is turned off. If the vehicle is traveling in excess of a predetermined velocity, the control apparatus will modify its control of the vehicle. Further, if the velocity is less than another predetermined level and the turning of the handlebar is below a certain level, the control apparatus will stop controlling the vehicle. For example, if the vehicle is traveling over a bumpy road, the control apparatus can recognize this and accordingly modify the control of the vehicle. Finally, the control apparatus can modify the handlebar steering angle used in controlling the vehicle, if an amount of change in the steering angle exceeds a given level.

6 Claims, 35 Drawing Sheets

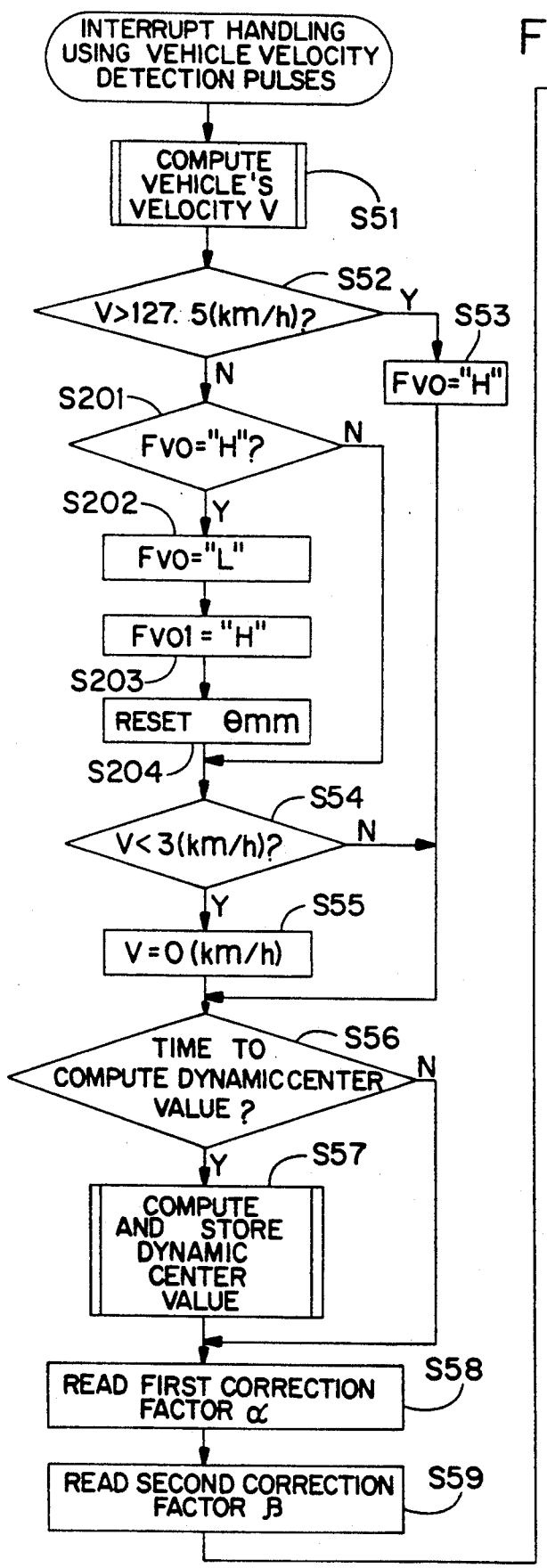
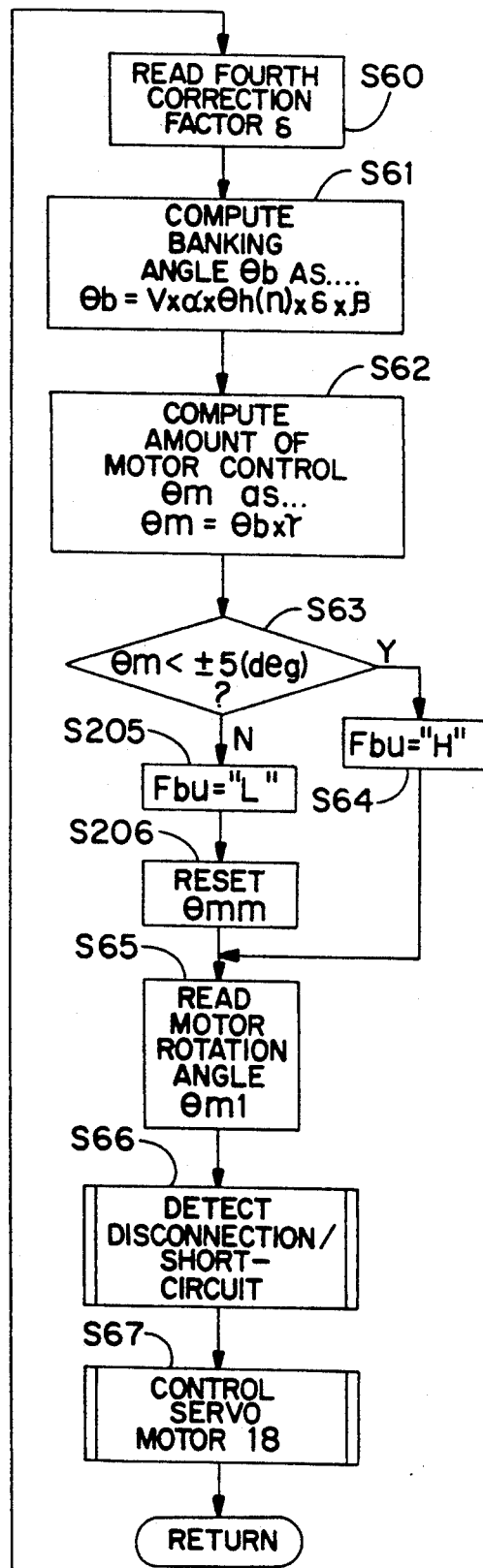
FIG. 9

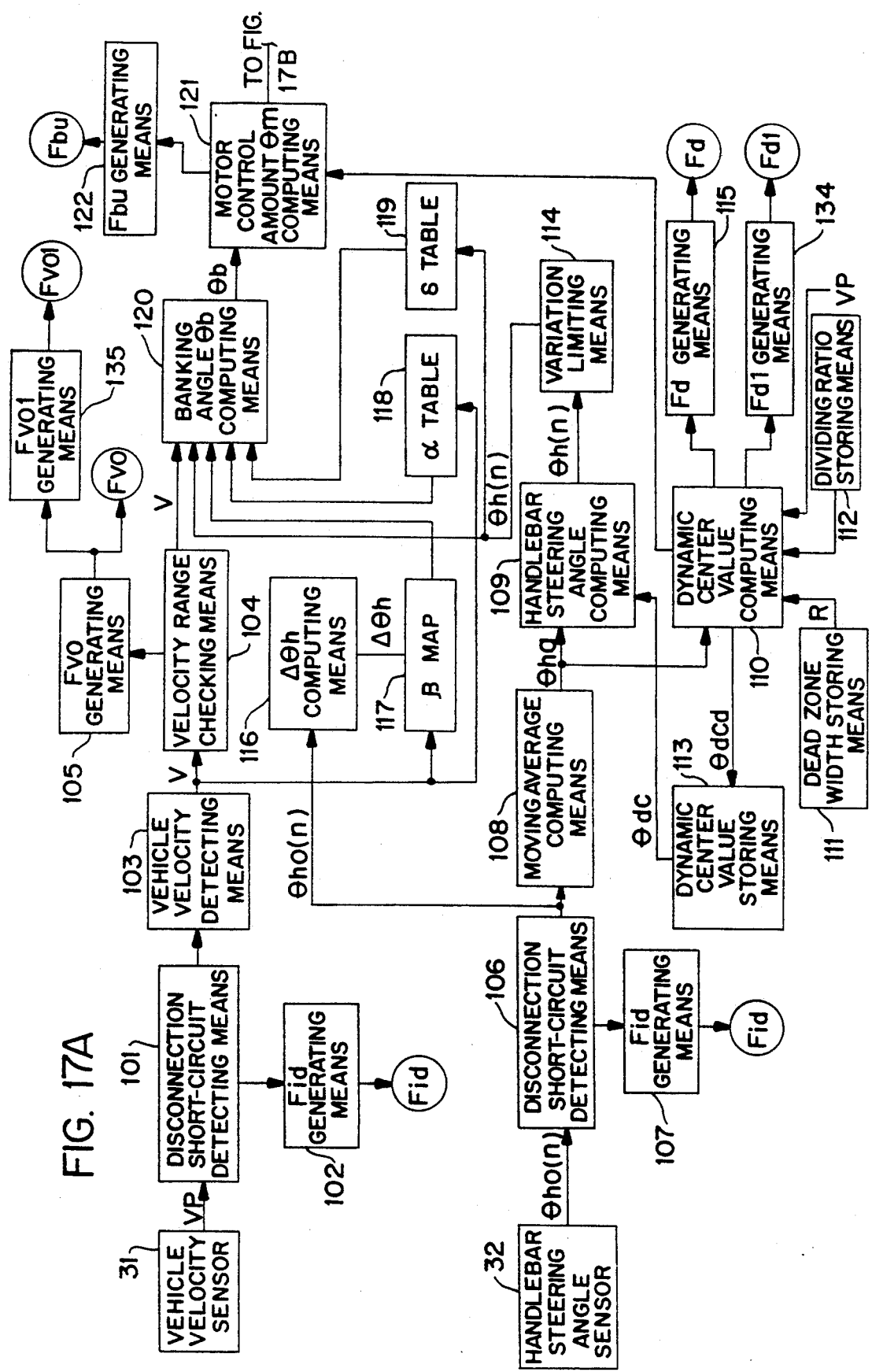

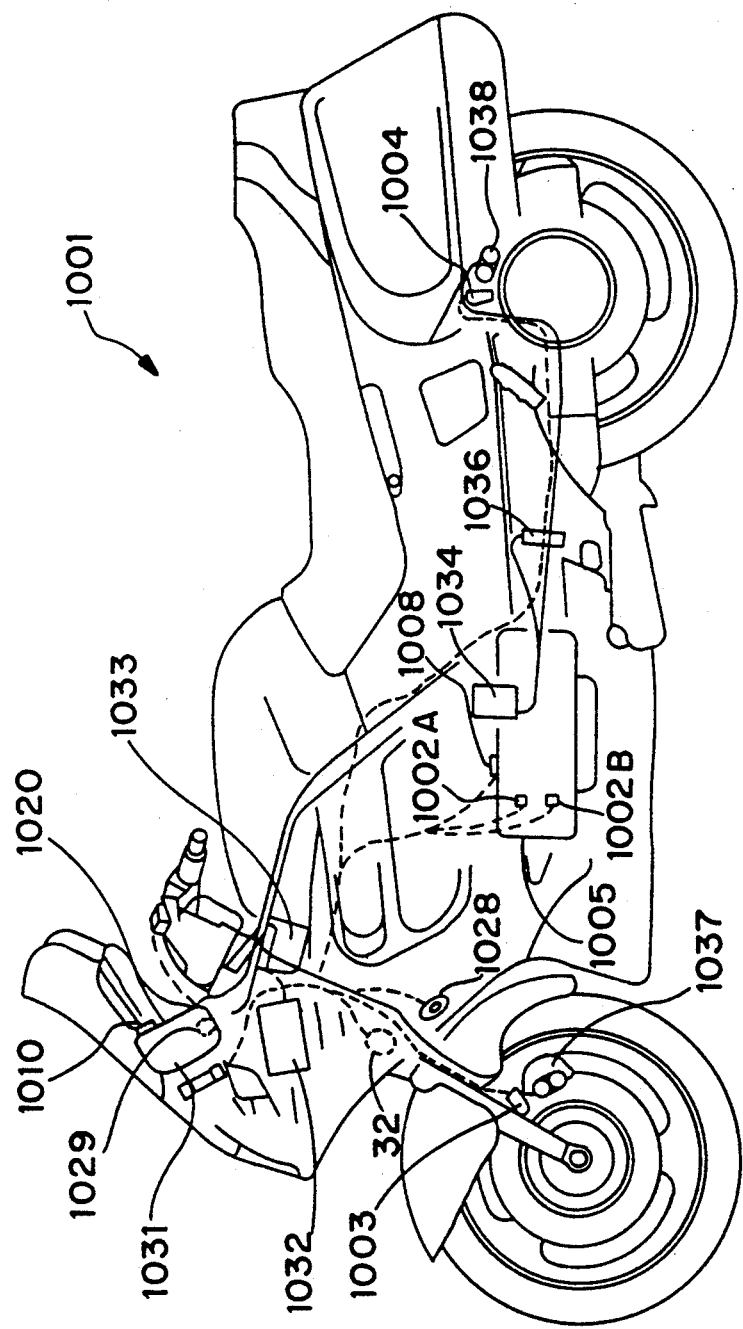

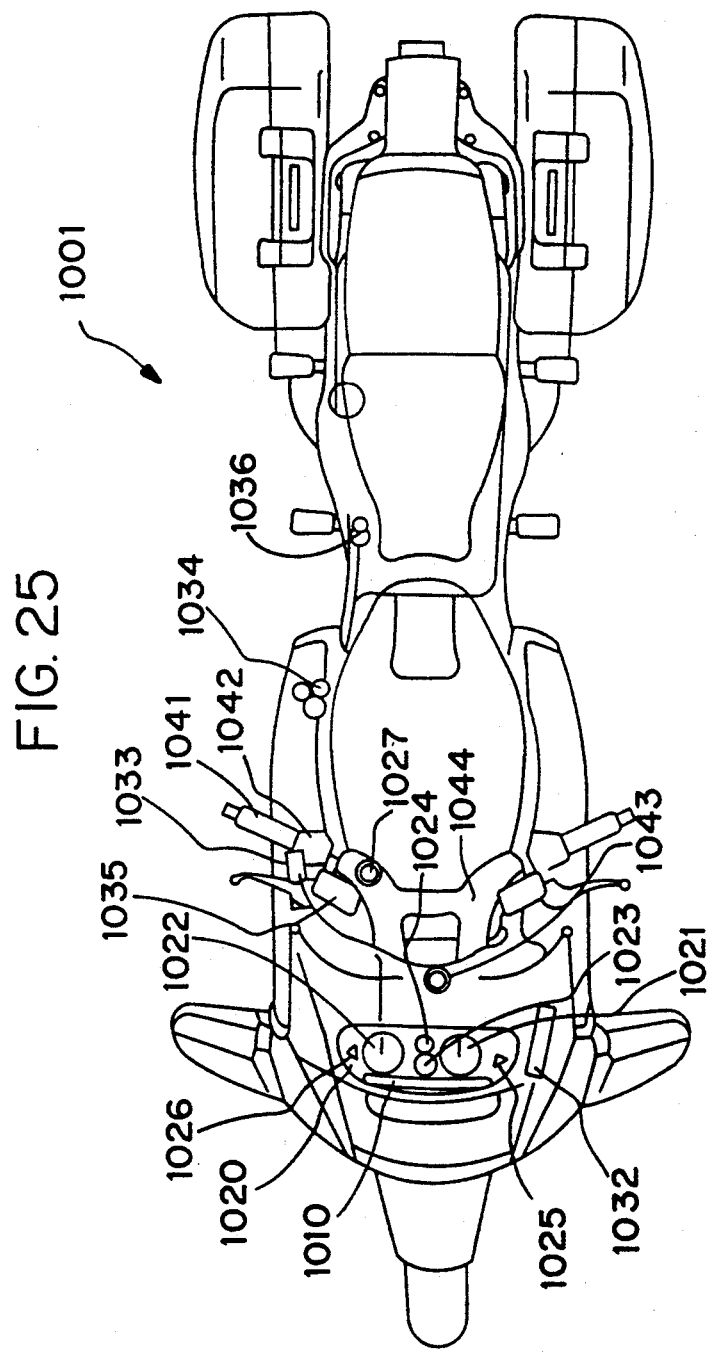

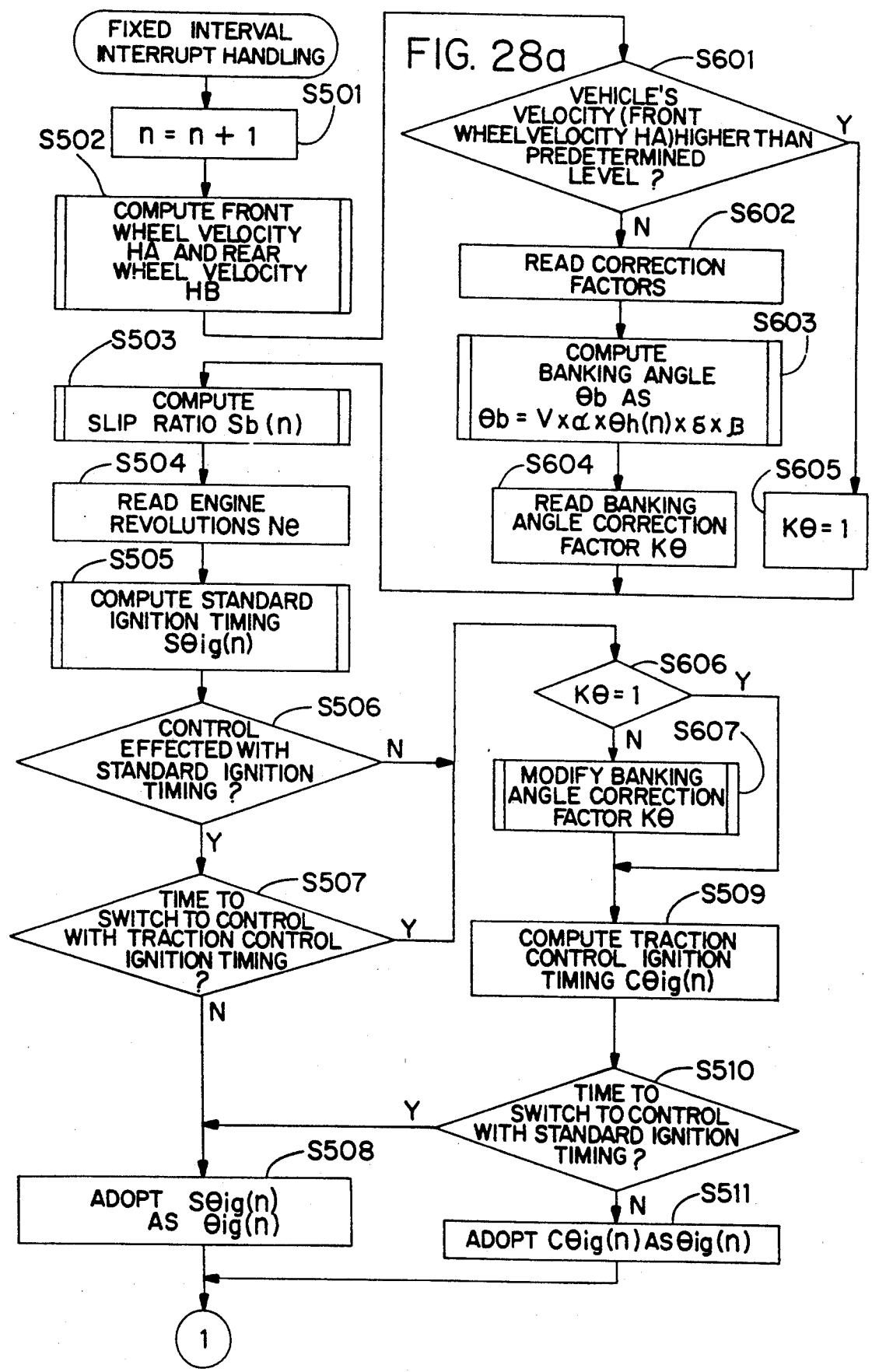

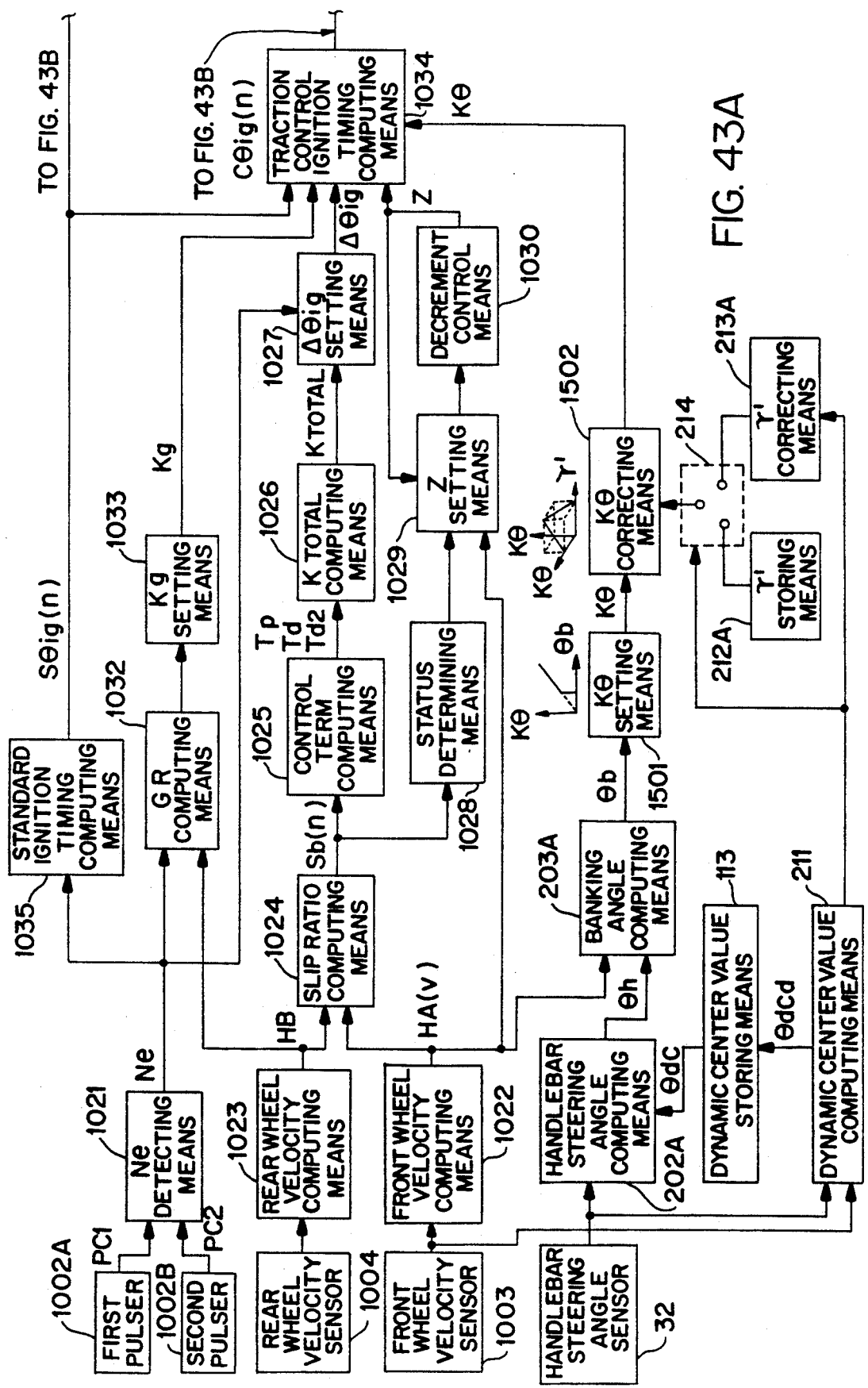

TWO-WHEELED VEHICLE CONTROL APPARATUS

BACKGROUND OF THE INVENTION

The present invention relates to a two-wheeled vehicle control apparatus and, more particularly, to a two-wheeled vehicle control apparatus which computes the banking angle of the vehicle according to the vehicle's velocity and handlebar steering angle and which controls the vehicle (in terms of light distribution control for the headlight device and in terms of traction control) in accordance with the computed banking angle.

DESCRIPTION OF THE BACKGROUND ART

The typical prior art headlight device for use with a two-wheeled motor vehicle is required to continuously deliver an appropriate light distribution pattern in front of the vehicle regardless of whether the vehicle is traveling straight or cornering. This requirement is conventionally met by prior art headlight devices with their light source partially covered with a shade mounted on their opening in front of their reflecting mirror. In operation, the shade partially hides the light source so as to project an appropriate light distribution pattern in front of the vehicle. One such device is disclosed in Japanese Patent Laid-Open No. 63-158701.

To control the headlight device, the banking angle of the two-wheeled vehicle on which the device is mounted must be detected. The prior art device disclosed above uses gimbals, a gyroscope and other related features. One disadvantage is that the headlight control device used therewith is complicated. Moreover, this complicated construction leads to higher manufacturing costs.

To solve the problem, novel techniques are proposed in Japanese Patent Laid-Open No. 1-101245 for detecting the banking angle based on the traveling speed and handlebar steering angle of the two-wheeled vehicle.

Another problem is in traction control. Conventional devices prevent excessive slippage of the two-wheeled vehicle as it is starting on a slippery road or upon acceleration while traveling. In operation, the traction control apparatus detects the slip ratio of the vehicle from the revolutions of the driving or idle wheel of the vehicle. If the slip ratio is found to be greater than a predetermined value, the traction control apparatus adjusts the ignition timing, the amount of fuel injection, and/or the throttle valve opening so as to reduce the traction of the vehicle.

If the above traction control apparatus is supplemented by means for controlling the traction in accordance with the vehicle's velocity and handlebar steering angle, the apparatus will adequately prevent excessive slippage of the vehicle while the latter is executing a cornering run.

The handlebar steering angle sensor that detects the handlebar steering angle comprises a potentiometer mounted on the steering stem of the two-wheeled vehicle. One disadvantage of the conventional handlebar steering angle sensor is that even if the central position thereof is initially keyed to the central position of the handlebar (i.e., the handlebar angle with the vehicle traveling straight), the sensor can be dislodged due to aging and to the subsequent maintenance of steering components. When the central position of the handlebar steering angle sensor is deviated from the actual central position of the handlebar, the handlebar steering angle computed with the output signal from the sensor will become different from the actual handlebar steering angle.

The handlebar steering angle can be computed with a dynamic center value that represents through computation the central position of the handlebar steering angle sensor in effect while the vehicle is traveling. Where the output signal of the handlebar steering angle sensor remains unchanged over a relatively long distance traveled by the two-wheeled vehicle, the vehicle is judged to be traveling straight. In that case, the steering angle signal in effect during the straight run may be used to compute the dynamic center value.

When the handlebar steering angle is computed with the dynamic center value as described, the quality of certain types of control on the two-wheeled vehicle is not good depending on the status of the vehicle. More specifically, the quality of headlight distribution control and traction control is not good immediately after the vehicle has started running, when the vehicle has traveled only a short period of time, or when the combination switch of the two-wheeled vehicle is turned off for a short break and then turned on again.

One reason for the reduced quality of vehicle control is that immediately after the two-wheeled vehicle has started running or when the vehicle has traveled only a short period of time, the limited distance traveled restricts the frequency of collection of data by the control apparatus and the dynamic center value is correspondingly lowered in accuracy. In such cases, even with the handlebar steering angle computed and used for control, the rider often feels uncomfortable about the vehicle being controlled at lowered levels of accuracy.

Another reason for the reduced accuracy in vehicle control is that even after the dynamic center value has been accurately obtained, once the rider turns off the vehicle's combination switch for a short break, for example, the supply of power to a RAM or the like storing the dynamic center value is discontinued so that the value will be lost. When the rider resumes traveling on the vehicle after the break, the rider often feels uncomfortable about the level of quality in vehicle control being perceptively lowered from that before the break.

Another problem with the prior art devices such as those disclosed in Japanese Patent Laid-Open Nos. 63-158701 and 1-101245 is that they provide light distribution control on the headlight device but when the two-wheeled vehicle is traveling at a relatively high velocity and cornering is detected by the handlebar steering angle, the cornering radius can be too large for the resulting amount of shade control. This appreciably affects the headlight distribution pattern initially set for straight travel.

Another disadvantage regarding light distribution control occurs during high velocity travel. Then, the traction control apparatus is required to complete various control parameters (ignition timing, fuel injection, etc.) on short notice. When the apparatus doubles as an electronic controller for light distribution control, controlling the light distribution pattern may require the apparatus to delay computations on the other control parameters.

Yet another disadvantage is that the control apparatus of the two-wheeled vehicle may dissipate power in dealing with various control parameters that are not currently relevant during the vehicle's operation.

A further disadvantage is that when the two-wheeled vehicle is traveling on a bumpy road, the repeated, momentary and minute steering of the vehicle's handlebar may cause the control device to control the light distribution pattern accordingly even though the vehicle is traveling straight and the rider's field of vision hardly deviates from the front of the vehicle.

When the handlebar is operated abruptly during a ride over a bumpy road, upon a quick change of lanes, or upon a sudden entry into or exit from a cornering run, the change in handlebar steering angle is not the same as that in ordinary turns. Thus, ordinary control based on ordinary arc turns is not appropriate.

As described, the prior art techniques for light distribution control on the headlight device tend to deliver the intended control even when such control is hardly needed under the circumstances. As a result, light distribution control can become excessive.

The same disadvantages as outlined above also apply when the traction of the two-wheeled vehicle is controlled.

SUMMARY OF THE INVENTION

It is therefore an object of the present invention to overcome the above-described drawbacks and disadvantages of the prior art and to provide a two-wheeled vehicle control apparatus that will not make the rider of the vehicle uncomfortable in situations where the quality of the vehicle would have been reduced as in prior art devices.

It is also a second object of the present invention to provide a two-wheeled vehicle control apparatus which moderates or stops operation of the control parameters of the vehicle's headlight distribution and traction if such controls are liable to become excessive depending on the situation of the vehicle.

In achieving at least these and other objects of the present invention, a two-wheeled vehicle control apparatus is provided with certain controls such as headlight distribution control and banking angle-based traction control being inhibited until the dynamic center value thereof has been detected.

According to another aspect of the present invention, a two-wheeled vehicle control apparatus is provided which moderates those types of control which are based on the dynamic center value if that value is judged to have a low level of accuracy.

According to a further aspect of the present invention, a two-wheeled vehicle control apparatus is provided which checks for the opened state of the combination switch of the vehicle and, if that opened state is detected, supplies power for a predetermined period of time to at least the dynamic center value storing means. This aspect of the invention makes it possible to retain the dynamic center value that has been computed and stored if the combination switch is turned off within a predetermined period of time.

In further achieving these and other objects of the present invention, a two-wheeled vehicle control apparatus is provided which checks whether the vehicle is in excess of a predetermined velocity level, and if so, the apparatus stops controlling the vehicle in response to vehicle velocity and handlebar steering angle.

According to another aspect of the present invention, a two-wheeled control apparatus is provided which stops controlling the vehicle in accordance with the vehicle's velocity and handlebar steering angle if the amount of vehicle control computed from the vehicle's velocity and handlebar steering angle is below a predetermined level. Cases in which the amount of control is found to be lower than the predetermined level may include a straight run over a bumpy road and other runs that cause the repeated, momentary and minute steering of the handlebar even though the vehicle is traveling straight.

According to a further aspect of the present invention, a two-wheeled vehicle control apparatus is provided which computes the amount of change in handlebar steering angle and, if the amount of change is found to exceed a predetermined level, modifies the handlebar steering angle so that the amount of change reaches that predetermined level. The resulting handlebar steering angle and velocity of the vehicle are in turn used to control the latter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a flowchart showing how interrupt handling is performed upon interruption using vehicle velocity detection pulses;

FIGS. 17a and 17b are a functional block diagram of the headlight control apparatus of the first embodiment of the present invention, the diagram conceptually illustrating how the first embodiment works;

FIG. 24 is a side view of a two-wheeled motor vehicle to which the second embodiment of the present invention is applied;

FIG. 25 is a plan view depicting the details of the indicator panel 1010;

FIGS. 28a and 28b are a flowchart illustrating how the second embodiment works;

FIGS. 43a and 43b are a functional block diagram of the second embodiment of the present invention.

DETAILED DESCRIPTION OF THE PREFERRED EMBODIMENTS

Figure 2:
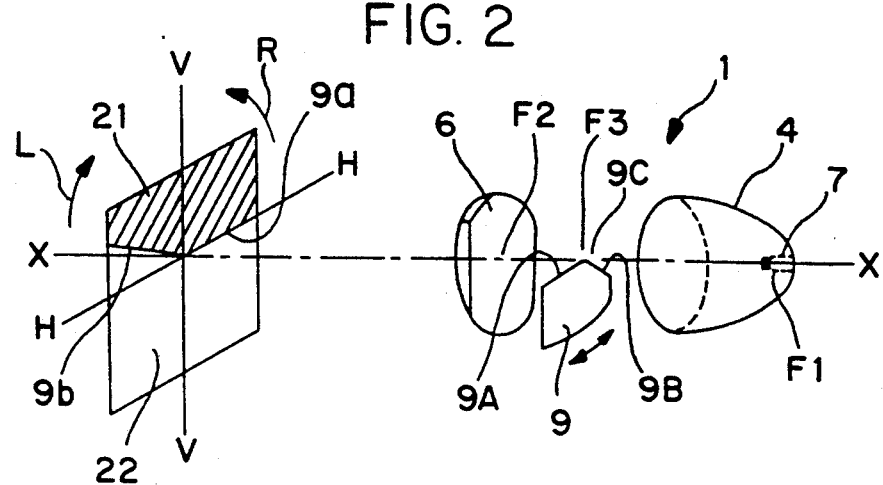
FIG. 2 is a schematic view of the typical headlight device to which the present invention may be applied.
Figure 3:
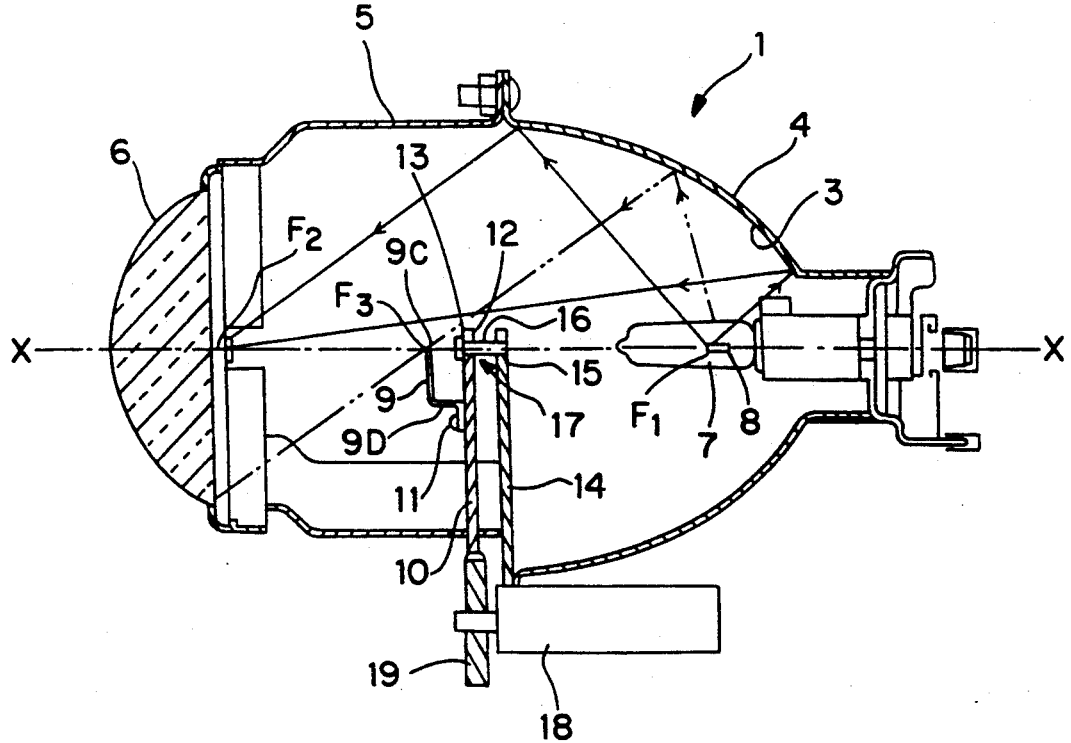
FIG. 3 is a cross-sectional view of the headlight device for use with the first embodiment.

Preferred embodiments of the present invention will now be described with reference to the accompanying drawings. The first embodiment concerns a two-wheeled vehicle headlight control apparatus. In FIG. 2, a schematic view of a headlight device using the first embodiment of the present invention is shown. FIG. 3 is a cross-sectional view of the headlight device of FIG. 2. In the two figures, like reference characters designate like or corresponding parts. In FIG. 2, lines H—H and V—V denote a horizontal and a vertical line, respectively. The illustrated headlight device is one for use when, under local traffic law, the two-wheeled vehicle travels on the left.

In FIGS. 2 and 3, a headlight device is incorporated in a lamp body, not shown, which in turn is mounted on the two-wheeled vehicle. A reflecting mirror 4 has a spheroidal reflecting surface 3. In front of the reflecting mirror 4 is a convex lens 6, with a connecting member 5 interposed therebetween. The optical axis of the reflecting mirror 4 coincides with that of the convex lens 6 (the optical axis is denoted by X). A bulb 7 has its filament 8 located at a first focal point F1 of an ellipse constituting the reflecting surface 3. A second focal point F2 of the ellipse is located, in this embodiment, on the plane of incidence of the convex lens 6.

The focal point F3 of the convex lens 6 has the central point 9C of the upper edge of a shade 9. The upper edge of the shade 9 extends crosswise relative to the direction of light irradiation. As viewed from the reflecting mirror 4 toward the convex lens 6, the upper left edge 9A of the shade 9 extends horizontally at the same height as the central point 9C. The upper right edge 9B of the shade 9 tilts downward from the central point 9C. The lower edge of the shade 9 is integrally equipped with an attachment 9D bent backward, i.e., toward the reflecting mirror 4. The attachment 9D is fixed with a screw 11 to a gear plate 10 in the rear.

The gear plate 10 is shaped like a fan large enough to cover the lower half of the cross-sectional area of the headlight device 1. At the center of the upper edge of the gear plate 10 and behind the central point 9C of the shade 9, a bearing hole 12 is located whose axis is the optical axis X.

Behind the gear plate 10, a strut 14 is located. This strut 14 has a lower edge fixedly attached to the lower edge of the opening of the reflecting mirror 4. The upper edge of the strut 14 is located behind a projection 13 of the gear plate 10. In this location, another bearing hole 15 is aligned with the bearing hole 12. A pivot shaft 16 penetrates the two bearing holes 12 and 15, forming a bearing section 17 that tiltably supports the gear plate 10 against the strut 14.

The gear plate 10 is engaged from below by a driving gear 19. The gear 19 is driven by a servo motor 18. Activating the servo motor 18 tilts the gear plate 10 around the axis of the bearing section 17, i.e., around the optical axis X. Correspondingly, the shade 9 is inclined around the optical axis X that passes through the central point 9C of its upper edge.

In the above construction, the light irradiated by the bulb 7 forms a light distribution pattern that comprises a dark region 21 and a bright region 22, as depicted in FIG. 2. Boundaries 9a and 9b that distinguish the dark region 21 from the bright region 22 are determined by the upper edges 9A and 9B of the shade 9.

Under basic control of the present invention, the servo motor 18 rotates the shade 9 so that the boundaries 9a and 9b are turned in a direction L of FIG. 2 when the two-wheeled vehicle performs a leftward cornering run. The servo motor 18 rotates the shade 9 so that the boundaries 9a and 9b are turned in a direction R when the vehicle executes a rightward cornering run.

The particular headlight device for use with the invention has been described above only for illustrative purposes. Other alternative headlight devices may also be used in conjunction with the present invention.

Figure 4:
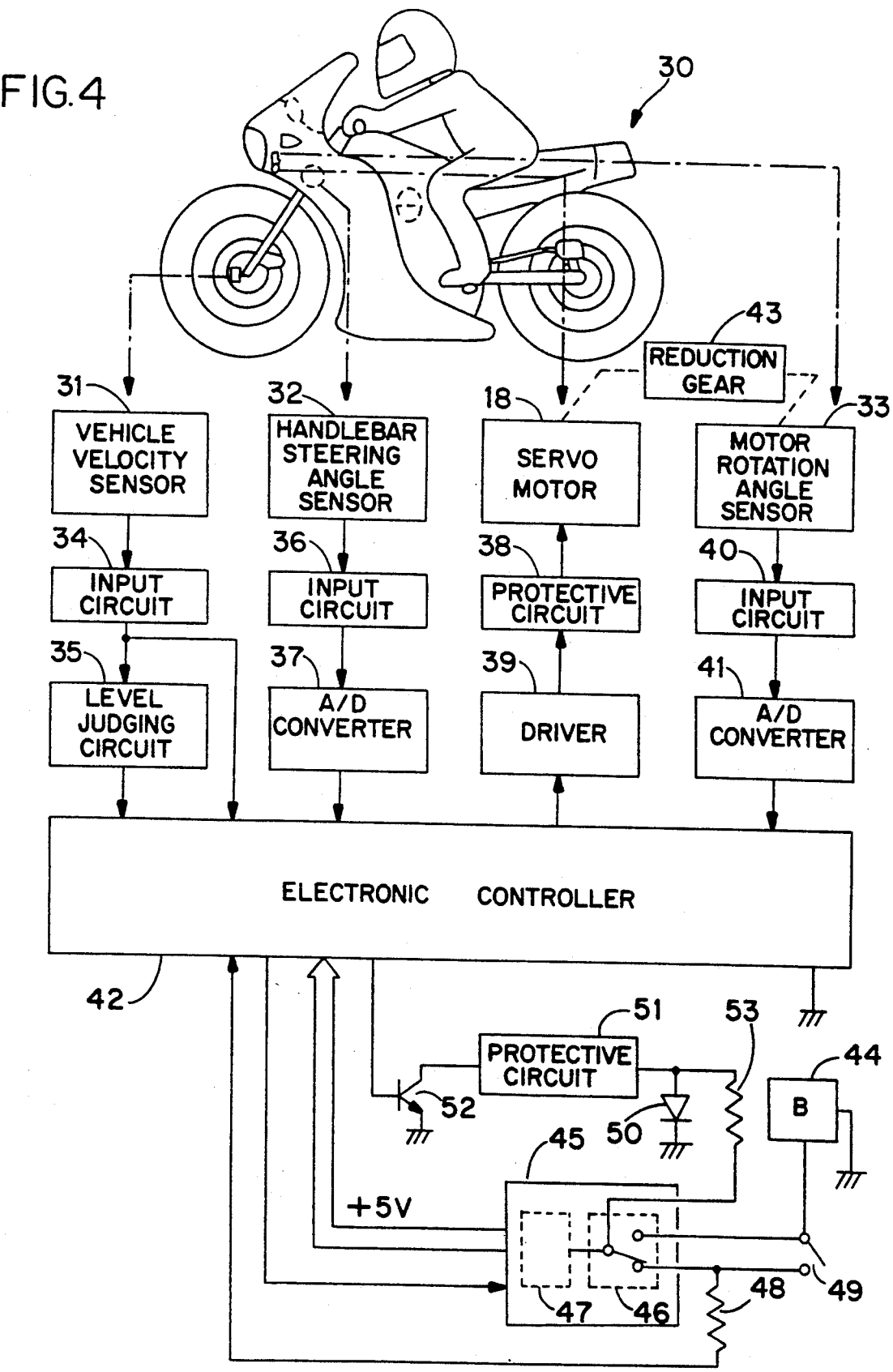
FIG. 4 is a block diagram of the first embodiment.

FIG. 4 is a block diagram of the first embodiment of the invention. In FIG. 4, a two-wheeled motor vehicle 30 comprises, in appropriate locations, a vehicle velocity sensor 31 that detects the vehicle's traveling velocity V (i.e., front wheel velocity); a handlebar steering angle sensor 32 that detects the steering angle of the handlebar; the servo motor 18 that rotates the shade 9; and a motor rotation angle sensor 33 that detects the rotation angle of the servo motor 18 (i.e., the rotation angle of the shade 9). In this embodiment, the motor rotation angle sensor 33 is attached to the servo motor 18 via a reduction gear 43 having a suitable reduction ratio.

An electronic controller 42 contains a microcomputer for headlight control. The controller 42 also controls, where required, other operational aspects of the vehicle such as ignition timing control and fuel injection control.

The vehicle velocity sensor 31 is connected to the electronic controller 42 via an input circuit 34 and a level judging circuit 35. The handlebar steering angle sensor 32 is connected to the electronic controller 42 via an input circuit 36 and an A/D converter 37.

The servo motor 18 is connected to the electronic controller 42 via a protective circuit 38 and a driver 39. The motor rotation angle sensor 33 is connected to the electronic controller 42 via an input circuit 40 and an A/D converter 41.

The input circuits 34, 36 and 40 protect the level judging circuit 35, the A/D converters 37 and 41, and the electronic controller 42 from the adverse effects of noise, surge voltages, static electricity and electromagnetic waves. Likewise, the protective circuit 38 protects the servo motor 18 from the above-mentioned adverse effects.

The vehicle velocity sensor 31 is illustratively a pulse generator that generates pulses (called vehicle velocity detection pulses VP) in accordance with front wheel revolutions. The handlebar steering angle sensor 32 and the motor rotation angle sensor 33 are each illustratively a potentiometer whose output voltage varies with the steering angle of the handlebar and with the rotation angle of the servo motor 18, respectively.

As will be described later in more detail, the level judging circuit 35 judges the voltage value of the vehicle velocity detection pulses VP that are output via the input circuit 34. If the voltage value is not found within a predetermined range of values, the level judging circuit 35 outputs a signal to that effect to the electronic controller 42. Upon receipt of that signal, the electronic controller 42 concludes that the vehicle velocity sensor 31 is disconnected or short-circuited, and then stops controlling the shade 9.

A power supply circuit 45 contains a switching circuit 46 and a constant voltage circuit 47. When a combination switch 49 is turned on, a battery 44 is connected to the constant voltage circuit 47. This supplies a constant voltage (e.g., +5 V) to the electronic controller 42.

The turning-on of the combination switch 49 is also detected by the electronic controller 42 by use of a line comprising a resistor 48. Turning off the combination switch 49 changes the state of the switching circuit 46. For a predetermined period of time (e.g., 3 hours) starting from that off-state, the battery 44 stays connected to the power supply circuit 45. This supply of battery power backs up the electronic controller 42.

While the battery 44 is being connected to the constant voltage circuit 47, the battery 44 is also connected to a resistor 53, an indicator lamp 50, a protective circuit 51 and a switching element 52, as illustrated. Normally, the switching element 52 remains on to keep the indicator lamp 50 turned off. When something abnormal occurs, the switching element 52 is turned off, which illuminates the indicator lamp 50.

Figure 17B:
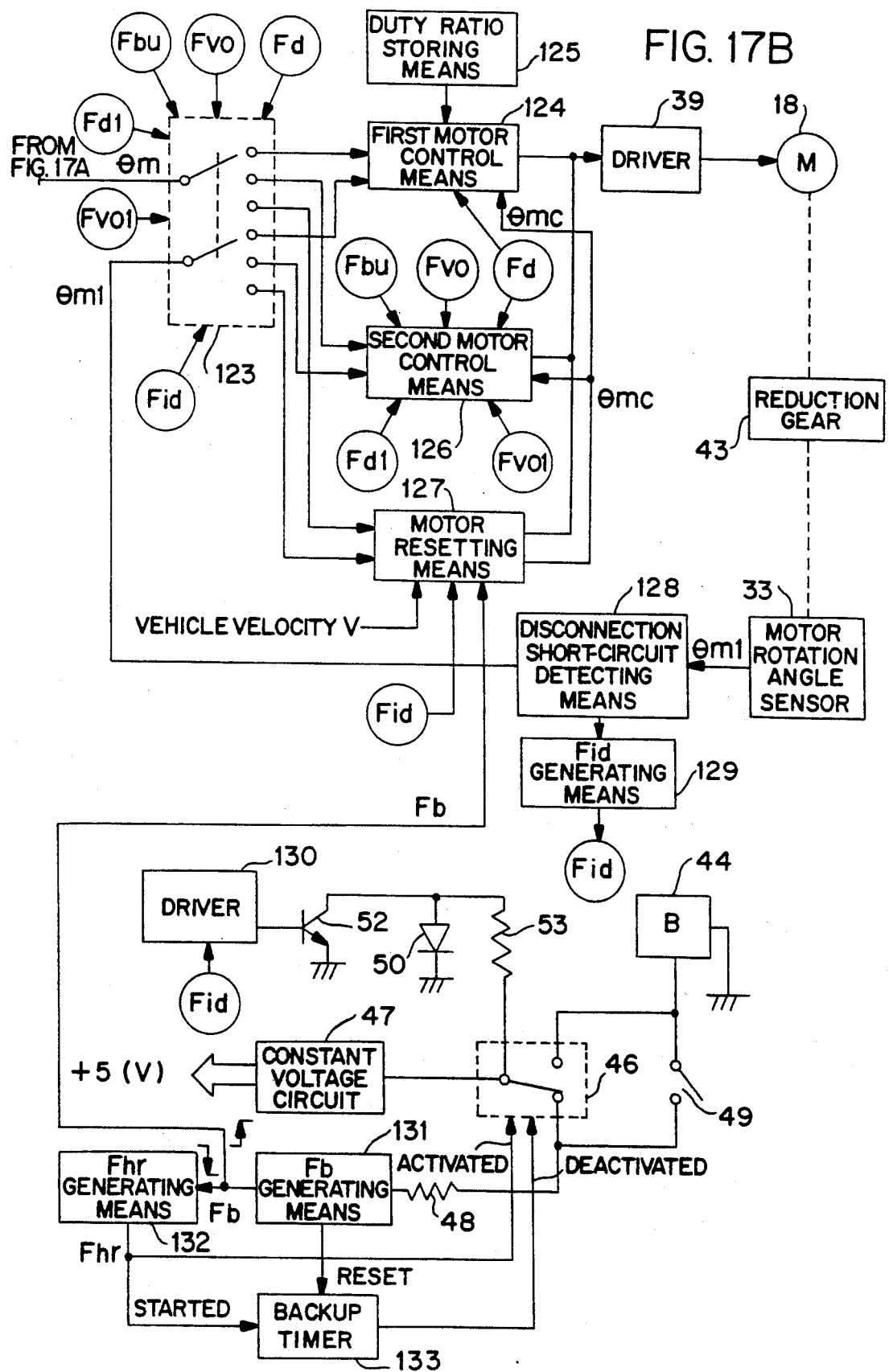

FIGS. 17a and 17b are a function block diagram of the first embodiment showing how it is constructed and how it operates on a two-wheeled vehicle. In both FIGS. 17a, 17b and FIG. 4, like reference characters are designated by like or corresponding parts.

In FIG. 17a, the vehicle velocity detection pulses VP that were output from the vehicle velocity sensor 31 are input to a disconnection/short-circuit detecting means 101. The means 101 detects the voltage value of the pulses VP. If the voltage value is found to be lower or higher than is expected, a short-circuit or a disconnection is recognized, respectively. In either case, a flag Fid is generated by an Fed generating means 102. The function of the disconnect/short-circuit detecting means 101 is achieved in conjunction with the level judging circuit 35 (FIG. 4).

A driver 130 normally keeps the switching element 52 on and the indicator lamp 50 off. When the flag Fid is generated, the driver 130 turns off the switching element 52 and illuminates the indicator lamp 50. The indicator lamp 50, when lit, indicates that a specific status has occurred on the vehicle.

The generation of the flag Fid actuates a switching means 123, to be described later. This in turn connects a motor resetting means 127 to the driver 39. In this setup, the headlight control apparatus stops controlling the shade 9 (i.e., control of the servo motor 18) according to the banking angle, and returns the shade 9 to its center position ($\theta$mc).

If neither disconnection nor short-circuit of the vehicle velocity sensor 31 is detected, a vehicle velocity detecting means 103 suitably detects the traveling velocity V of the two-wheeled motor vehicle. A velocity range checking means 104 outputs the velocity V to a banking angle computing means 120 if the velocity V falls within a range of $$3 \text{ (km/h)} \leq V \leq 127.5 \text{ (km/h)}.$$

If V<3 (km/h), then the velocity range checking means 104 considers the velocity V to be 0 (km/h) and outputs zero to the banking angle computing means 120.

If 127.5 (km/h)<V, then an Fvo generating means 105 is activated to generate a flag Fvo. The generation of the flag Fvo in turn activates the switching means 123, connecting a second motor control means 126 to the driver 39. While the two-wheeled motor vehicle is traveling at a high velocity, the cornering radius thereof is large and the shade 9 need not be controlled. In that case, the second motor control means 126 gradually returns the shade 9 to its center position.

A handlebar steering angle signal $\theta$ ho(n) output by the handlebar steering angle sensor 32 is input to the disconnection/short-circuit detecting means 106 at a predetermined timing. The means 106 detects a voltage value from the signal received. As with the other disconnection/short-circuit detecting means 101, the disconnection/short-circuit detecting means 106 judges the handlebar steering angle sensor 32 to be short-circuited or disconnected if the detected voltage value is less or more than is expected, respectively. In either case, an Fid generating means 107 generates a flag Fid.

A $\Delta \theta$ h computing means 116 receives the above-mentioned $\theta$ ho (n) and computes the deviation $\Delta \theta$ h thereof. Since $\theta$ ho(n) is detected at the appropriate timing as described, the value $\Delta \theta$ h represents the velocity of handlebar steering angle change.

A moving average computing means 108 computes the average of a predetermined sampling number of values of $\theta$ ho(n), and computes upon acquisition of each average the moving average of a plurality of the averages collected thus far. Needless to say, the moving average computing means 108 may also be used simply to compute the average of a predetermined sampling number of values of $\theta$ ho(n).

A value $\theta$ ha is input to a dynamic center value computing means 110. Upon receipt of that value, the means 110 computes dynamic center position data $\theta$ dcd of the handlebar steering angle sensor 32. The data is represented by a signal $\theta$ dcd output by the handlebar steering angle sensor 32 when the two-wheeled vehicle is actually traveling straight. The computation of $\theta$ dcd by the dynamic center value computing means 110 may be performed every time the value $\theta$ is computed. Alternatively, the computation may be carried out using a dividing ratio stored in a dividing ratio storing means 112; that is, every time $\theta$ ha is computed for a predetermined number of times.

As will be described later with reference to FIG. 10, the value $\theta$ dcd is computed with the dynamic center value computing means 110 through the use of the moving average $\theta$ ha of the handlebar steering angle, a dead zone width R stored in a dead zone width storing means 111, and vehicle velocity detecting pulses VP (i.e., traveled distance data of the vehicle). After being computed, the dynamic center value $\theta$ dcd is stored as $\theta$ dc into a dynamic center value storing means 113.

A handlebar steering angle computing means 109 computes a true handlebar steering angle $\theta$ h(n) (relative to the central position of the handlebar) using the handlebar steering angle moving average $\theta$ ha and the dynamic center value $\theta$ dc read from the dynamic center value storing means 113.

If the handlebar steering angle $\theta$ h(n) computed this time exceeds the previously computed handlebar steering angle $\theta$ h(n−1) by more than a predetermined level, a variation limiting means 114 limits the value $\theta$ h(n) to below that of a predetermined level. In other words, the variation limiting means 114 checks to see if the variation of the handlebar steering angle exceeds a certain level. If the level is found to be exceeded, the variation limiting means 114 modifies the handlebar steering angle so that the variation will fall below that level. The resulting handlebar steering angle is output to a $\delta$ table as well as to the banking angle computing means 120. This moderates the detected banking angle $\theta$b in case the handlebar is moved abruptly by the rider.

An $\alpha$ table 118, a $\beta$ table 117 and a $\delta$ table 119 are tables or maps containing a first correction factor $\alpha$, a second correction factor $\beta$ and a fourth correction factor $\delta$, respectively. The first, the second and the fourth correction factors are read from the tables using, respectively, the vehicle's velocity V, the velocity V as well as the value $\Delta\theta$ h, and the value $\theta$ h(n).

Given the vehicle's velocity V, the handlebar steering angle $\theta$ h(n), the first correction factor $\alpha$, the second correction factor $\beta$ and the fourth correction factor $\delta$, the banking angle computing means 120 computes the banking angle $\theta$ b (inclination of the traveling vehicle) of the two-wheeled motor vehicle using equation (1) below:

$$\theta b = V \times xa \times \theta h(n) \times \delta \times \beta \qquad (1)$$

The first correction factor $\alpha$, the second correction factor $\beta$ and the fourth correction factor $\delta$ will now be described in more detail.

The first correction factor $\alpha$ is a factor for determining the banking angle $\theta$ b by use of the vehicle's velocity V and the handlebar steering angle $\theta$ h(n). This factor is read out in accordance with the vehicle's velocity V.

Figure 19:
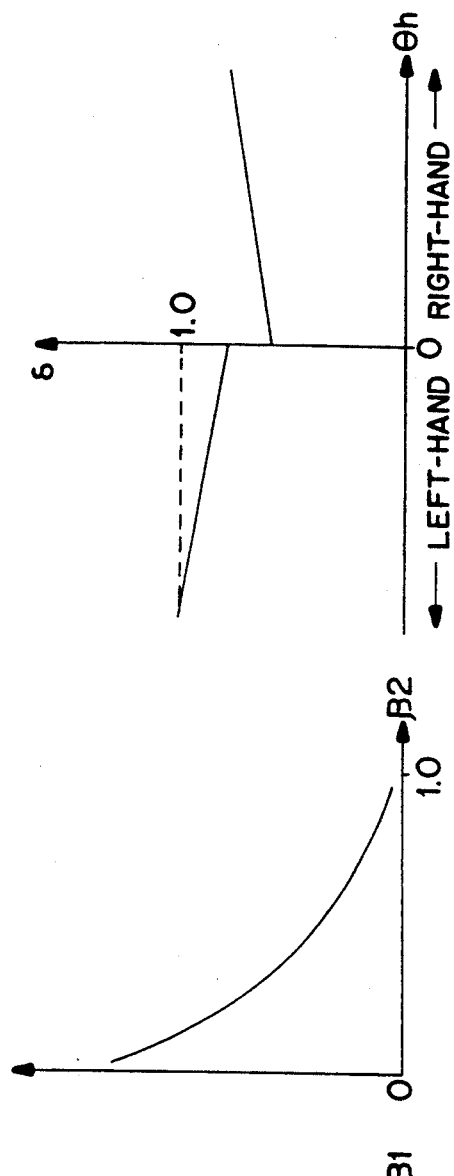
FIGS. 18 and 19 are views showing the values $\beta1$ and $\beta2$ constituting the second correction factor $\beta$.
Figure 18:
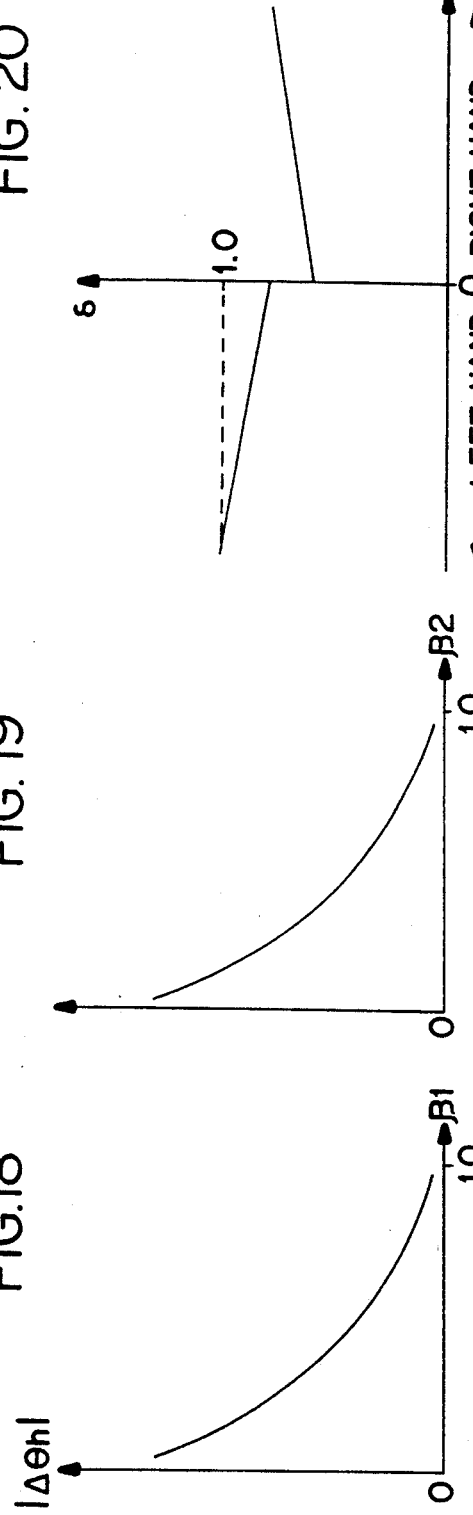

The second correction factor $\beta$ is a factor determined by use of the vehicle's velocity V and the handlebar steering angle $\theta$ h(n) as the parameters. It is assumed here that the second correction factor $\beta$ is represented by the product of a factor $\beta$1 and a factor $\beta$2. The factor $\beta$1 $\Delta \theta$ h as its parameter and the factor $\beta$2 has the velocity V as its parameter. In that case, the factors $\beta$1 and $\beta$2 take on the curves depicted in FIGS. 18 and 19. That is, the second correction factor $\beta$ becomes smaller the greater the $\Delta\theta$ h and the higher the velocity V.

Upon entry into or exit from a cornering run, the handlebar steering angle does not correspond directly to the banking angle. For example, immediately before making a left turn, the rider momentarily steers the handlebar to the right so as to move his or her center of gravity to the left-hand side of the two-wheeled vehicle. Only after the momentary steering of the handlebar is made in the opposite direction does the vehicle's rider start executing the intended turn. In that transient state of turn, no direct correspondence exists between the handlebar steering angle and the banking angle. If the banking angle $\theta$ b is computed directly from the handlebar steering angle in that transient state, the shade 9 may not be controlled appropriately.

In such a transient state, i.e., in the state where the value $\theta \Delta$ h abruptly changes, the sudden change in the banking angle computed is minimized by multiplying the second correction factor $\beta$, the factor being smaller the greater the value $\theta \Delta$ h. This permits accurate computation of the banking angle and thus provides precise control over the movement of the shade 9.

Given the same velocity of handlebar steering angle change, the banking angle is made smaller as the vehicle's velocity V becomes higher. Thus, the second correction factor $\beta$ is minimized as the velocity V is made higher. When both the velocity of handlebar steering angle change and the vehicle's velocity V are higher, the banking angle is judged to be smaller than is expected. In that case, the banking angle data is reduced further for better control of the shade 9.

After the two-wheeled vehicle has gone into the turn of a normal arc, the change in $\theta \Delta$ h is reduced. This allows the second correction factor $\beta$ to be greater so that the banking angle may be accurately computed according to the handlebar steering angle.

Figure 20:
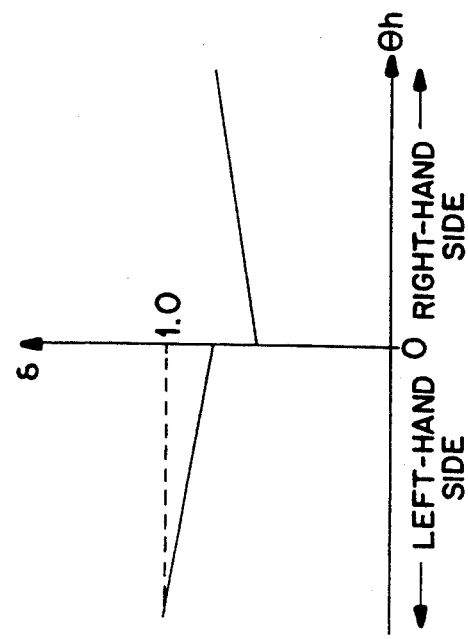
FIG. 20 is a view depicting the contents of the fourth correction factor $\delta$.

The fourth correction factor δ is a factor determined in accordance with the handlebar steering angle and with the handlebar being turned right or left. Given the same handlebar steering angle, the fourth correction factor δ in effect when the handlebar is turned right is made smaller than that in effect when the handlebar is turned left. FIG. 20 illustrates how the fourth correction factor δ is set depending on the handlebar being turned right or left.

The reason that the fourth correction factor δ is set in the above manner will now be discussed. When the banking angle is zero, i.e., when the two-wheeled vehicle is traveling upright, the shade 9 is in its central position. On the two-wheeled vehicle that is required by law to keep to the left-hand side of the road, the light distribution pattern projected in front of the vehicle is kept "flat" on the right-hand side and "raised" leftward on the left-hand side. Thus, if the rotation angle of the shade 9 is made the same regardless of the handlebar being turned right or left (i.e., regardless of the banking angle being rightward or leftward), the vehicle's rider will perceive a greater amount of controlled light distribution when banking to the right. Since the amount of control of the shade 9 is determined from the banking angle in this embodiment, the fourth correction factor δ is used to minimize the amount of control when the vehicle is banking to the right.

A motor control amount computing means 121 multiplies the banking angle $\theta$ by a third correction factor γ, to be described later, in order to compute the rotation angle (i.e., the amount of motor control) $\theta$ m relative to the motor median $\theta$ mc of the servo motor 18 (i.e., shade-driving motor rotation angle corresponding to the central position of the shade in effect while the vehicle is traveling straight). The third correction factor γ is lowered based on the data output by the dynamic center value computing means 110. The lowering of the third correction factor γ is performed when the dynamic center value $\theta$ dc stored in the dynamic center value storing means 13 is found to be still unstable immediately after the vehicle has started traveling. Therefore, the amount of motor control $\theta$ m is moderated where the accuracy of the handlebar steering angle $\theta$ h(n) is low.

If the computed amount of motor control $\theta$ m falls within a predetermined range of angles, an Fbu generating means 122 is activated, and a flag Fbu is generated thereby. The generation of the flag Fbu causes the second motor control means 126 to be connected to the driver 39. Thus, when the amount of motor control $\theta$ m, i.e., the banking angle $\theta$ b, is relatively small, the vehicle is judged to be simply changing lanes when traveling straight or to be negligibly inclined as a result of riding on a bumpy road. In such cases, the shade 9 need not be controlled. The second motor control means 126 then returns the shade 9 gradually to its central position without controlling the shade according to the banking angle $\theta$ b.

If the flags Fid, Fvo and Fbu, as well as an Fd, an Fdl and an Fvol (the latter three to be described later) are not generated (i.e., not High), the amount of motor control $\theta$m is supplied to a first motor control means 124. The first motor control means 124 computes a motor control angle $\theta$ m0 by adding to the value $\theta$m the motor median data $\theta$mc calculated in a manner to be described later. Furthermore, the first motor control means 124 outputs a control signal to the driver 39 using the control angle $\theta$ m0 and an actual motor rotation angle $\theta$ m1. The actual motor rotation angle $\theta$ m1 is output from the motor rotation angle sensor 33 via a disconnection/short-circuit detecting means 128. The servo motor 18 is thus controlled under this feedback scheme.

Figure 16:
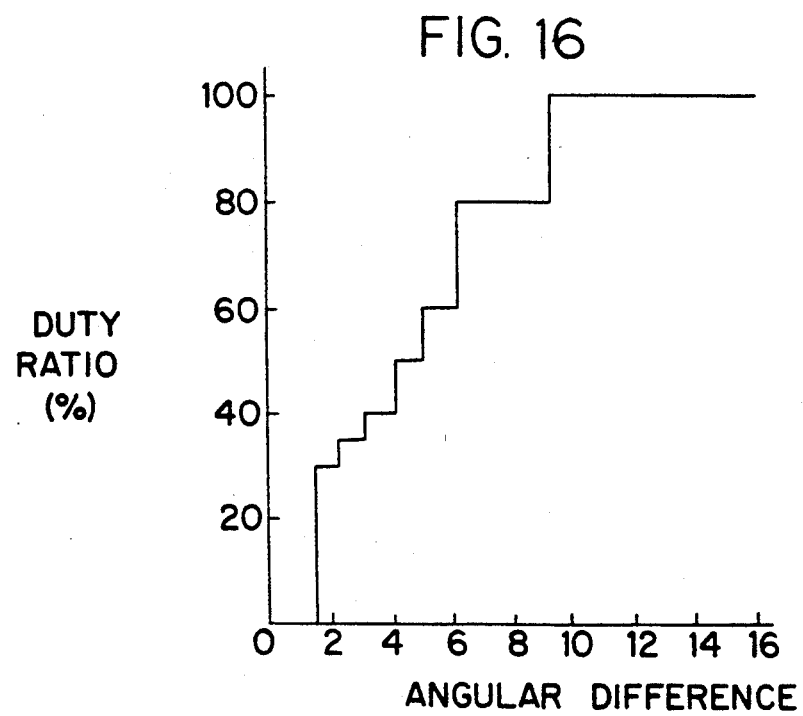
FIG. 16 is a view showing the typical duty ratio table stored in the duty ratio storing means 125.

This feedback control scheme is implemented by a duty ratio corresponding to the difference between the motor control angle $\theta$ m0 and the actual motor rotation angle $\theta$m1 being read from a duty ratio storing means 125 (shown in FIG. 16). The duty ratio is then used to provide chopping control over the servo motor 18.

The disconnection/short-circuit detecting means 128 detects the voltage value of the actual motor rotation angle $\theta$m1 output by the motor rotation angle sensor 33. As with the other disconnection/short-circuit detecting means 101 and 106, the means 128 judges the motor rotation angle sensor 33 to be short-circuited or disconnected when the detected voltage value is less or more than is expected, respectively. In case of a disconnection or short-circuit, an Fid generating means 129 generates a flag Fid.

The switching circuit 46 is constructed so that unless the combination switch 49 is turned on, the battery 44 is not connected to the constant voltage circuit 47. When the combination switch 49 is turned on, a current flows in from the battery 44 through the resistor 48. This activates an Fb generating circuit 131 which in turn generates a flag Fb. The generation of the flag Fb resets a backup timer 133. The flag Fb stops being generated when the combination switch 49 is turned off.

When the flag Fb stops being generated, i.e., when the flag becomes Low, an Fhr generating means 132 is activated, and a flag Fhr is generated thereby. The generation of the flag Fhr activates the backup timer 133, turns on the switching circuit 46, and connects the constant voltage circuit 47 directly to the battery 44 without the intermediary of the combination switch 49.

Upon elapse of a predetermined period of time (e.g., 3 hours), the backup timer 133 turns off the switching circuit 46 and disconnects the constant voltage circuit 47 from the battery 44. That is, the headlight control apparatus stays connected to the power supply for the predetermined period of time even after the combination switch 49 is turned off. This allows diverse kinds of data (including the dynamic center value $\theta$dc stored in the dynamic center value storing means 113) to be held intact in various storing means such as RAMs. Thus, if the rider turns off the combination switch 49, takes a break and then resumes traveling on his or her two-wheeled vehicle, the headlight can be controlled immediately upon departure based on the settings from the previous run.

If the combination switch 49 is turned on before the predetermined period of time elapses on the backup timer 133, the flag Fb generated by the Fb generating means 131 resets and stops the backup timer 133. The switching circuit 46 is turned off.

Figure 21:
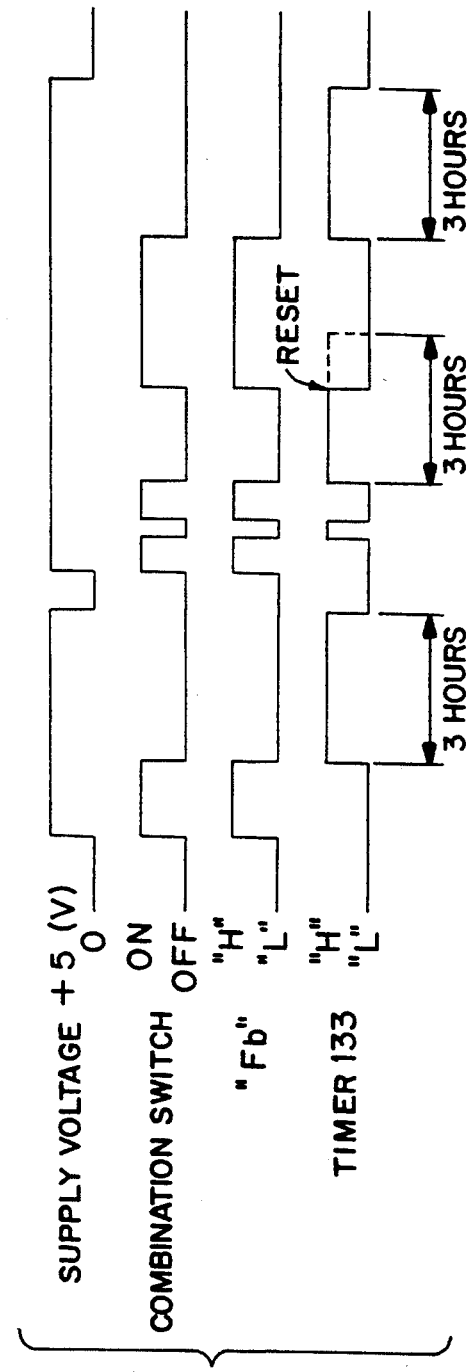
FIG. 21 is a timing chart illustrating the relationship between the status of the combination switch 49, the flag Fb and the timer 133 on the one hand, and the supply voltage output by the constant voltage circuit 47 on the other.

FIG. 21 is a timing chart showing the relationship between the status of the combination switch 49, the flag Fb and the backup timer 133 on the one hand, and the supply voltage output by the constant voltage circuit 47 on the other.

Referring to FIG. 21, the motor resetting means 127 is activated if the combination switch 49 is found to be on, i.e., if the flag Fb is found to be High. In that case, if the vehicle's velocity V is below a certain level (e.g., 3 km/h), the motor resetting means 127 turns the servo motor 18 fully clockwise and counterclockwise until the shade 9 contacts its right and left stoppers. The actual motor rotation angles in both rotating directions are detected. Then the sum of the detected actual motor rotation angles is halved. If the shade and its stoppers are mounted precisely on the frame of the two-wheeled vehicle, the result of the above computation represents the central position of the handlebar, i.e., a median motor rotation angle $\theta$ mc that corresponds to the central position of the shade. Thereafter, the servo motor 18 is controlled so that it keeps to the median $\theta$ mc.

When the dynamic center value $\theta$ dcd computed with the dynamic center value computing means 110 becomes reliable enough to be used for headlight control, i.e., when the two-wheeled vehicle has traveled a relatively long distance so that the dynamic center value $\theta$ dcd thereof is found to have become dependable, an Fd generating means 115 and an Fdl generating means 134 generate flags Fd and Fdl, respectively. This aspect of control operation will be described later with reference to FIG. 10.

From the time the servo motor 18 is returned to its central position by generation of the flag Fb until the flag Fd is generated, the motor 18 is not controlled. Upon generation of the flag Fd, the switching means 123 is activated so that the first or second motor control means 124 or 126 controls the servo motor 18.

With the flag Fd1 generated, control of the servo motor 18 according to the banking angle $\theta$ b is moderated only when the flag Fd is generated. With the flag Fd generated, the motor rotation angle is gradually made to coincide with the control angle $\theta$ m0. Thereafter, the flag Fd1 is reset and the first motor control means 124 continues servo motor control.

As previously described, the second motor control means 126 gradually returns the shade 9 to its central position when the flag Fvo is generated (i.e., when 127.5 [km/h]<V). When the vehicle's velocity V becomes equal to or less than 127.5 km/h, i.e., when the Fvol generating means 135 is activated by bringing the flag Fvo Low and by generating the flag Fvol, control of the servo motor 18 according to the banking angle $\theta$ b is resumed. In this case, the motor rotation angle is made to coincide gradually with the control angle $\theta$ m0. When the motor rotation angle and the control angle $\theta$ m0 are found to be matched, the flag Fvol is reset. Thereafter, the first motor control means 124 continues servo motor control.

As is evident from the preceding description, although the disconnection/short-circuit detecting means 101, 106 and 128 are functionally similar with respect to one another, only the means 101 is constructed in hardware. In other words, the function of the disconnection/short-circuit detecting means 101 is implemented with the level judging circuit 35. The function of the disconnection/short-circuit detecting means 106 and that of the means 128 are implemented in software terms with the electronic controller 42 (of FIG. 4). Needless to say, the function of the disconnection/short-circuit detecting means 101 may also be implemented with the electronic controller 42 if so desired.

Figure 7:
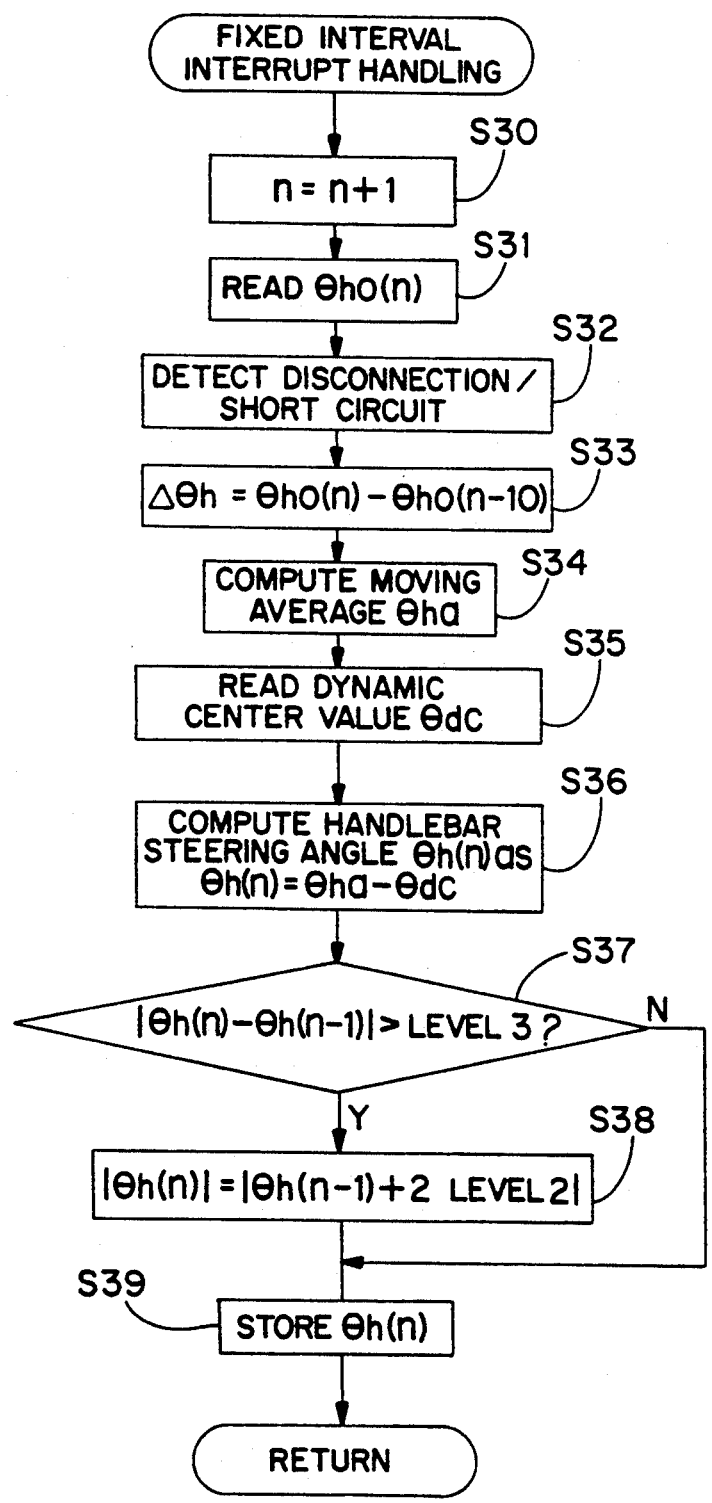
FIG. 7 is a flowchart depicting how fixed-interval interrupt handling is performed with the first embodiment.

A detailed description is now given of how the headlight control apparatus of FIGS. 17a and 17b embodying the present invention operates when used in conjunction with a two-wheeled vehicle. Control of the shade 9 with this embodiment is basically accomplished by a main routine of FIG. 5, by an interrupt handling routine of FIG. 7, and by an interrupt handling routine of FIG. 9. The interrupt handling routine of FIG. 7 is carried out at regular intervals while the main routine of FIG. 9 is activated using the vehicle velocity detecting pulses during the main routine execution.

Figure 5:
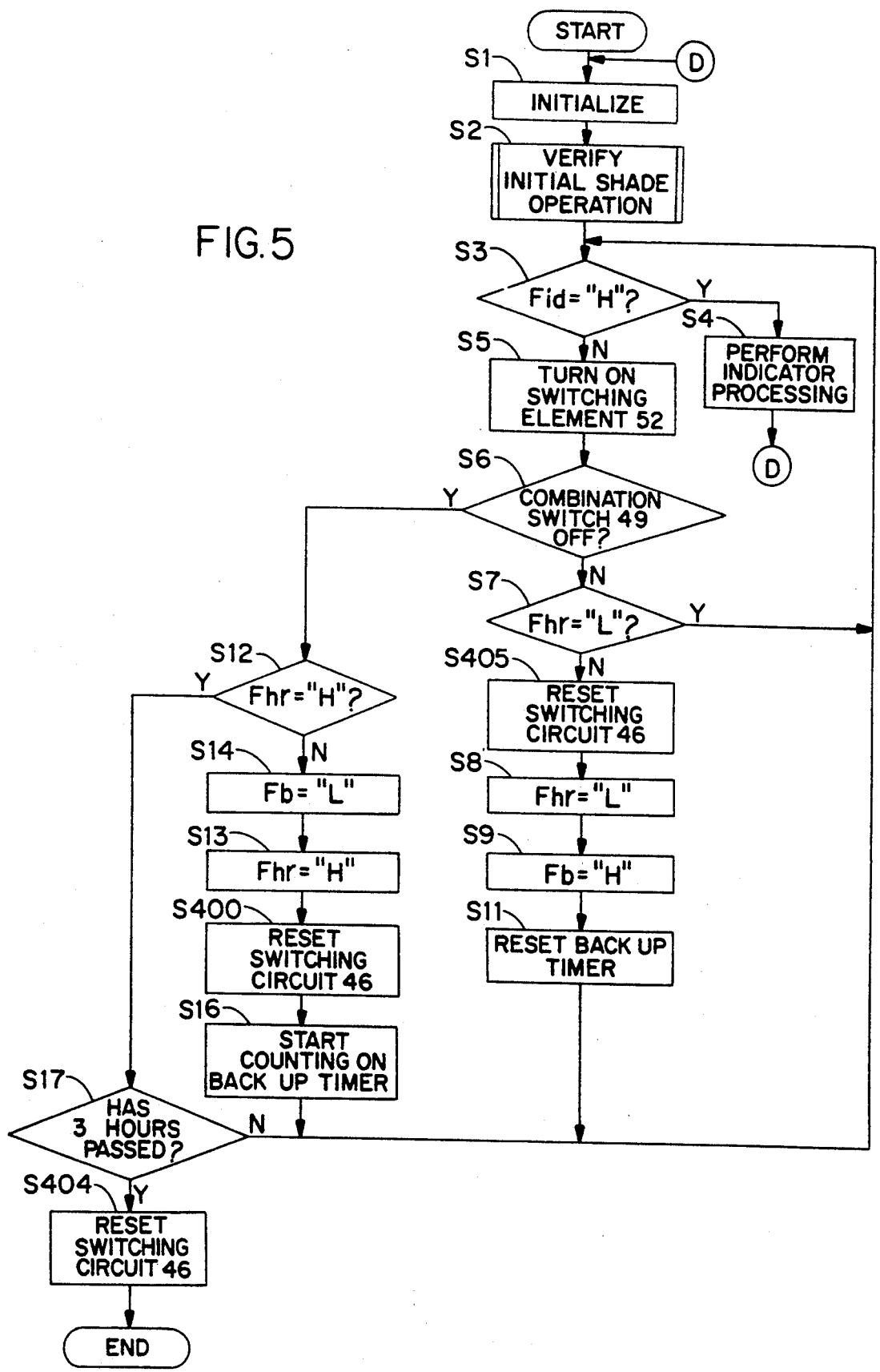
FIG. 5 is a flowchart describing the main routine for the headlight control apparatus which embodies the present invention and whose functional block diagram is given in FIGS. 17a and 17b.

Referring to FIG. 5, step S1 performs initialization. That is, the flag Fb becomes High, and the other flags (Fvo, Fvol, Fbu, Fd, Fdl, Fid and Fhr) become Low. Various counter, timer and n value arrangements (to be described later with reference to FIG. 7) are also reset in step S1. A value Ldcmax (to be described later with reference to FIG. 10) is set to zero.

In step S2 of FIG. 5, the initial operation of the shade 9 is verified. In this step, the shade 9 (of FIGS. 2 and 3) is returned to its central position (i.e., the position in effect when the two-wheeled vehicle 30 is traveling straight). Step S2 will be described in more detail with reference to FIG. 6.

Figure 6:
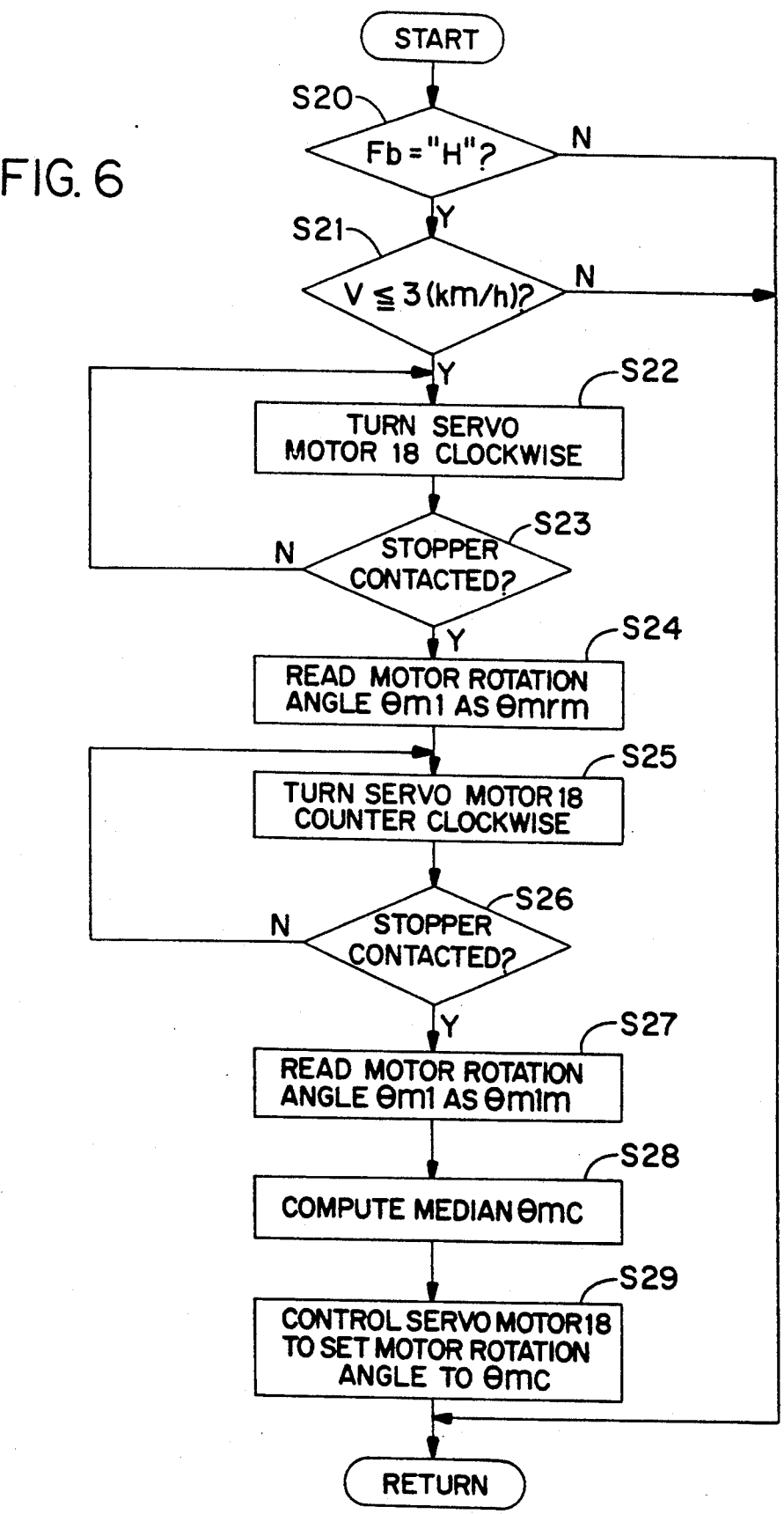
FIG. 6 is a flowchart showing the details of what takes place in step S2.

In Step S20 of FIG. 6, a check is made to see if the flag Fb is High. If the flag Fb is found to be Low, the process of FIG. 6 comes to an end. If the flag FB is found to be High in step S30, step S21 is reached. In step S21, a check is made to see if the two-wheeled vehicle 30 is traveling at a velocity equal to or lower than 3 km/h. If the vehicle's velocity is found to exceed the 3 km/h threshold, the process of FIG. 6 is terminated.

In step S20 of FIG. 6, a check is made to see if the flag Fb is High. If the flag Fb is found to be Low, the process of FIG. 6 comes to an end. If the flag Fb is found to be High in step S20, step S21 is reached. In step S21, a check is made to see if the two-wheeled vehicle 30 is traveling at a velocity equal to or lower than 3 km/h. If the vehicle's velocity is found to exceed the 3 km/h threshold, the process of FIG. 6 is terminated.

If the vehicle's velocity is equal to or lower than 3 km/h, step S22 is reached. In step S22, the servo motor 18 is rotated clockwise. The motor rotation continues until the shade 9 is found to come in contact with a stopper, not shown, in step S23. In step S24 of FIG. 6, the rotation angle $\theta$ ml is read in as $\theta$ mrm. In step S25, the servo motor 18 is rotated counterclockwise. This motor rotation continues until the shade 9 contacts the stopper in step S26. Then in step S27, the rotation angle $\theta$ ml is read in as $\theta$ mlm.

In step S28, the rotation angle (median) $\theta$ mc of the shade-driving motor 18 is computed while the two-wheeled vehicle is traveling straight. The computation is carried out by halving the sum of the values $\theta$ mrm and $\theta$ mlm.

In step S29 of FIG. 6, the servo motor 18 is driven in such a manner that the rotation angle thereof becomes the median angle $\theta$ mc. Thereafter, the process of FIG. 6 comes to an end.

Although not shown in FIG. 6, a stage is provided in which a motor lock phenomenon is detected if the servo motor 18 is found to be faulty during rotation in step S22 or S25. In that case, the flag Fid becomes High. The effects of the flag Fid being High will be described later with reference to FIG. 22.

Figure 22:
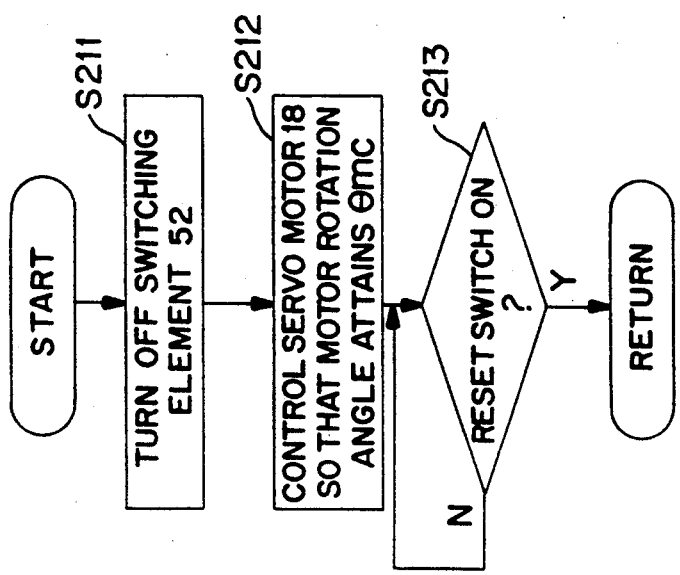
FIG. 22 is a flowchart showing what takes place in step S4.

Returning to FIG. 5, step S2 is followed by step S3 in which a check is made to see if the flag Fid is High. If the flag Fid is found to be Low in step S3 of FIG. 5, step S5 is reached. In step S5, the switching element 52 is turned on (i.e., the indicator lamp 50 is turned off). Step S5 is followed by step S6. If the flag Fid is found to be High, step S4 is reached in which indicator processing is carried out. Details of the indicator processing are depicted in FIG. 22. The indicator processing may also be executed using an interruption when the flag Fid becomes High.

Referring to FIG. 22, step S211 turns off the switching element 52 and turns on the indicator lamp 50. In step S212 of FIG. 22, the servo motor 18 is controlled so that the rotation angle thereof will coincide with $\theta$ mc. If the flag Fid was found to be High in the process of FIG. 6, that means the value $\theta$ mc has not been computed. In that case, the servo motor 18 is controlled In step S213, a check is made to see if a reset switch, not shown, is turned on. If the reset switch is on, the process of FIG. 22 terminates and step S1 of FIG. 5 is restored.

Returning to FIG. 5, step S6 checks whether the combination switch 49 is turned off. If the combination switch 49 is on, step S7 is reached. Step S7 checks whether the flag Fhr is Low. If the flag Fhr is Low, step S3 is again reached.

If the flag Fhr is High, step S405 is reached. Step S405 resets the switching circuit 45 (of FIGS. 4 and 17) and cuts off direction connection between the battery 44 and the constant voltage circuit 47. The above-described direction connection is established in step S400 which will be described later.

The flags Fhr and Fb become Low and High in steps S8 and S9, respectively. Step S11 resets the backup timer that is set in step S16, to be described later. Thereafter, step S3 is again reached.

If the combination switch 49 was off in step S6 of FIG. 5, step S12 is reached in which a check is made to see if the flag Fhr is High. If the Flag Fhr is found to be Low, step S14 is reached. Step S14 makes the flag Fb Low.

In step S13, the flag Fhr becomes High. Step S13 is followed by step S400. Step S400 sets the switching circuit 46 and directly connects the battery 44 with the constant voltage circuit 47. After step S400, the backup timer starts counting time in step S16. Thereafter, step S3 is gain reached.

If the flag Fhr is High in step S12, step S17 is reached. Step S17 checks whether a predetermined period of time (e.g., 3 hours) has elapsed. If the predetermined period has not elapsed, step S3 is reached again. If the predetermined period has elapsed, step S404 is reached. Step S404 resets the switching circuit 46 and cuts off direction connection between the battery 44 and the constant voltage circuit 47. Because the combination switch 49 is turned off at this time, the headlight control apparatus is not powered, and the process of FIG. 5 comes to an end.

FIG. 7 is a flowchart showing how an interruption is carried out at regular intervals (i.e., every 5 msec.) while the main routine is being executed. In step S30 of FIG. 7, the value n is incremented by 1. Step S31 reads the handlebar steering angle signal $\theta$ h0(n) which is the output signal from the handlebar steering angle sensor 32.

Figure 8:
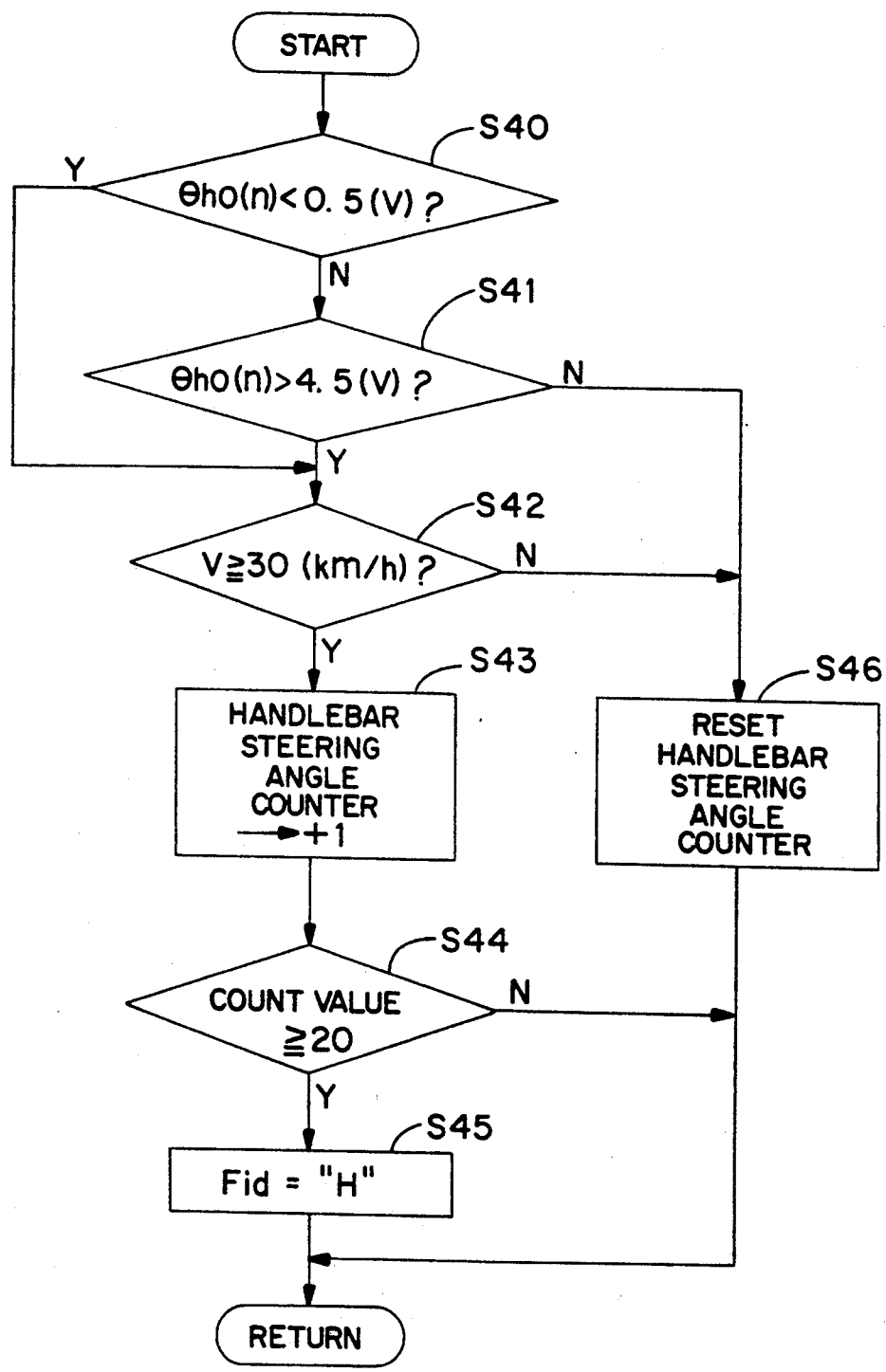
FIG. 8 is a flowchart illustrating the details of the process in step S32.

Step S32 of FIG. 7 detects a disconnection or short-circuit of the handlebar steering angle sensor 32. Details of what takes place in step S32 are depicted in FIG. 8. The signal output by the handlebar steering angle sensor 32 via the A/D converter 37 (of FIG. 4) normally falls within a range of 0.5 V to 4.5 V. If the signal output is 0.5 V, the handlebar is in its full left turn position. If the signal output is 4.5 V, the handlebar is in its full right turn position. With manufacturing and assembly error taken into account, the normal range for the signal is between 0 and 5 V.

In step S40 of FIG. 8, a check is made to see if the value $\theta$ h0(n) is below 0.5 V. If the value $\theta$ h0(n) is found to be below the 0.5 V threshold, step S42 is reached. However, if the value $\theta$ h0(n) is not below the 0.5 V threshold, step S41 is reached.

Step S41 checks whether the value $\theta$ h0(n) is above 4.5 V. If the value $\theta$ h0(n) is above the 4.5 V threshold, step S42 is reached. However, if the value $\theta$ h0(n) is not above the 4.5 V threshold, step S46 is reached.

In step S42, a check is made to see if the vehicle's velocity V is equal to or higher than, say, 30 km/h. If the velocity V is found to be equal to or higher than the 30 km/h threshold, step S43 is reached. If the velocity V is lower than 30 km/h, step S46 is reached.

In step S43, a handlebar steering angle counter, not shown, is incremented by 1. Step S44 checks whether the above count value is equal to or greater than 20. If the count is found to be below 20, the process of FIG. 8 comes to an end. If the count is found to be equal to or higher than 20, a disconnection or short-circuit of the handlebar steering angle sensor 32 is detected, and step S45 is reached in which the flag Fid becomes High. Thereafter, the process of FIG. 8 is terminated. In step S46 of FIG. 8, the count value on the handlebar steering angle is reset.

In the process of FIG. 8, a disconnection or short-circuit of the handlebar steering angle sensor 32 is detected based on the fact that when the vehicle is traveling at a relatively high velocity (30 km/h or higher), the handlebar steering angle thereof does not become significantly large (i.e., $\theta$ h0(n) is not too large or too small).

If the handlebar steering angle sensor 32 has no manufacturing or assembly error and if the output thereof always falls within the range of 0.5 V to 4.5 V with no disconnection or short-circuit detected, the threshold value in step S40 is allowed to be higher than 0.5 V and the threshold value in step S41, lower than 4.5 V.

Where the threshold value is to be set below the maximum value and above the minimum value of the output from the handlebar steering angle sensor 32, a disconnection or short-circuit of the handlebar steering angle sensor 32 may still be detected even if step S42 is omitted.

Returning to FIG. 7 and in step S33, the velocity of handlebar steering angle change $\Delta \theta$ h is computed from equation (2), as follows:

$$\Delta\theta h = \theta h0(n) - \theta h0(n-10) \quad (2)$$

In equation (2) above, the value to be subtracted from the value $\theta$ h0(n) may alternatively be the value $\theta$ h0 detected at a time other than (n−10).

In step S34, the moving average (or simply the average) described with reference to FIG. 17a is computed using the value $\theta$ h0. In step S35, the dynamic center value $\theta$ dc (to be describe later) is read out. In step S36, the handlebar steering angle $\theta$ h(n) (relative to the central position of the handlebar) is computed by equation (3), as follows.

$$\theta h(n) = \theta ha - \theta dc \quad (3)$$

In step S37 of FIG. 7, a check is made to see if the absolute difference between $\theta$ h(n) and $\theta$ h(n−1) exceeds predetermined level of, say, 3 (level denotes the computable unit of the microcomputer, i.e., the resolution thereof). If the absolute difference is not in excess of the predetermined level 3, step S39 is reached. If the level 3 is exceeded, step S38 is reached.

In step S38, the absolute value of $\theta$ h(n) is set to the value $\theta$ h(n−1) plus level 2. Then in step S39, the value $\theta$ h(n) is stored, and the process of FIG. 7 terminates.

FIG. 9 is a flowchart illustrating how interrupt handling is executed by application of the vehicle velocity detection pulses during main routine execution. In step S51 of FIG. 9, the interval detected between the vehicle velocity detection pulses VP is translated by suitable means into the traveling velocity of the two-wheeled vehicle 30.

In step S52, a check is made to see if the vehicle's velocity V is in excess of 127.5 km/h. If the velocity is found to exceed the 127.5 km/h threshold, step S53 is reached. In step S53, the flag Fvo becomes High. Then step S56 is reached.

If the vehicle's velocity V does not exceed the 127.5 km/h threshold, step S201 is reached. In step S201, a check is made to see if the flag Fvo is High. If the flag Fvo is not High, step S54 is reached.

Figure 13:
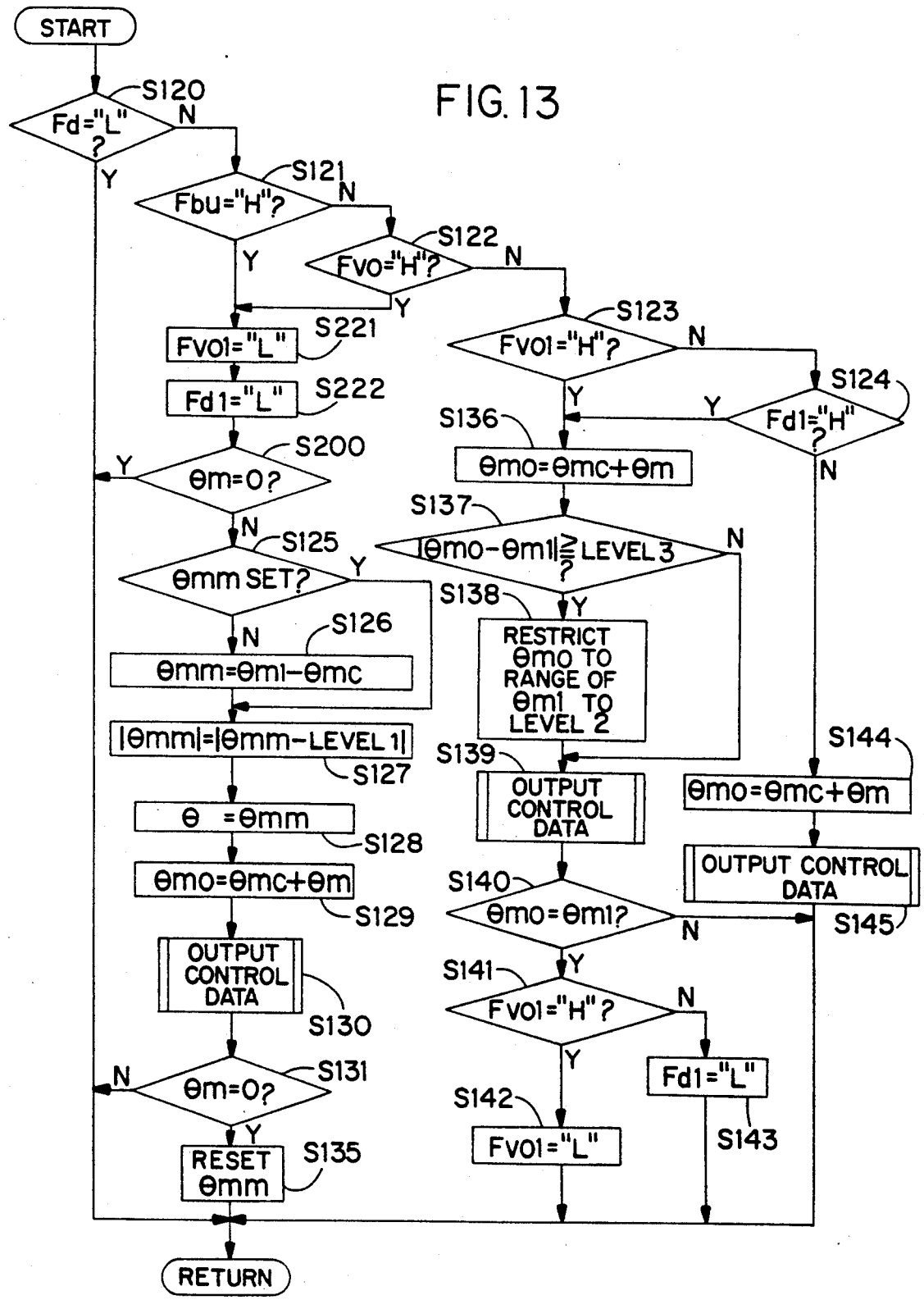
FIG. 13 is a flowchart showing in detail what takes place in step S67.

If the flag Fvo is High, the flag Fvo becomes Low in step S202 and the flag Fvol becomes High in S203. In step S204, a value $\theta$ mm, to be described later in connection with step S125 of FIG. 13, is reset. Then step S54 is reached.

In step S54 of FIG. 9, a check is made to see if the vehicle's velocity V is lower than 3 km/h. If the velocity V is found to be lower than the 3 km/h threshold, the velocity V is set to 0 (km/h) in step S55 before step S56 is reached. If the velocity V is found to be equal to or higher than the 3 km/h threshold, step S56 is reached without passing through step S55.

In step S56, a check is made to see if the timing is right for executing step S57, to be described later. That is, the process of step S57 is illustratively performed every time this interrupt handling routine has been executed a predetermined number of times.

Step S57 computes the dynamic center value of the handlebar steering angle sensor 32, i.e., the output signal thereof in effect when the handlebar is in its central position. When the dynamic center value is detected, the output signal of the handlebar steering angle sensor 32 in effect with the handlebar in its central position is accurately known even if the sensor 32 is misaligned on the two-wheeled vehicle.

Figure 10:
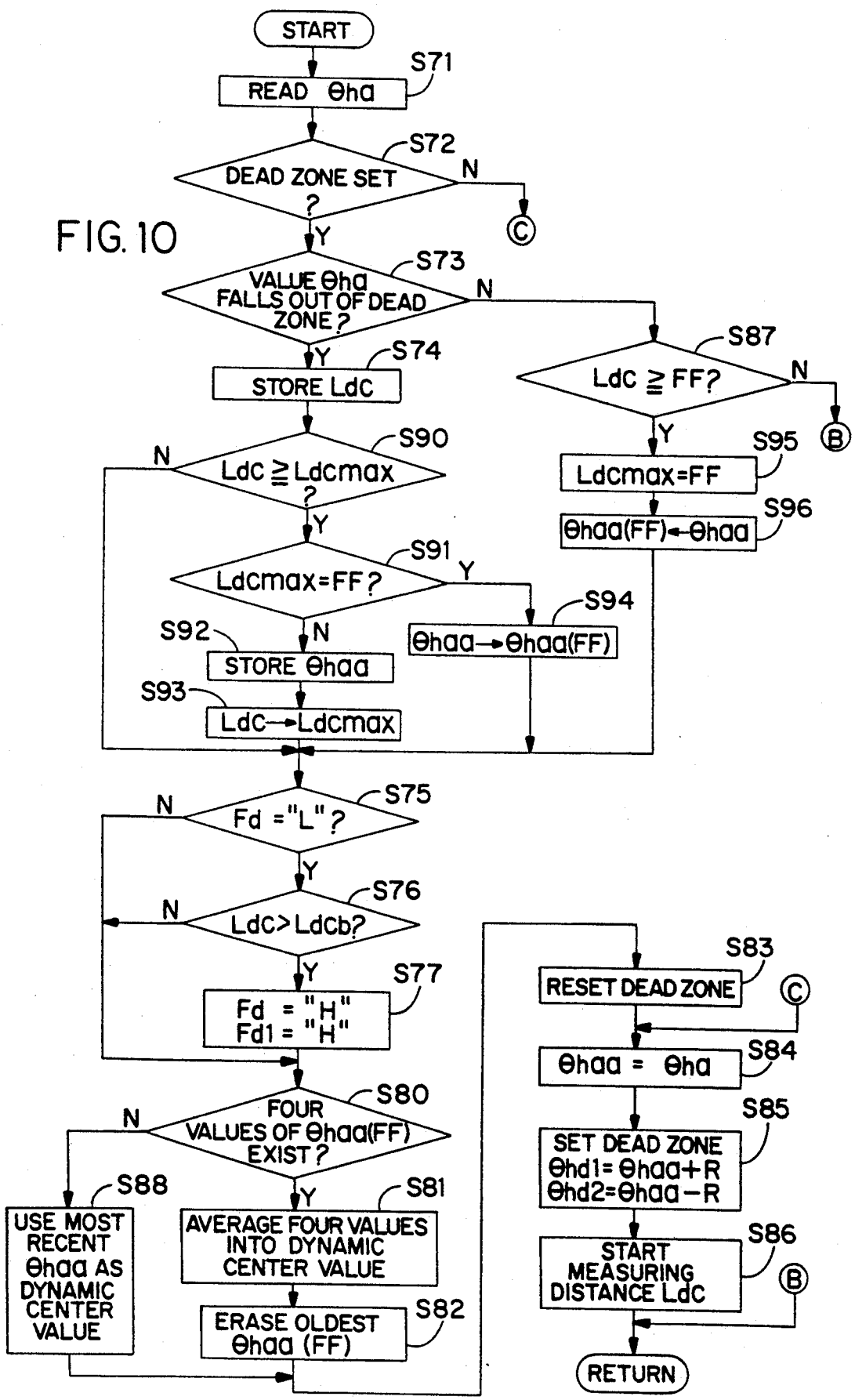
FIG. 10 is a flowchart depicting the details of the process in step S57.

What takes place in step S57 is depicted in more detail in FIG. 10. In step S71 of FIG. 10, the value $\theta$ ha computed in step S34 of FIG. 7 is read. In step S72, a check is made to see if a dead zone is already set in step S85, to be described later. If the dead zone is not set, step S84 sets the value $\theta$ ha to $\theta$ haa.

Figure 15:
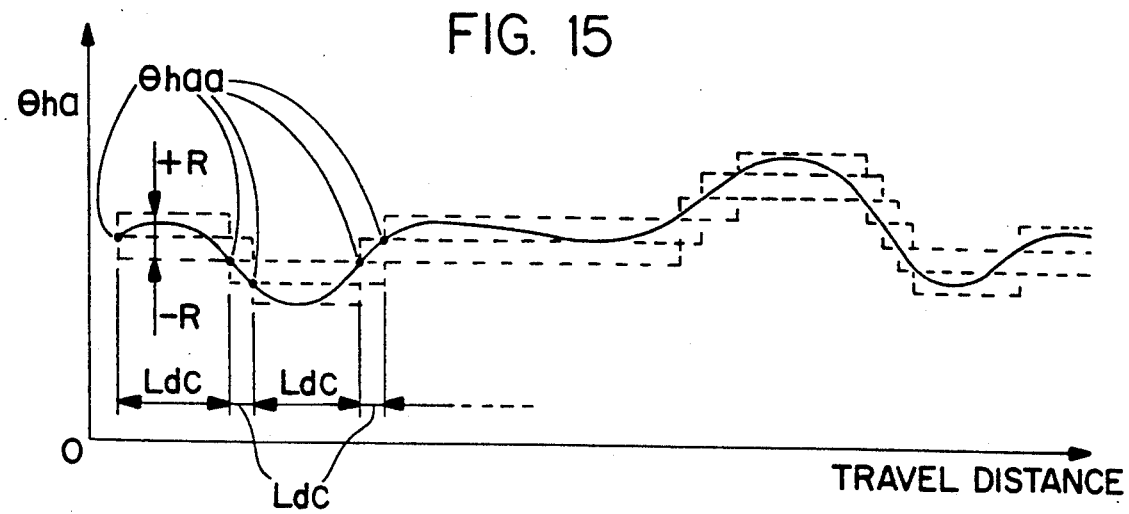
FIG. 15 is a timing chart illustrating the relationship between the value $\theta$ ha and the distance traveled by the two-wheeled vehicle.

In step S85, the dead zone is set. The dead zone has a predetermined width R (shown in FIG. 15) extending up and down the value $\theta$ haa. The upper limit $\theta$ hd1 of the dead zone is the value $\theta$ haa plus the dead zone width R, and the lower limit $\theta$ hd2 thereof is the value $\theta$ haa minus the width R.

As will be described later, the distance Ldc (FIG. 15) traveled by the two-wheeled vehicle from the time the dead zone is set (i.e., after $\theta$ haa is set) until the value $\theta$ ha falls out of the dead zone is measured next. And as will be described later, when a predetermined condition is met, the value $\theta$ haa at that time is stored as $\theta$ haa or $\theta$ haa(FF).

In step S86, the distance Ldc traveled since the dead zone was set starts being measured. When the traveled distance has been measured, the process of FIG. 10 comes to an end.

If the dead zone is found to be set in step S72 of FIG. 10, step S73 is reached. In step S73, a check is made to see if the value $\theta$b ha falls out of the dead zone. That is, step S73 determines whether the value $\theta$ ha is higher than the upper limit $\theta$ hd1 or lower than the lower limit $\theta$ hd2.

If the value $\theta$ ha falls within the dead zone, step S87 is reached. In step S87, a check is made to see if the traveled distance Ldc is equal to or greater than a predetermined distance FF. If the distance Ldc is less than distance FF, the process of FIG. 10 is terminated.

If the value $\theta$ ha is found in step S73 to be outside the dead zone, step S74 is reached. Step S74 completes the measurement of the traveled distance Ldc and stores the measured distance. In other words, step S74 detects the distance Ldc traveled by the two-wheeled vehicle in a stable, upright state from the time the dead zone is set until the value $\theta$ ha falls out of the dead zone.

In step S90, a check is made to see if the traveled distance Ldc is equal to or greater than the value Ldcmax (the maximum value of the Ldc measurements taken so far, the initial value of Ldcmax is 0 as initialized in step S1 of FIG. 5). If the distance Ldc is less than the maximum value Ldcmax, step S75, to be described later, is reached.

If the distance Ldc is found to be equal to or greater than the value Ldcmax, step S91 is reached. Step S91 checks to see if the above-mentioned predetermined distance FF has been set as Ldcmax. The setting is carried out in step S95, to be described later.

If the distance Ldcmax is found to be set to the distance FF, step S94 is reached. The step S94 sets the value $\theta$ haa (Ff) to the value $\theta$ haa that was set when the dead zone was established. After this, step S75 is reached.

If the distance Ldcmax is not found to have been set to the distance FF, step S92 is reached. Step S92 stores the value $\theta$ haa as it is. In step S93, the distance Ldc stored in step S74 is set to Ldcmax and stored as such. Thereafter, step S75 is reached.

If the distance Ldc is found in step S87 to be equal to or greater than the predetermined distance FF, step S95 is reached. Step S95 sets the distance Ldcmax to FF. As discussed in connection with step S90, the value Ldcmax is set consecutively to each of the largest values of Ldc. But if the distance Ldc is found to be equal to or greater than the distance FF, the value Ldcmax is fixedly set to the value FF. In step S96, the value $\theta$ haa set when the dead zone was established is set to $\theta$ haa(FF). Thereafter, step S75 is reached.

As described, the largest value of Ldc is set to Ldcmax, and the value $\theta$ haa in effect at that time is stored unchanged. After the value Ldcmax is set to the maximum value FF, the value $\theta$ haa is set to $\theta$ haa(FF) and stored as such.

In step S75, a check is made to see if the flag Fd is Low. If the flag Fd is found to be High, step S80 is reached. If the flag Fd is found to be Low in step S75, step S76 is reached. Step S76 checks to see if the value Ldc (or Ldcmax) exceeds the value Ldcb (<FF). If the value Ldc is not found to be in excess of the value Ldcb, step S80 is reached.

If the value Ldc is found to exceed the value Ldcb, step S77 is reached. In step S77, the flags Fd and Fd1 each becomes High. Then, step S80 determines if there are four values of $\theta$ haa(FF). If four values of $\theta$ haa(FF)

are found to exist, step S81 is reached. Step S81 computes the average of the four values as the dynamic center value $\theta$ dcd of the handlebar steering angle, and stores that value as $\theta$ dc. In step S82, the oldest $\theta$ haa(FF) is erased, and the most recent three values of $\theta$ haa(FF) are selected. Thereafter, step S83 is reached.

If four values of $\theta$ haa(FF) are not found to exist in step S80, step S88 is reached. Step S88 selects the most recent value of $\theta$ haa (i.e., $\theta$ haa stored in step S92, or $\theta$ haa(FF) stored in step S94 or S96) as the dynamic center value $\theta$ dcd, and stores that value as $\theta$ dc. Then step S83 is reached where the dead zone is reset. Step S83 is followed by step S84 in which the dead zone is set again.

Steps S58 through S60 of FIG. 9 read out the first, the second and the fourth correction facts $\alpha$, $\beta$ and $\delta$, respectively. These factors were already described in conjunction with FIGS. 17a and 17b. In step S61, the banking angle $\theta$ b is computed using equation (1) above. In step S62, the amount of control of the servo motor 18 is computer. Step S62 is depicted in more detail in FIG. 11.

Figure 11:
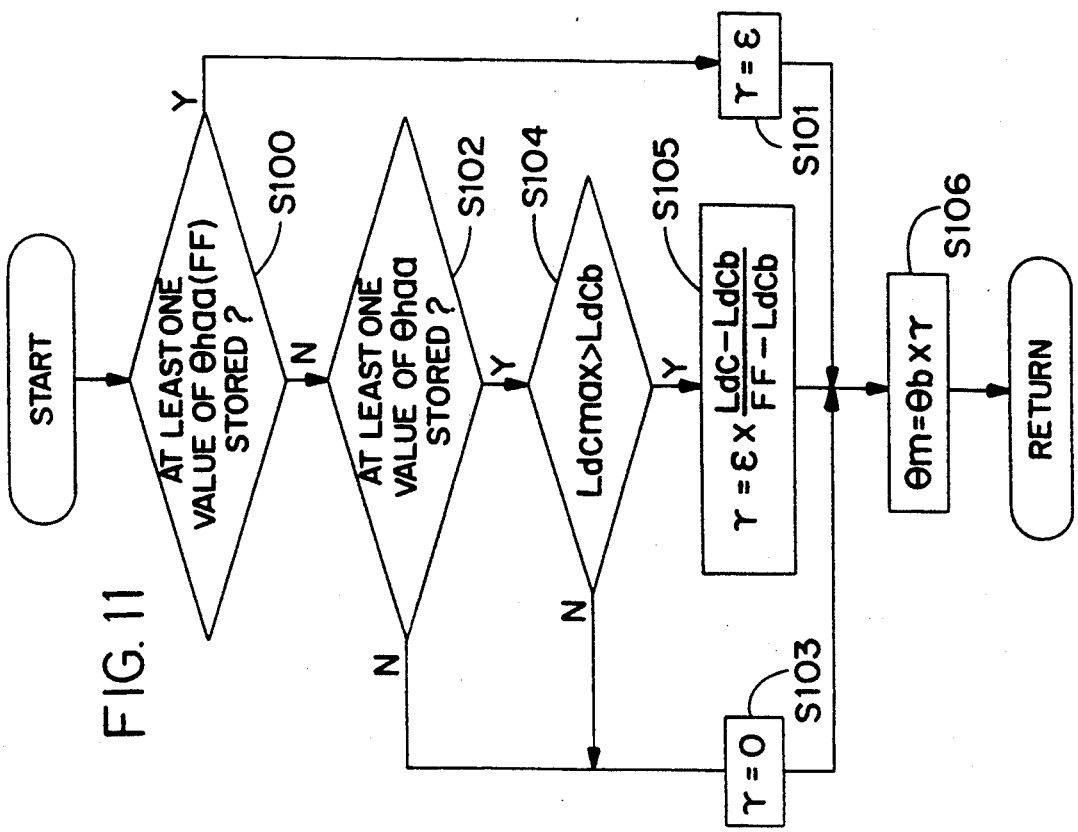
FIG. 11 is a flowchart describing the details of the process in step S62.

In step S100 of FIG. 11, a check is made to see if at least one value of $\theta$ haa(FF) (shown in FIG. 10) is stored. If at least one value of $\theta$ haa(FF) is found to exist, it is judged that the dynamic center value has been correctly computed, and step S101 is reached. Step S101 sets the third correction factor $\gamma$ to a value of $\epsilon$.

As described, the banking angle $\theta$ b has been computed using the handlebar steering angle $\theta$ h(n), and the value $\theta$ h(n) is based on the dynamic center value $\theta$ dc which was determined as depicted in FIG. 10. The value dc is deemed highly accurate when at least one value of $\theta$ haa(FF) is stored (i.e., when at least distance FF is traveled by the two-wheeled vehicle with its handlebar steering angle $\theta$ ha kept within the dead zone). This is because the handlebar is thought to have been in its central position throughout the distance traveled. In this case, the third correction factor $\gamma$ is set to the value $\epsilon$ as it is.

When no value of $\theta$ haa(FF) is found to exist, the reliability of the dynamic center value $\theta$ dc is deemed low. In this case, the third correction factor $\gamma$ is set to value smaller than the value $\epsilon$, as depicted in connection with step S103 or S105.

If not even one value of $\theta$ haa(FF) is found to exist in step S100, step S102 is reached. In step S102, a check is made to see if at least one value of $\theta$ haa is stored. If not even one value of $\theta$ haa is found to exist, it is judged that the dynamic center value has not been computed, and step S103 is reached. Step S103 sets the third correction factor $\gamma$ to zero. That is, in step S62 which will be described later, the amount of motor control $\theta$ m is set to zero.

If at least one value of $\theta$ haa is found to exist in step S103, step S104 is reached. Step S104 checks to see if the value Ldcmax is in excess of the value Ldcb. If the value Ldcmax is not found to be in excess of the value Ldcb, it is judged that the accuracy of the dynamic center value is low, and step S103 is reached. If the value Ldcmax is found to exceed the value Ldcb, step S105 is reached.

In step S105, the third correction factor $\gamma$ is computed using equation (4) below:

$$r = \epsilon \times \frac{Ldc - Ldcb}{FF - Ldcb} \quad (4)$$

As indicated by equation (4) above, the third correction factor $\gamma$ is set to a value smaller than the value $\epsilon$. That is, after step S105 is reached, it is judged that the dynamic center value, the reliability of which is not very high, may be used if suitably moderated for computing the amount of motor control $\theta$ m. The third correction factor $\gamma$ is thus moderated according to the value Ldc. In equation (4) above, the value Ldc may alternatively be replaced with the value Ldcmax.

After the third correction factor $\gamma$ is set, step S106 is reached. Step S106 computes the amount of control $\theta$ m of the servo motor 18 (angular difference of the rotation axis of the motor relative to the central position thereof) using equation (5) below:

$$\theta m = b \times \gamma \quad (5)$$

The value $\epsilon$ used in steps S101 and S105 is the factor for converting the banking angle $\theta$ b into the amount of control $\theta$ m of the servo motor 18.

Returning to FIG. 9 and in step S63, a check is made to see if the computed amount of motor control $\theta$ m is within ±5 degrees. If this condition is met, step S64 is reached in which the flag Fbu becomes High. Then step S65 is reached.

If the computed amount of motor control $\theta$ m is found to be outside the ±5 degree range, step S205 is reached in which the flag Fbu becomes Low. Step S205 is followed by step S206 which resets the value $\theta$ mm as in step S204. Then, in step S65, the rotation angle $\theta$ ml of the servo motor 18, is read and the angle is output by the motor rotation angle sensor 33 through the A/D converter 41 (of FIG. 4).

Figure 12:
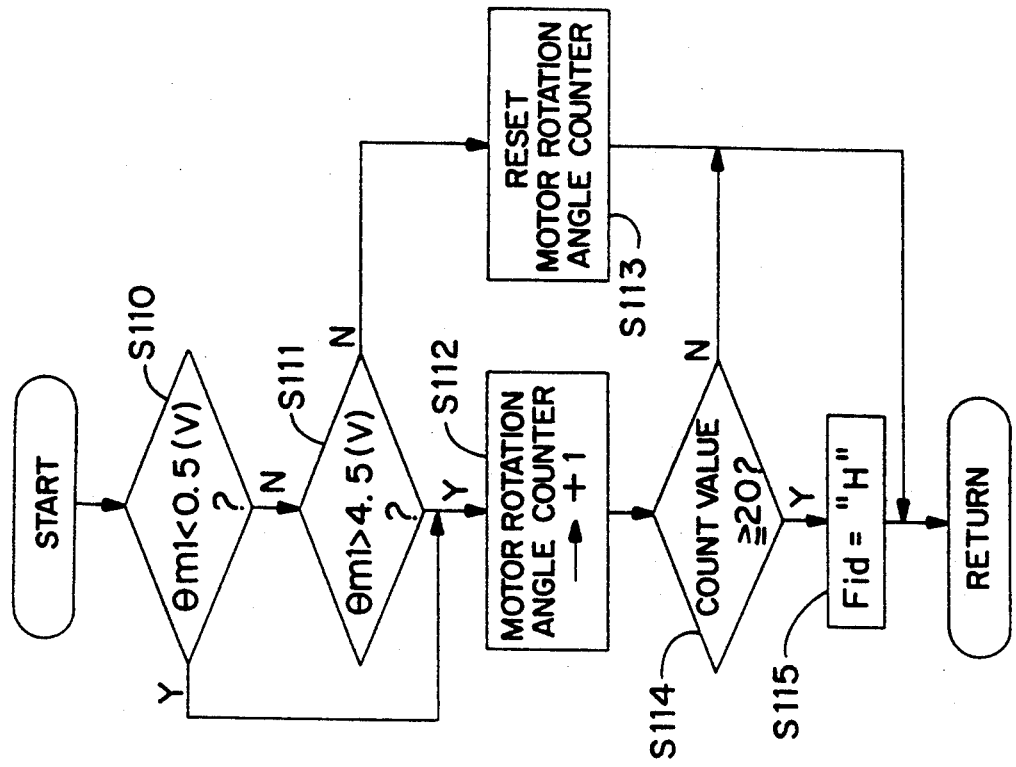
FIG. 12 is a flowchart illustrating the details of the process in step S66.

Step S66 checks the motor rotation angle sensor 33 for disconnection or short-circuit. Details of what takes place in step S66 are depicted in FIG. 12. The signal output by the motor rotation angle sensor 33 via the A/D converter 41 usually falls within the range of 0.5 V to 4.5 V.

In FIG. 12, step S110 checks to see if the value $\theta$ ml is lower than 0.5 V. If this condition is met, step S112 is reached. If the value $\theta$ ml is not found to be lower than the 0.5 V threshold, step S111 is reached. In this step, a check of whether the value $\theta$ ml exceeds 4.5 V is made. If so, step S112 is reached. If the value $\theta$ ml does not exceed the 4.5 V threshold, step S113 is reached wherein the count value of the motor rotation angle counter is reset.

In step S112, the count value of a motor rotation angle counter, now shown, is incremented by 1. Then in step S114, a check is made to see if the count value above is equal to or higher than 20. If this condition is not met, the process of FIG. 12 comes to an end. If the count value is found to be equal to or higher than 20, a disconnection or short-circuit of the motor rotation angle sensor 33 is recognized, and step S115 is reached. Step S115 causes the flag Fid to become High, and the process of FIG. 12 is terminated.

Returning to FIG. 9, step S67 provides control of the servo motor 18. What takes place in step S67 is illustrated in more detail in FIG. 13 where steps S144 and S145 constitute a feedback process for immediately matching the actual motor rotation angle $\theta$ ml with the computed amount of control $\theta$ m0. Steps S125 through S135 provide a process to gradually return the actual rotation angle of the motor to its central position. Steps S136 through S143 make up a process for gradually matching the actual motor rotation angle with the computed amount of control.

In step S120 of FIG. 13, a check is made to see if the flag Fd is Low. If this condition is met, i.e., until Ldc>Ldcb after the combination switch is turned on (when the dynamic center value is incorrect or not computed, as described in conjunction with step S104 of FIG. 11), the servo motor 18 is not controlled, and the process of FIG. 13 comes to an end.

If the flag Fd is High, step S121 is reached. Step S121 checks whether the flag Fbu is High. If the flag Fbu is High (i.e., when the amount of motor control $\theta$ m is within ±5 degrees, as described in connection with steps S63 and S64 of FIG. 9), step S221 is reached. If the flag Fbu is found to be Low, step S122 is reached.

In step S122, a check is made to see if the flag Fvo is High. If the flag Fvo is High (i.e., when the vehicle's velocity V is in excess of 127.5 km/h, as discussed in conjunction with steps S52 and S53 of FIG. 9), step S221 is reached. If the flag Fvo is Low, step S123 is reached.

In step S221, the flag Fvol is reset to be Low. In step S222, the flag Fdl is reset to be Low. Step S200 determines whether the amount of motor control $\theta$ m is zero. If this condition is met, the process of FIG. 13 terminates.

If the amount of motor control $\theta$ m is not found to be zero, step S125 is reached. Step S125 checks to see if the value $\theta$ m is already set to a value $\theta$ mm in step S126 or S127, to be described later. The value $\theta$ mm provides basic data for gradually returning the shade 9 to its central position.

If the value $\theta$ mm is found to have been set, step S127 is reached. If the value $\theta$ mm is not found to be set, step S126 is reached. Step S126 computes the deviation of the actual rotation angle of the motor from its central position by subtracting from the current motor rotation angle $\theta$ ml in the median motor rotation angle $\theta$ mc calculated in step S28 of FIG. 6. After the result of the above computation is set to $\theta$ mm, step S127 is reached.

In step S127, a predetermined level (e.g., level 1) is subtracted from the absolute value of $\theta$ mm. In step S128, the value $\theta$ mm is set to the amount of motor control $\theta$ m and in step S129, the value $\theta$ m is added to the median $\theta$ mc. The result of this addition is set to the motor control angle $\theta$ m0, as indicated by equation (6) below:

$$\theta m0 = \theta mc + \theta m \quad (6)$$

Figure 14:
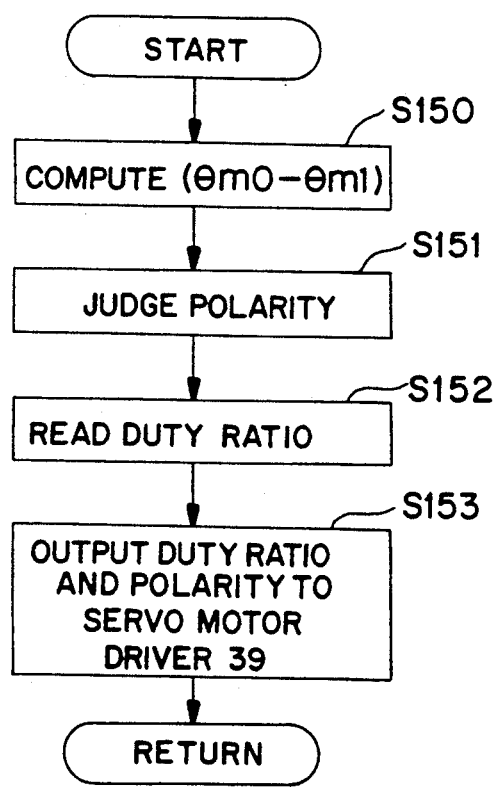
FIG. 14 is a flowchart depicting what takes place in step S130.

In Step S130, control data is output to the driver 39 (of FIG. 4). What takes place in step S130 is depicted in more detail in FIG. 14, where step S150 detects the difference (angular difference) between motor control angle $\theta$ m0 and actual motor rotation angle $\theta$ ml. Then step S151 detects the polarity of the current supplied to the servo motor 18 depending on the magnitude of the values $\theta$ m0 and $\theta$ ml.

In accordance with the angular difference obtained above, step S152 reads the duty ratio of the signal to be output to the driver 39 from a table such as the one shown in FIG. 16. The table of FIG. 16 is only an example. This table is determined by taking into consideration the characteristics of the servo motor 18 and other relevant factors.

In step S153, a control signal is output to the driver 39 according to the polarity and duty ratio acquired. Thereafter, the process of FIG. 14 comes to an end. As evident from the description above, if the acquired duty ratio is less than 100%, the servo motor 18 is subjected to chopping control.

Returning to FIG. 13 and in step S131, a check is made to see if the value $\theta$ m is zero, i.e., if the rotation angle of the servo motor 18 is back in its central position. If the value $\theta$ m is not found to be zero, the process of FIG. 13 is terminated. If the value $\theta$ m is found to be zero, step S135 is reached. Step S135 resets the value $\theta$ mm, and the process of FIG. 13 comes to an end. This allows the servo motor 18 to return gradually to its central position.

If the flag Fvo is Low in step S122, step S123 is reached. Step S123 checks to see if the flag Fvol is High. If the flag Fvol is found to be High (i.e., when the vehicle's velocity V has dropped below 127.5 km/h after exceeding that limit, as described in conjunction with steps S52, S53, S201 and S203 of FIG. 9), step S136 is reached. If the flag Fvol is found to be Low, step S124 is reached.

In step S124, a check is made to see if the flag Fdl is High. If this condition is met (i.e., when the value Ldc has exceeded the value Ldcb for the first time since the vehicle started traveling and thus having its dynamic center value computed, as described in connection with steps S76 and S77 of FIG. 10), step S136 is reached. If the flag Fdl is found to be Low, then step S144 is reached.

In step S136, as in step S129, equation (6) is performed and the motor control angle $\theta$ m0 is set thereby. In step S137, a check is made to see if the absolute angular difference between $\theta$ m0 and $\theta$ ml is equal to or higher than level 3. If this condition is not met, step S139 is reached. If this condition is met, step S138 is reached. Step S138 restricts the motor control angle $\theta$ m0 to within a the range of the actual motor rotation angle $\theta$ ml through level 2. This moderates motor control in step S139, which will be described below.

In step S139, as in step S130, control data is output to the driver 39. Then in step S140, a check is made to see if the motor control angle $\theta$ m0 has coincided with the actual motor rotation angle $\theta$ ml. If this condition is not met, the process of FIG. 13 comes to an end. If this condition is met, step S141 is reached. Step S141 checks whether the flag Fvol is High. The check in step S141 is intended to determine whether the process of steps S136 through S140 is carried out because the flag Fvol is High or because the flag Fdl is High.

If the flag Fvol is found to be High, step S142 is reached. Step S142 causes the flag Fvol to become Low, and the process of FIG. 13 terminates. If the flag Fvol is not High, i.e., if the flag Fdl is High, step S143 is reached. In step S143, the flag Fdl becomes Low, and the process of FIG. 13 is terminated.

In the above-mentioned step S124, if the flag Fdl is found to be Low, step S144 is reached. In step S144, as in steps S129 and S136, equation (6) is performed and the motor control angle $\theta$m0 is set. In step S145, as in steps S130 and S139, control data is output to the driver. Thereafter, the process of FIG. 13 comes to an end.

Returning to FIG. 9, step S67 is completed. Then the process of FIG. 9 is terminated.

In the above-discussed first embodiment, the dynamic center value computing means 211 computes the dynamic center value by use of the technique depicted in FIG. 10. Alternatively, the computing may be carried out using any other suitable techniques.

The timing for modifying the third correction factor γ (step S105 of FIG. is not limited to what was described with reference to FIG. 11. An alternative timing will do whereby the accuracy of the computed dynamic center value is not expected to be very high.

Figure 23:
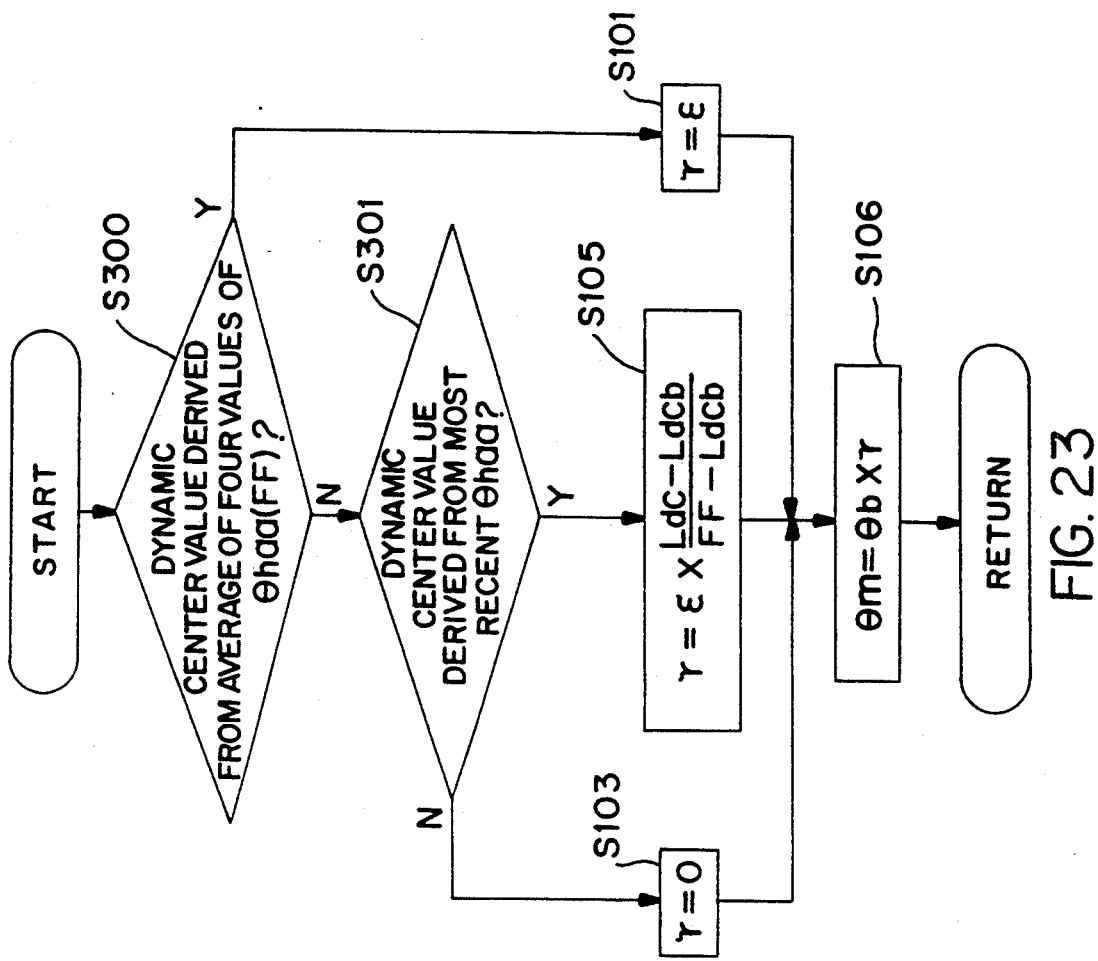
FIG. 23 is a flowchart illustrating an alternative process of step S62 in FIG. 9, the flowchart corresponding to that of FIG. 11.

FIG. 23 is a flowchart showing another version of the process depicted in FIG. 11. In FIG. 23 as well as in FIG. like reference characters designate like or corresponding steps.

Referring to FIG. 23, step S300 checks to see if the dynamic center value stored in the dynamic center value storing means 113 is the average computed from four values of θ haa(FF) (i.e., the dynamic center value computed in step S81 of FIG. 10). If the condition of step S300 is met, step S101 is reached.

If the condition of step S300 is not met, step S301 is reached. Step S301 checks whether the dynamic center value stored in the dynamic center value storing means 113 is the one derived from the most recent value of θ haa (i.e., the dynamic center value established in step S88 of FIG. 10). If the condition of step S301 is met, step S105 is reached. If this condition is not met, step S103 is reached.

The significance of what has taken place in the checks of FIG. 23 so far is that the dynamic center value is predicted to be highly accurate if found to be computed in step S81, or not very accurate if computed in step S88. In the latter case, the dynamic center value may be used adequately if the applicable requirements thereof are suitably moderated. Thus, according to the result of the above prediction, the third correction factor γ is determined.

In the process of step S105 (equation (4)) in FIG. 23, the value Ldc may be replaced with Ldcmax in computing the third correction factor.

Figure 1A:
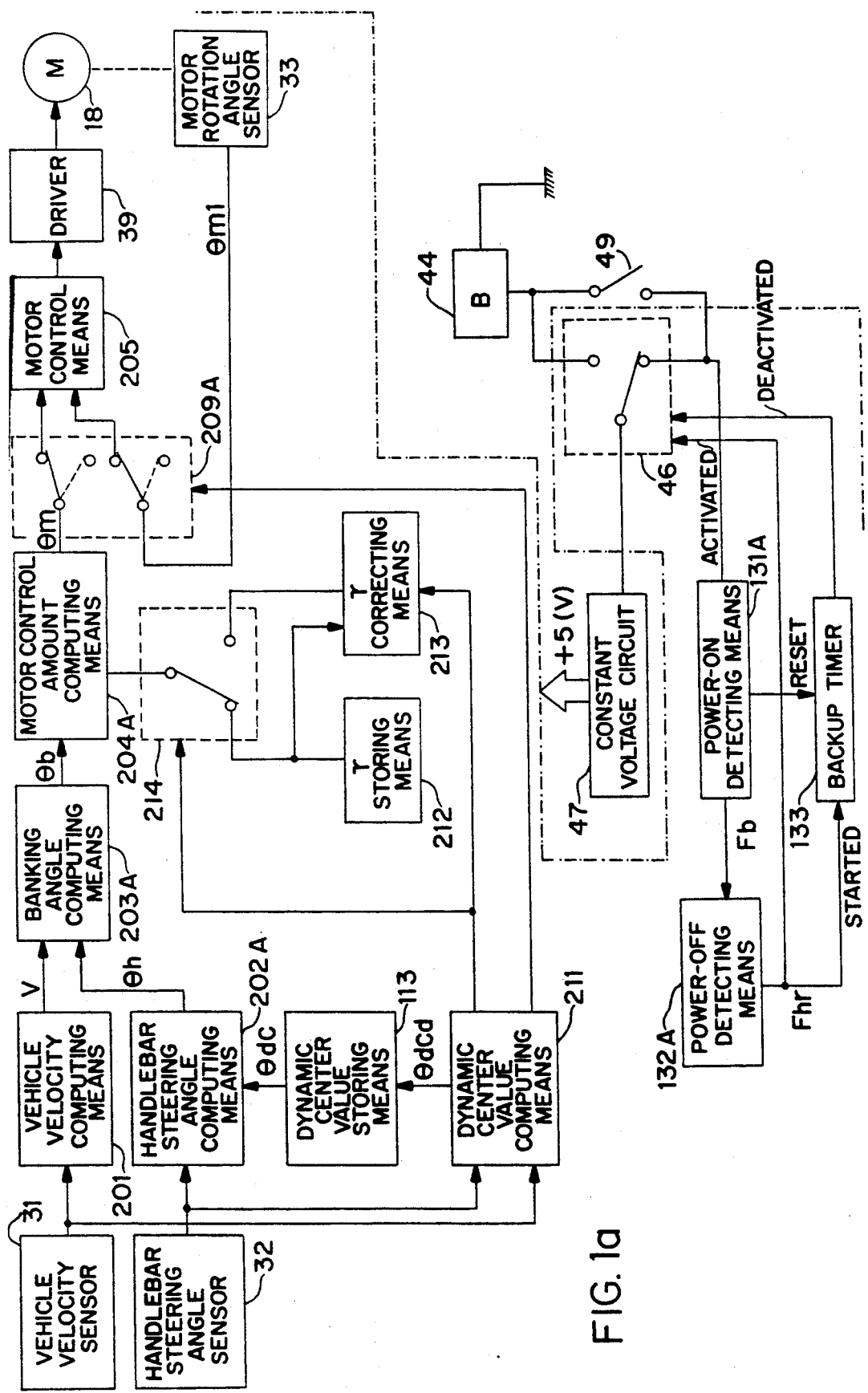
FIG. 1a is a functional block diagram of the first embodiment of the present invention.
Figure 1B:
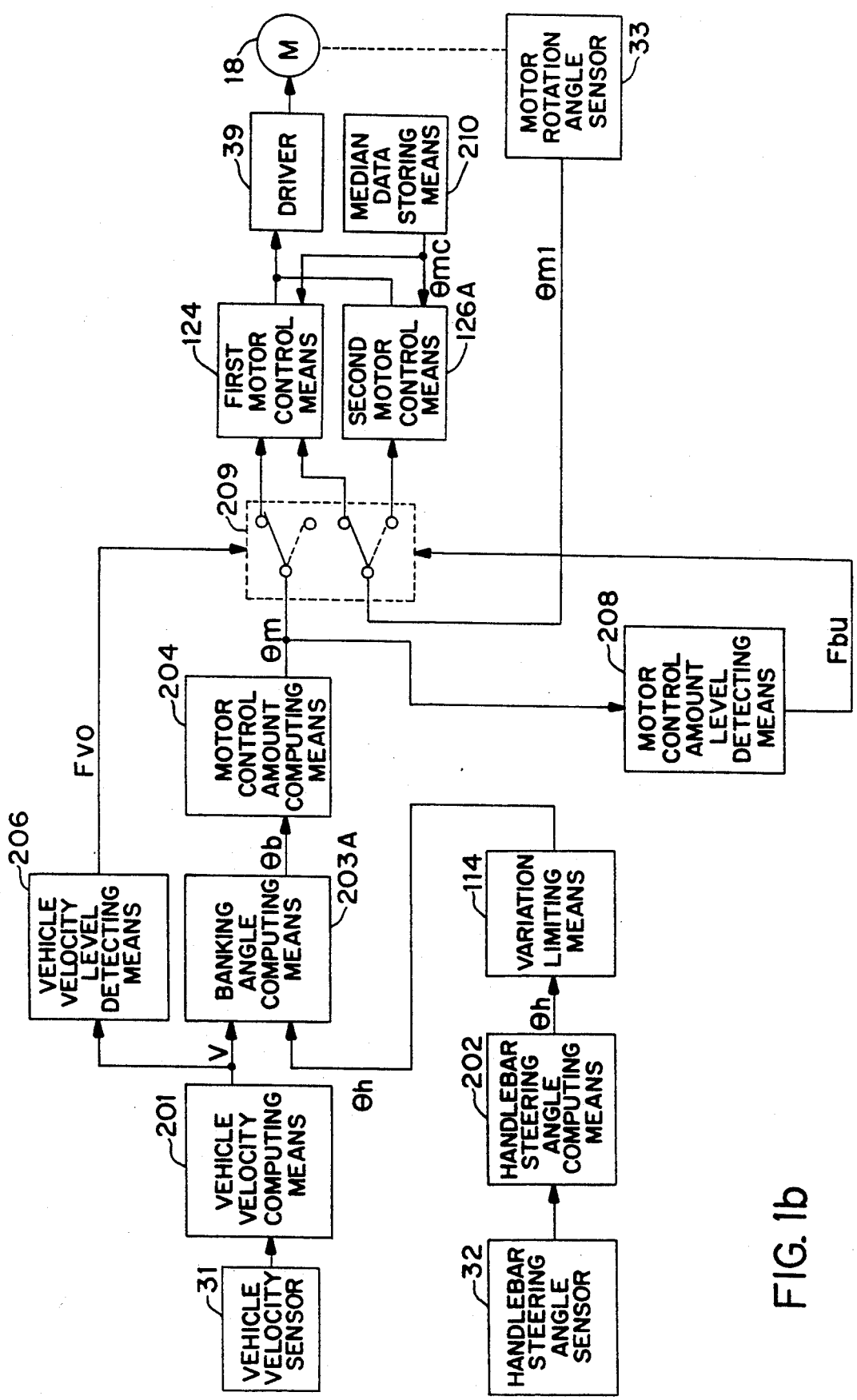
FIG. 1b is a functional block diagram of a modified form of the first embodiment of the present invention.

FIGS. 1a and 1b are functional block diagrams of the first embodiment of the present invention and of a modified form thereof. In FIGS. 1a and 1b as well as in FIGS. 17a and 17b, like reference characters designate like or corresponding parts.

In both FIGS. 1a and 1b, a vehicle velocity computing means 201 computes the traveling velocity V of the two-wheeled vehicle using the signal output by the vehicle velocity sensor 31. In the arrangement of FIG. 1a, the resulting data is output to a banking angle computing means 203A. As described, the vehicle velocity sensor 31 generates the pulses VP in accordance with the front wheel revolutions, i.e., every time a fixed distance is traveled.

The dynamic center value computing means 211 computes the dynamic center value that is output by the handlebar steering angle sensor 32 when the handlebar is in its central position. The computing is carried out using a method such as the one depicted in FIG. 10. The computed dynamic center value θ dcd is stored in the dynamic center value storing means 113 as θ dc.

The handlebar steering angle computing means 202A computes the handlebar steering angle (relative to the central position of the handlebar) with a signal output by the handlebar steering angle sensor 32 at regular intervals and with the dynamic center value θ dc read out of the dynamic center value storing mean 113. The result is output to the banking angle computing means 203A.

Using various input data, the banking angle computing means 203A computes the banking angle θ b of the two-wheeled vehicle. The computing is carried out by at least multiplying the handlebar steering angle θ h by the vehicle's velocity V.

A motor control amount computing means 204A computes the amount of motor control θ m (control angle of the motor relative to its central position) by multiplying the banking angle θ b by the third correction factor γ which is output by a γ storing means 212 or a γ correcting means 213. The γ storing means 212 contains the value ε as the third correction factor. The γ correcting means 213 computes the third correction factor using the equation (4) listed above.

The γ storing means 212 and the γ correcting means 213 are connected to the motor control amount computing means 204A via a switching means 214. As described with reference to FIG. 11 or 23, if the accuracy of the dynamic center value is judged to be high (i.e., if the condition of step S100 or S300 is met), the dynamic center value computing means 211 activates the switching means 214 to connect the γ storing means 212 to the motor control amount computing means 204. If the accuracy of the dynamic center value is not judged to be very high (i.e., if the condition of step S104 or S301 is met), the dynamic center value computing means 211 activates the switching means 214 to connect the γ correcting means 213 to the motor control amount computing means 204A. Where the γ correcting means 213 is selected, the dynamic center value computing means 211 activates the switching means 214 to connect the γ correcting means 213 to the motor control amount computing means 204A. Where the γ correcting means 211 supplies the γ correcting means 213 with the value Ldc or LDcmax) needed to perform equation (4).

A motor control means 205 computes the motor control angle θ m0 using the amount of motor control θ m output by the motor control amount computing means 204A. The motor control means 205 then supplies the driver 39 with a control signal using the computed control angle θ m0 and the actual motor rotation angle θ m1 output by the motor rotation angle sensor 33. In this manner, the servo motor 18 is held under feedback control.

A switching means 209A usually supplies the motor control means 205 with the output signal θ m from the motor control amount computing means 204A as well as with the output signal θ ml from the motor rotation angle sensor 33. But if the dynamic center value computing mean 211 has not computed a dynamic center value yet (i.e., if the condition of step S102 or S104 in FIG. 11 is not met, or if the condition of step S301 in FIG. 23 is not met), then the switching means 209A disconnects the motor control amount computing means 204A and motor rotation angle sensor 33 from the motor control means 205. In this case, the servo motor 18 is not controlled.

Thus, under the scheme where the servo motor 18 is made to return to its central position immediately after or before the combination switch is turned on, the shade keeps to its central position until the dynamic center value is computed.

As with the Fb generating means 131 of FIG. 17b, a power-on detecting means 131A checks whether the combination switch 49 is turned on. When power is on, the backup timer 133 is reset. At this point, if the switching circuit 46 has already been activated to connect the batter 44 directly to the constant voltage circuit 47, that switching circuit 46 is turned off and the direction connection is thereby discontinued.

As with the Fhr generating means 132 of FIG. 17b, a power-off detecting means 132A determines whether the combination switch 49 is turned off. In other words, this means 132A determines if the output signal from the power-on detecting means 131A is discontinued. When power is found to be off, the switching circuit 46 is activated to connect the battery 44 directly to the constant voltage circuit 47. At the same time, the backup timer 133 is turned on. The direct connection makes it possible to keep supplying power at least to the dynamic center value storing means 113. This allows the dynamic center value storing means 113 to retain the dynamic center value therein.

Upon elapse of a predetermined period of time, the backup timer 133 turns off the switching circuit 46 to disconnect the constant voltage circuit 47 from the battery 44.

While the first embodiment of FIG. 1a has been described above, a modified form of this embodiment will now be described with reference to FIG. 1b. In this figure, the vehicle velocity computing means 201 will determine the velocity V of the vehicle similarly to the arrangement of FIG. 1a. However, a vehicle velocity level detecting means 206 will than determined whether this velocity V exceeds 127.5 km/h. This speed is merely given as an example. It is needless to say that another velocity benchmark could be used. If the speed does not exceed this benchmark, the flag Fvo is output to switching means 209.

A handlebar steering angle computing means 202 computes the handlebar steering angle $\theta$ h (of the handlebar relative to its central position) using the signal output at regular intervals by the handlebar steering angle sensor 32. The resulting data is output to the variation limiting means 114.

As described with reference to FIG. 17a, the variation limiting means 114 compares the currently input handlebar steering angle with the previously computed handlebar steering angle. If the variation of the currently input handlebar steering angle is equal to or greater than a predetermined level, the current handlebar steering angle is modified so that its variation will remain below the predetermined level. The resulting handlebar steering angle data is output to the banking angle computing means 203A.

Using various data, the banking angle computing means 203A computes the banking angle $\theta$ b as done in the arrangement of FIG. 1a. In the modified form of FIG. 1b, the motor control amount computing means 204 computes an amount of motor control $\theta$ m (control angle of the motor relative to the central position thereof) by using the banking angle $\theta$ b.

If the computed amount $\theta$ m is equal to or lower than a predetermined angle (predetermined level), the motor control amount level detecting means 208 outputs the flag Fbu to the switching mean 209.

A median data storing means 210 stores the median data $\theta$ mc of the servo motor 18 in the modified form of FIG. 1b. As described with reference to FIG. 17, the first motor control means 124 computes the motor control angle $\theta$ m0 by adding the median data $\theta$ mc and the motor control amount $\theta$ m output by the motor control amount computing means 204. The first motor control means 124 then outputs a control signal to the driver 39 using the control angle $\theta$ m0 and the actual motor rotation angle $\theta$ m1 output by the motor rotation angle sensor 33. In this manner, the servo motor 18 is placed under feedback control.

A second motor control means 126A in FIG. 1b includes a means for accomplishing part of the function of the second motor control means 126 shown in FIG. 17b. Specifically, when activated, the second motor control means 126A receives the actual motor rotation angle $\theta$ m1 from the motor rotation angle sensor 33. In doing so, the second motor control means 126A gradually returns the servo motor 18 from the actual motor rotation angle $\theta$ m1 to its central position (motor median $\theta$ mc).

The switching means 209 usually supplies the first motor control means 124 with the output signal $\theta$ m of the motor control amount computing means 204 and the output signal $\theta$ m1 of the motor rotation angle sensor 33. If the flag Fvo or Fbu is input, the switching means 209 feeds the output signal $\theta$ m1 of the motor rotation angle sensor 33 to the second motor control means 126A and activates the latter. If the input of the flag Fvo or Fbu is terminated, the switching means 209 again connects the first motor control means 124 with the motor control amount computing means 204 and the motor rotation angle sensor 33.

In the above modified form of the first embodiment in FIG. 1b, control of the servo motor 18 is switched from the first motor control means 124 to the second motor control means 126A upon output of the flag Fvo or Fbu. Alternatively, control of the servo motor 18 by the first motor control means 124 may simply be stopped.

As described, the modified form of the first embodiment comprises the vehicle velocity level detecting means 206, the motor control amount level detecting means 208 and the variation limiting means 114 as shown in FIG. 1b. Alternatively, only one of these three means may be provided. If the vehicle velocity level detecting means 206 and the motor control amount level detecting means 208 are not provided, the second motor control means 126A and the switching means 209 naturally become unnecessary. In that case, the output signal lines of the motor control amount computing means 204 and motor rotation angle sensor 33 are directly connected to the first motor control means 124.

A description of how the present invention can be applied to a traction control apparatus for use with a two-wheeled motor vehicle will now be given. Referring to FIG. 24, a side view of a two-wheeled vehicle to which the second embodiment of the present invention is applied is shown. FIG. 25 shows a plan view of this two-wheeled vehicle.

In FIG. 24 and 25, an engine 1005 of the two-wheeled vehicle 1001 comprises a pair of pulsers for detecting engine revolutions, i.e., a first pulser 1002A and a second pulser 1002B. The first pulser 1002A generates a pulse signal PC1 every time the crank shaft of the Vehicle rotates a certain degree. The second pulser 1002B generates a pulse signal PC2 every time the crank shaft reaches a predetermined angle.

The front wheel (idle wheel) and the rear wheel (driving wheel) of the two-wheeled vehicle 1001 contain a front wheel velocity sensor 1003 and a rear wheel velocity sensor 1004, respectively. The sensors 1003 and 1004 each generate a pulse signal every time each of the front and rear wheels rotate a certain angle.

An ignition control ECU 1031 is located behind a meter panel 1020 (opposite to the side where various meters are provided). As will be described later, the ignition control ECU 1031 controls the ignition timing (ignition angle) of an ignition coil 1008 using output signals from the front and rear wheel velocity sensors 1003 and 1004. The ignition control ECU 1031 comprises an ignition control CPU and a traction control CUP. The ignition control CPU computes the standard ignition timing of the two-wheeled vehicle. The traction control CPU computes the vehicle's ignition timing for traction control over wheel slippage primarily upon acceleration.

The banking angle of the two-wheeled vehicle 1001 is computed using the output signal of the handlebar steering angle sensor 32. This computation can be controlled with the ignition control CPU.

An ALB ECU 1032 controls the braking action effected with a front caliper 1037 and a rear caliper 1038 if the two-wheeled vehicle's slip ratio or slip amount has exceeded a predetermined level during braking. Reference numerals 1033, 1034, 1035 and 1036 denote respectively a front modulator, a rear modulator, a front brake master cylinder and a rear master cylinder involved in the braking action.

A meter panel 1020 contains a speedometer 1021, a tachometer 1022, a fuel meter 1023, a water temperature gauge 1024, a left turn lamp 1025 and a right turn lamp 1026. Above the meter panel 1020 is an indicator panel 1010.

Figure 26:
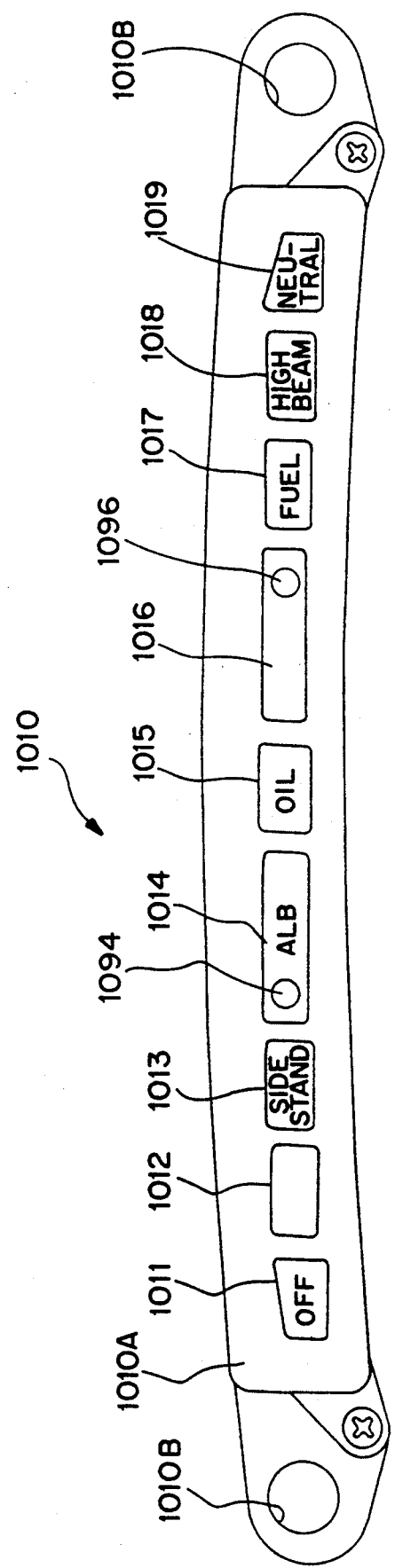

FIG. 26 is a detailed plan view of the indicator panel 1010. In FIG. 26, frame 1010A comprises various lamps including an OFF lamp 1011 indicating that traction control has been turned off when it is glowing. An ON lamp 1012 is provided for indicating that traction control is turned on and a side stand lamp 1013 is provided for indicating that the side stand is spread out. An ALB lamp 1014 and an ALB fail LED 1094 are provided to indicate that the brake control (ALB) system activated by the above-mentioned ALB ECU 1032 has failed. Oil lamp 1015 indicates that oil is being exhausted. Lamp 1016 and fail LED 1096 indicate that a traction control system, to be described later, has failed and fuel lamp 1017 indicates that fuel is being exhausted. A high beam lamp 1018 will indicate that the headlight distribution is in a high beam state and a neutral lamp 1019 will indicate that the engine transmission is in a neutral position. When turned on, the lamps 1011 through 1013 glow in orange; the lamps and LED's 1014 through 1017, 1094 and 1096, in red; the lamp 1018, in blue; and the lamp 1019, in green. Reference characters 1010B designate a hole with which the indicator panel 101 is secured.

Referring again to FIG. 24, reference numerals 1028 and 1029 are a horn and a warning buzzer, respectively. In FIG. 25, reference numerals 1027, 1041, 1042, 1043 and 1044 are a traction control system deactivating switch, a throttle grip, a switch case, an ignition key hole, and a handlebar cover, respectively.

Figure 27:
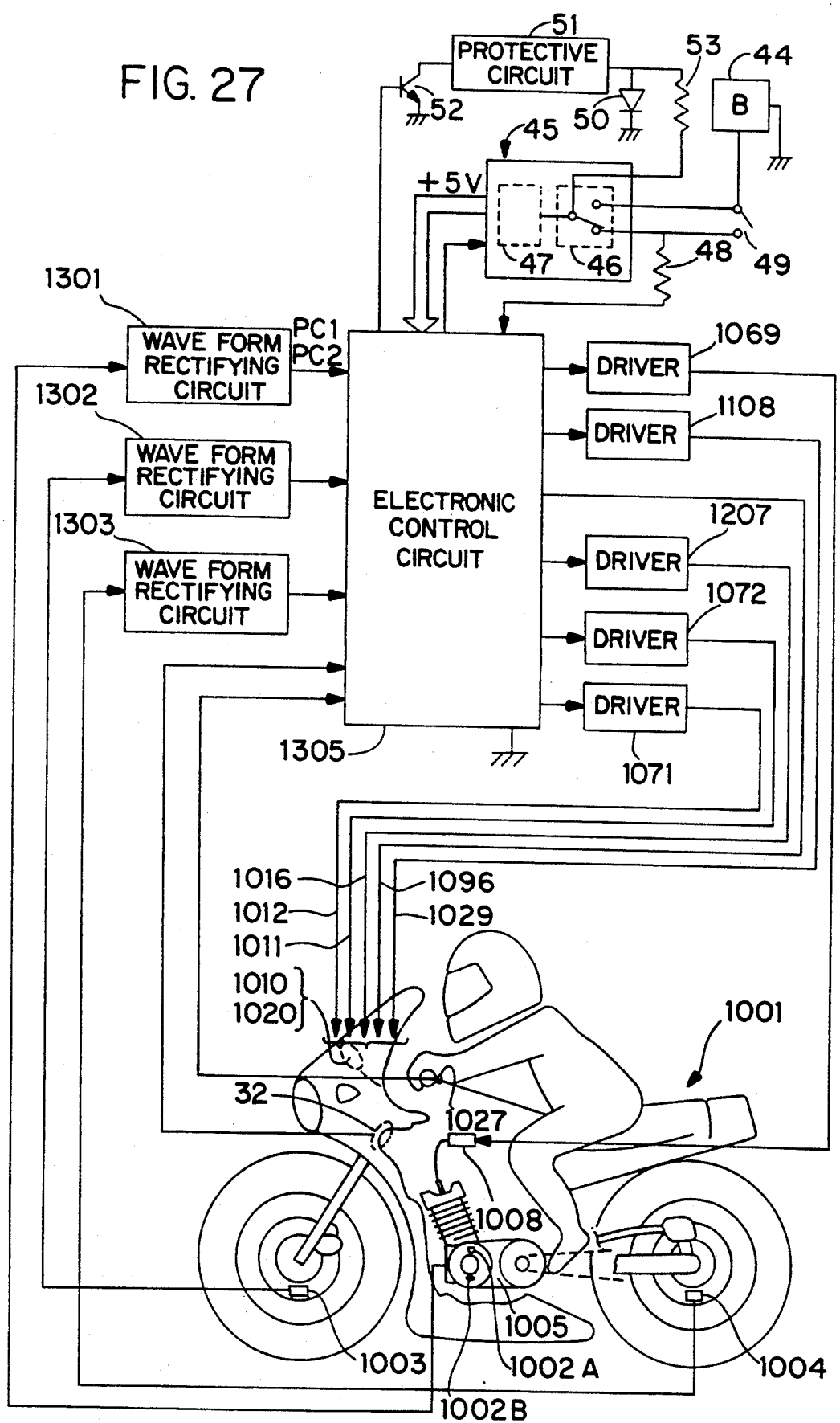
FIG. 27 is a block diagram of the second embodiment of the present invention.

FIG. 27 is a block diagram of the second embodiment of the present invention. In FIG. 27 as well as in FIGS. 24, 25 and 4, like reference characters designate like or corresponding parts, and any repetitive description thereof is omitted.

The signals output by the first pulser 1002A, second pulser 1002B, front wheel velocity sensor 1003 and rear wheel velocity sensor 1004 are sent through waveform rectifying circuits 1301 through 1303, respectively, to an electronic control circuit 1305. The front wheel velocity sensor 1003 corresponds to the vehicle velocity sensor 31 shown in FIG. 4.

The electronic control circuit 1305 contains a microcomputer. Using various input signals, the electronic control circuit 1305 with its microcomputer computes ignition timings $\theta$ ig ($S\theta$ ig(n) and $C\theta$ ig (n)) in a manner to be described later. One of the computed timings is output to a driver 1069 (ignition controller). In turn, the driver 1069 controls the ignition timing of the ignition coil 1008 in accordance with the slip state of the two-wheeled vehicle.

The deactivating switch 1027 determines whether or not to activate traction control in the second embodiment. This switch 1027 is connected to the electronic control circuit 1305. When traction control is effected with the second embodiment in accordance with the slip state, the electronic control circuit 1305 illuminates via a driver 1071 the ON lamp 1012 located on the indicator panel 1010.

The OFF lamp 1011 and the fail lamp 1016 on the indicator lamp 101 are connected via drivers 1072 and 1207 to the electronic control circuit 1305. The fail LED 1096 is directly connected to the electronic control circuit 1305. The Warning buzzer 1029 located inside the meter panel 1020 is connected Via a driver 1108 to the electronic control circuit 1305.

The electronic control circuit 1305 provides other controls as required on the two-wheeled motor vehicle 1001 such as fuel injection control, exhaust control, transmission gear ratio control for an automatic transmission, brake control upon deceleration, and headlight distribution control.

Figure 28B:
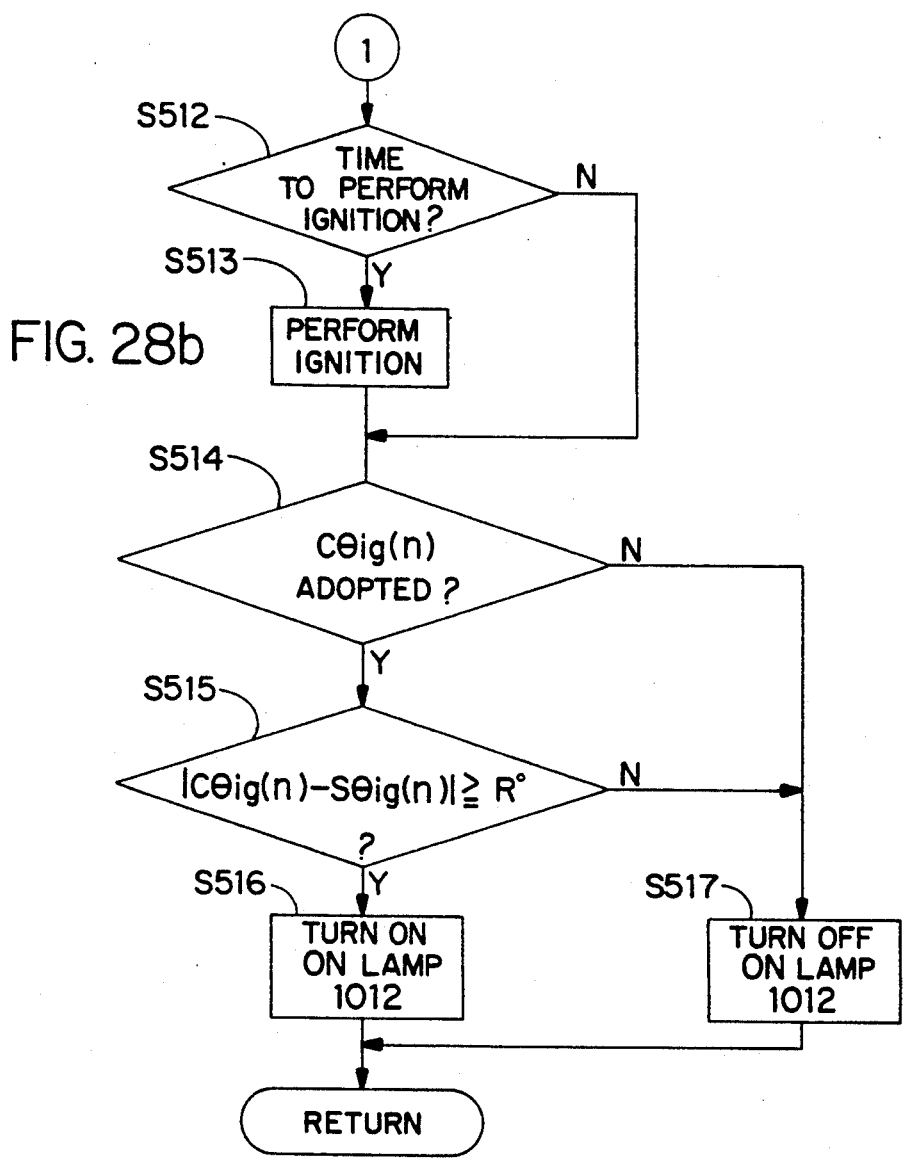

A description will now be given of how the second embodiment works in connection with the computations by the ignition control ECU 1031. In FIG. 28, the process shown is carried out at regular intervals. It is assumed that the detection of the dynamic center value $\theta$ dc shown in FIG. 10 and the computation of the handlebar steering angle $\theta$ h(n) in FIG. 7 are each performed at regular intervals as well. Although the handlebar steering angle $\theta$h(n) is limited if it variation is greater than is expected (as in steps S37 and S38 of FIG. 7), this limiting action may be omitted from the operation of the second embodiment.

In step S501 of FIG. 28, the value n is incremented by 1. Step S502 computes the front wheel revolutions HA (called the front wheel velocity) and the rear wheel revolutions HB (called the rear wheel velocity) with a known method using the signals from the front wheel velocity sensor 1003 and rear wheel velocity sensor 1004 (of FIG. 27).

In step S601, a check is made to see if the vehicle's velocity V (i.e., front wheel velocity HA) is equal to or greater than a predetermined value (velocity). If this condition is met, step S605 is reached. Step S605 sets a banking angle correction factor $K\theta$ to one. This factor $K\theta$ will be described later in connection with step S607. Step S605 is followed by step S503.

If the vehicle's velocity V is found to be below the predetermined value, step S602 detects the first correction factor $\alpha$, the second correction factor $\beta$ and the fourth correction factor $\delta$, as described in conjunction with steps S58 through S60 of FIG. 9. Step S603 will compute the banking angle $\theta$ b of the two-wheeled motor vehicle 1001 using equation (1) described earlier.

Figure 29:
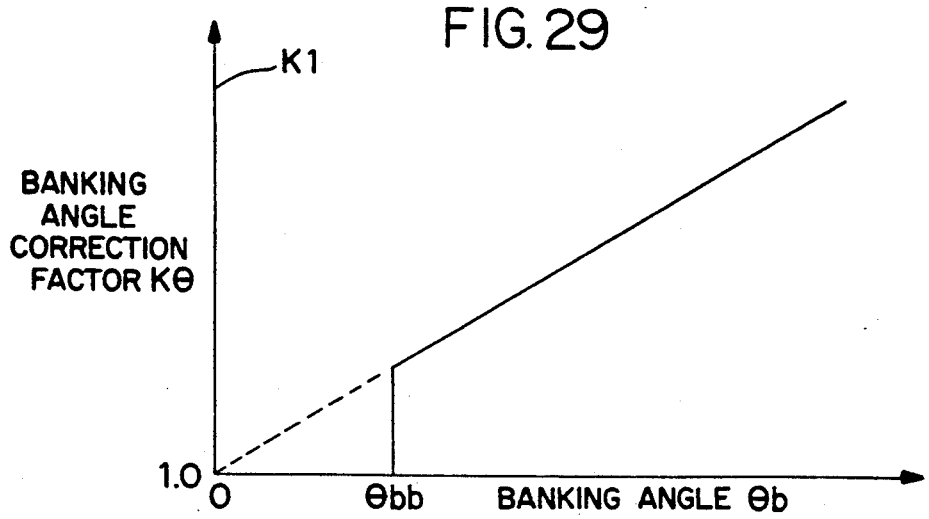
FIG. 29 is a table showing the contents of the banking angle correction factor $K\theta$.

Step S604 reads the banking angle correction factor $K\theta$ from the banking angle $\theta$ b using a table such as the one given in FIG. 29. This FIG. 29 shows the banking angle correction factor $K\theta$ is set to 1 if the banking angle $\theta$b is less than a very small value $\theta$ bb. If the banking angle $\theta$ b is equal to or greater than the value $\theta$ bb, the banking angle correction factor $K\theta$ is set according to the banking angle $\theta$ b. In FIG. 29, K1 indicates the largest allowable value of the banking angle correction factor $K\theta$.

Step S503 computes the actual slip ratio of the two-wheeled vehicle 1001 using the following equation:

$$Sb(n) = (HB - HA)/HB \quad (7)$$

As a result, the slip ratio Sb(n) is computed within the range of 0 to 1. Naturally, if the front wheel is a driving wheel and the rear wheel is an idle wheel, the values of HA and HB are to be switched.

Step S504 reads engine revolutions Ne. It is assumed that another process has already computed the engine revolutions NE with a known method using PC1 and PC2. Then step S505 computes the standard engine ignition timing (called the standard ignition timing) $S\theta$ ig(n) using a known method.

In step S506, a check is made to see if the engine is being controlled with the standard ignition timing or with the traction control ignition timing computed in step S509, to be described later. If the engine is found to be under control with the standard ignition timing, step S507 is reached. If the engine is found to be controlled with the traction control ignition timing, step S606 is reached.

Step S507 checks whether the current state requires control with the standard ignition timing to be continued or to be replaced by control with the traction control ignition timing. If the current state requires continuing control with the standard ignition timing, step S508 is reached. If the current state requires switching to control with the traction control ignition timing, step S606 is reached.

Figure 30:
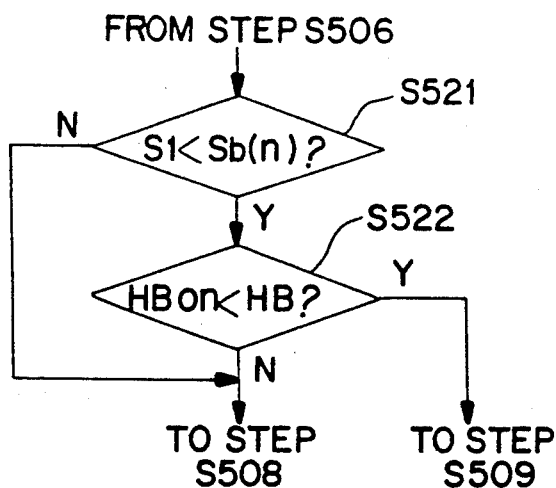
FIG. 30 is a flowchart depicting the details of step S507.

Referring now to FIG. 30, step S507 will now be described in more detail. In Step S521, the slip ratio Sb(n) is checked to determine if it is in excess of a predetermined first slip ratio Si (0.05 or any other value smaller than a target slip ratio S, to be described later). If the slip ratio Sb(n) is found to be equal to or below the first slip ratio S1, step S508 is reached. If the slip ratio Sb(n) is found to exceed the first slip ratio S1, step S522 is reached.

Step S522 checks whether the rear wheel velocity HB is in excess of a predetermined vehicle velocity HBon (e.g., 5 km/h). If the predetermined vehicle velocity HBon is found to be exceeded, step S509 is reached. If the velocity HBon is not exceeded, step S508 is reached.

Referring again to FIG. 28, step S508 adopts the standard ignition timing $S\theta$ ig(n) as the ignition timing $\theta$ ig(n). Step S508 is then followed by step S512. Step S606 checks to see if the banking angle correction factor $K\theta$ is 1. If the factor $K\theta$ is found to be 1, step S509 is reached. If the factor $K\theta$ is other than 1 (i.e., higher than 1), step S607 is reached.

Step S607 modifies or moderates the banking angle correction factor $K\theta$. This process is carried out in the steps shown in FIG. 31 or 32. In these FIGS. 31 and 32 as well as in FIGS. 11 and 23, like reference characters designate like or corresponding steps. In these Figures, if the dynamic center value is found to have a low level of accuracy, step S703 is reached in which a fifth correction factor $\gamma'$ is set to 0. If the dynamic center value is found to have a high level of accuracy, step S701 is reached in which the fifth correction factor $\gamma'$ is set to 1.

If it is judged that the accuracy of the dynamic center value is not very high but that the dynamic center value, when moderated, may be adequately used in computing the traction control ignition timing, then step S705 is reached. In step S705, the fifth correction factor $\gamma'$ is moderated according to the value Ldc and is set within the range of $$0 < \gamma' < 1$$

The computation of step S705 may also use the value Ldcmax instead of Ldc.

Thereafter, using the fifth correction factor $\gamma'$, step S706 modifies the banking angle correction factor $K\theta$. This modification is carried out using a map or graph such as the one shown in FIG. 41 which utilizes the unmodified $K\theta$ (i.e., as set in step S604) and the fifth correction factor $\gamma'$ as its parameters.

As described, the fifth correction factor is modified in accordance with the reliability of the dynamic center value within the range of 1 up to the value set in step S604. Thereafter, the entire process of FIG. 31 or 32 comes to an end.

Referring again to FIG. 28, step S509 computes the traction control ignition timing $C\theta$ ig(n). What takes place in step S509 is depicted in more detail in FIG. 33.

Figure 33:
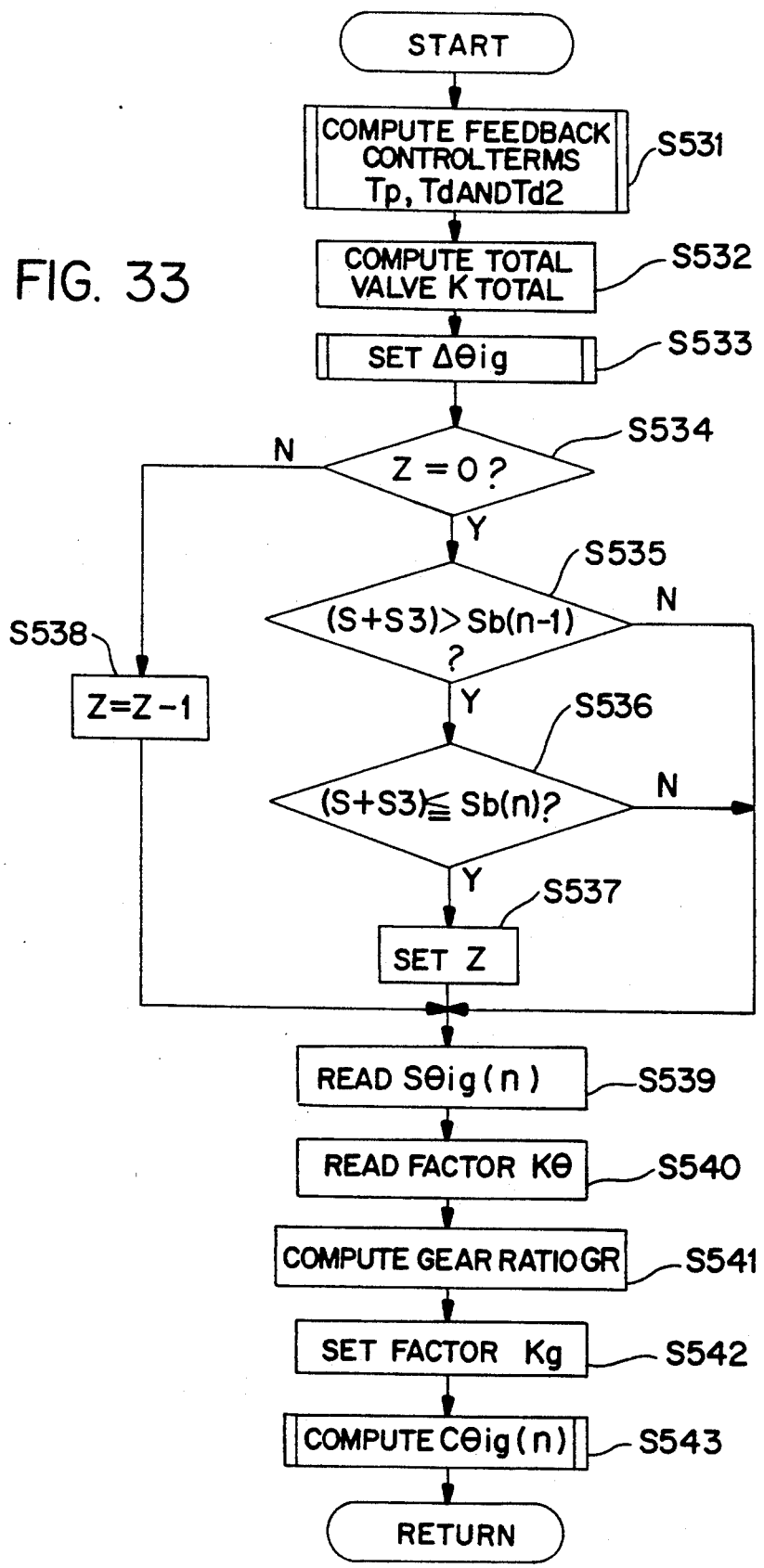
FIG. 33 is a flowchart showing the details of computing the traction control ignition timing $C\theta$ ig(n) in step S509.
Figure 42:
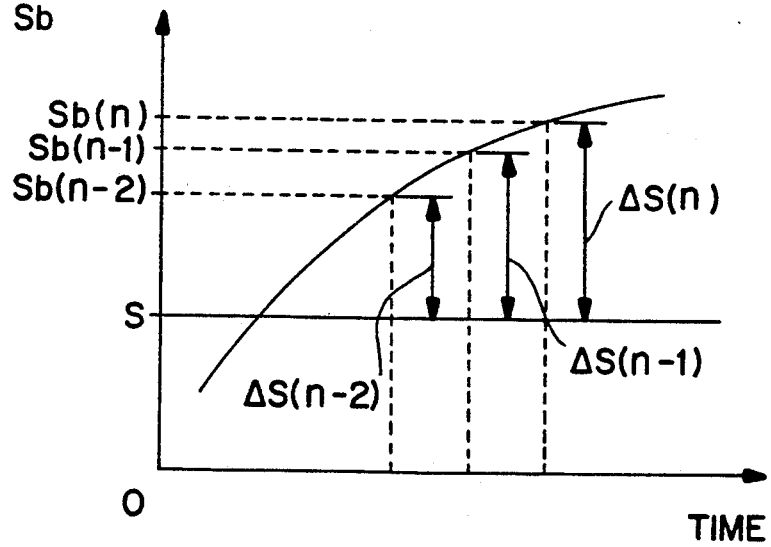
FIG. 42 is a view depicting the relationships among Sb(n), S and $\Delta$S(n)
Figure 43B:
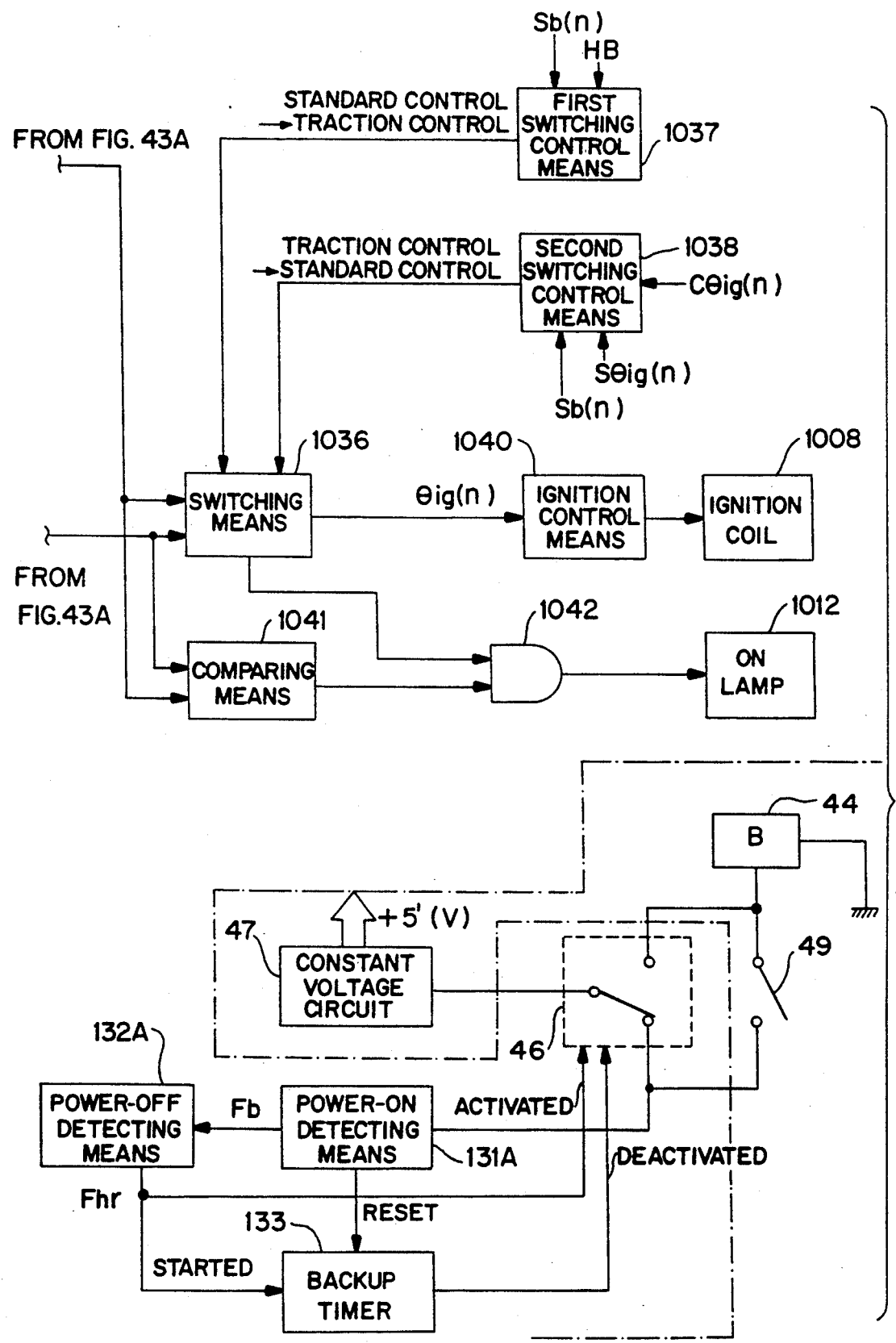

In FIG. 33, step S531 computes feedback control terms Tp, Td and Td2 using the following equations (8) through (10):

$$Tp = (Sb(n) - S) \times Gp \quad (8)$$
$$= \Delta S(n) \times Gp$$
$$Td = (\Delta S(n) - \Delta S(n - 1)) \times Gd \quad (9)$$
$$Td2 = \{(\Delta S(n) - \Delta S(n - 1)) - (\Delta S(n - 1) - \Delta S(n - 2))\} \times Gd2 \quad (10)$$

where, the feedback control terms Tp, Td and Td2 are terms applicable to PID control; S is the target slip ratio (e.g., 0.1); Gp, Gd and Gd2 are predetermined control gains; $\Delta S(n)$ is the difference obtained by subtracting S from Sb(n); $\Delta S(n-1)$ is the last computed value of $\Delta S(n)$. FIG. 42 illustrates the relationships among Sb(n), S and $\Delta S(n)$.

The terms (Sb(n) − S) for computing Tp represent the difference between the currently detected slip ratio and the target slip ratio; the terms $(\Delta S(n) - \Delta S(n-1))$ for computing Td denote the variation of the difference above; and the terms $\{(\Delta S(n) - \Delta S(n-1) - \Delta S(n-2))\}$ for computing Td2 stand for the variation in the above variation.

Step S532 computes the total value Ktotal of the control terms using the following equations (11):

$$Ktotal = Tp + Td + Td2 \quad (11)$$

Figure 34:
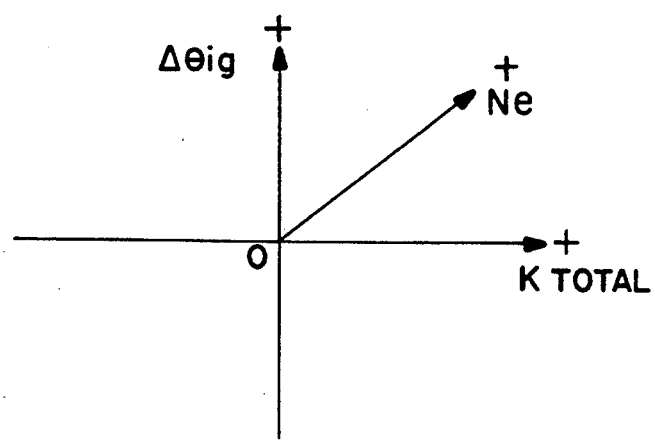
FIG. 34 is a graph depicting the contents of the basic correction value $\Delta\theta$ ig.
Figure 35:
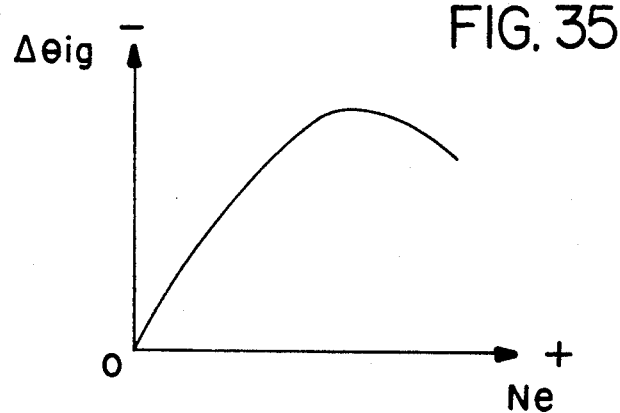
FIG. 35 is a view illustrating the relationship between $\Delta\theta$ ig and Ne.
Figure 36:
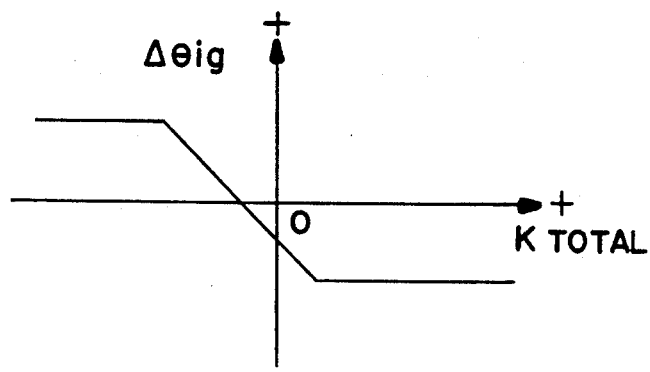
FIG. 36 is a view showing the relationship between $\Delta\theta$ ig and Ktotal.

Step S533 sets the basic correction value $\Delta \theta$ ig using Ktotal and the engine revolutions Ne that were read in step S504. As shown in FIG. 34, the basic correction value $\Delta \theta$ ig is read from a map that has Ktotal and Ne as its parameters. The value $\Delta \theta$ ig of this map is set beforehand for Ne in terms of the relationship of FIG. 35 and for Ktotal in terms of the relationship of FIG. 36. In FIGS. 34 through 36, the positive values of $\Delta \theta$ ig are advance angle data, and the negative values thereof are lag angle data.

In step S534, a check is made to see if a subtraction correction value Z, set in step S537 to be described later, is 0. Step S537 sets the subtraction correction value Z to a positive value.

If the value Z is found to be 0, step S535 is reached. Step S535 checks whether the last computed slip ratio Sb(n−1) is below the sum of the target slip ratio S and a predetermined third slip ratio S3 (shown in FIG. 37).

If this condition is not met, step S539 is reached. If this condition is met, step S536 is reached.

In step S356, a check is made to see if the currently computed slip ratio Sb(n) is equal to or greater than the sum of the target slip ratio S and the predetermined third slip ratio S3. If this condition is not met, step S539 is reached and if this condition is met, step S537 is reached.

Step S537 reads the subtraction correction value Z in accordance with the front wheel velocity HA (i.e., vehicle's velocity). Step S537 is followed by step S539. In step S539, the higher the vehicle's velocity, the greater the subtraction correction value Z established, as illustratively depicted in FIG. 38.

In the same slip state, the traction should preferably be inhibited sooner at high velocity than at low velocity. In the second embodiment described above, better traction control is provided by having the subtraction correction value Z set according to the vehicle's velocity. As will be described later, the value Z becomes the lag angle value for the traction control ignition timing.

If the value Z is found to be other than 0 in step S534, step S538 is reached. Step S538 subtracts a predetermined lag angle (e.g., 1) from the value Z. Step S538 is followed by step S539. Step S539 reads the standard ignition timing $S\theta$ ig(n) computed in step S505. Step S540 reads the banking angle correction factor $K\theta$ set in step S605 or S607.

Step S541 computes the gear ratio GR of the transmission of the two-wheeled vehicle using the following equation (12):

$$GR = (HB \times 1000)/(Ne \times 60) \quad (12)$$

Figure 39:
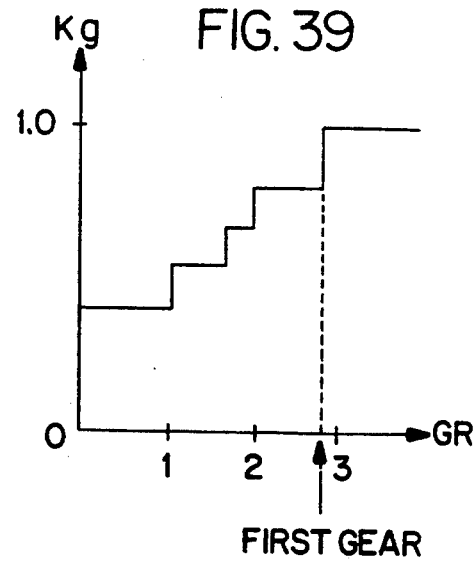
FIG. 39 is a table describing the contents of the gear ratio factor Kg.

Step S542 sets a gear ratio factor Kg according to the gear ratio GR. As illustrated in FIG. 39, the higher the gear ratio GR, the greater the gear ratio factor Kg. Thus, the magnitude of the correction to the value $\Delta\theta$ ig is greater at higher levels of engine torque than at lower engine torque levels, as will be described later in more detail.

Step S543 computes the traction control ignition timing $C\theta$ ig(n) using the following equation (13):

$$C\theta ig(n) = S\theta ig(n) + \{(\Delta\theta ig \times Kg \times K\theta) - Z\} \quad (13)$$

After the traction control ignition timing $c\theta$ ig(n) is computed in the above manner, the process of FIG. 33 terminates.

As evident from equation (13), the ignition timing $C\theta$ ig(n) is delayed considerably more immediately after the subtraction correction value Z is set than when the value Z is not set (i.e., Z=0).

As described, the value $C\theta$ ig(n) is principally determined by adding to the standard ignition timing $S\theta$ ig(n) the basic control amount $\Delta\theta$ ig (i.e., variation in ignition timing) according to the slip ratio Sb. This means that with the past state of vehicle travel reflected in the control process, better control is made available than if the absolute angle of the ignition timing is computed conventionally in accordance with the slip ratio Sb.

As previously described, the basic control amount $\Delta\theta$ ig is determined with $\Delta S(n)$, $\Delta S(n-1)$ and $\Delta S(n-2)$ which in turn were determined with previously computed slip ratios. This means that the past state of vehicle travel is reflected in the control process, whereby better control is made available.

As also previously described, computing the banking angle correction factor $K\theta$ set according to the banking angle means that the value $C\theta$ ig(n) is set according to the banking angle. This makes it possible to effect traction control upon entry into and exit from a cornering run. With the value $K\theta$ moderated depending on the reliability of the dynamic center value, better control is provided.

Referring again to FIG. 28, step S510 checks whether the current state requires control with the traction control ignition timing to be continued or to be replaced by control with the standard ignition timing. If the current state requires continuing control with the traction control ignition timing, step S511 is reached. If the current state requires switching to control with the standard ignition timing, step S508 is reached. What takes place in step S510 is depicted in more detail in FIG. 40.

Figure 37:
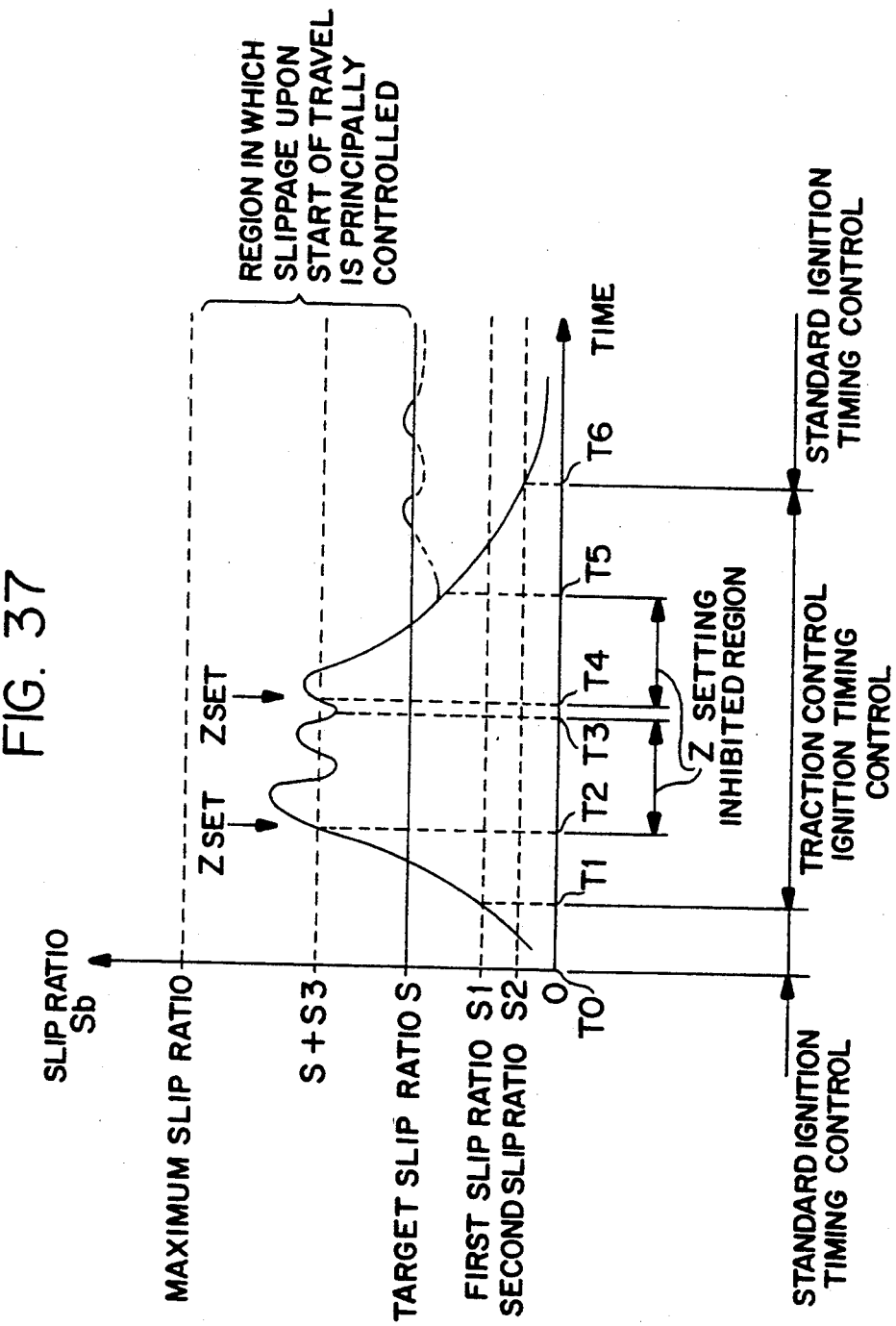
FIG. 37 is a timing chart depicting typical changes in slip ratio.
Figure 40:
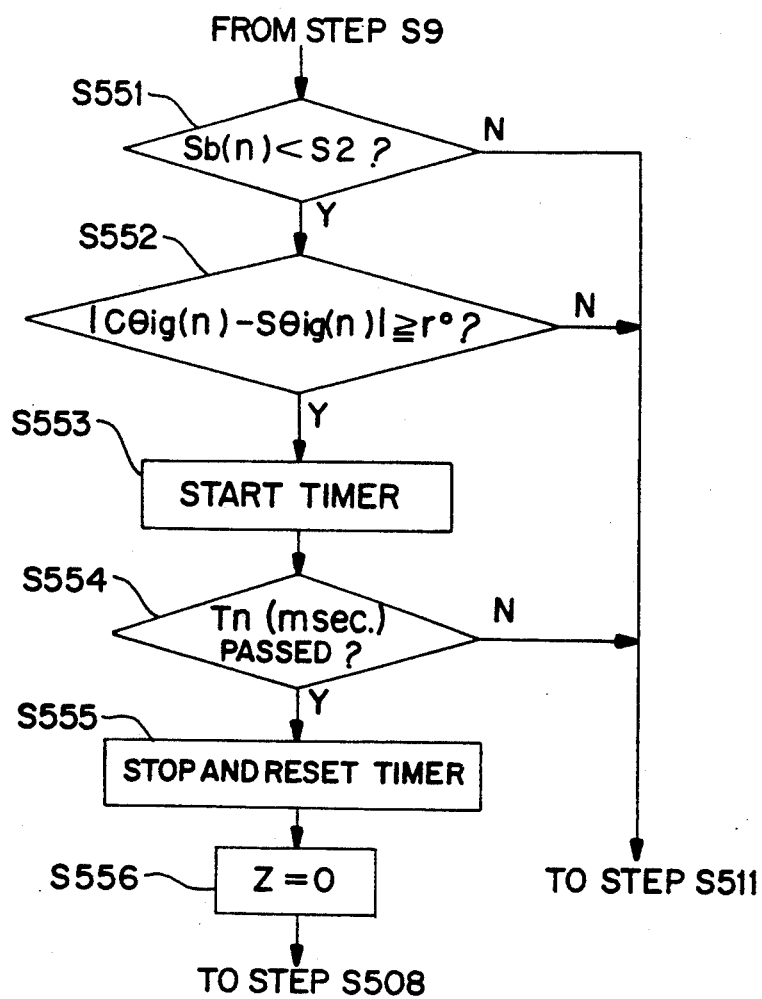
FIG. 40 is a flowchart illustrating the details of the process in step S510.

In this FIG. 40, step S551 checks whether Sb(n) is lower than a predetermined second slip ratio S2 (S2 < S1; see FIG. 37). If this condition is not met, step S511 is reached. If this condition is met, step S552 is reached.

Step S552 checks whether the absolute difference between $C\theta$ ig(n) and $S\theta$ ig(n) is equal to or greater than a predetermined angle r. If this condition is not met, step S511 is reached. If this condition is met, step S552 is reached. This step S553 starts a timer to measure the time.

Step S554 checks to see if a predetermined time Tn (msec.) has lapsed on the activated timer. If the timer Tn has not elapsed, step S511 is reached; but if the time Tn has elapsed, step S555 is reached. In this step S555, the timer is stopped and reset. The step S556 will then reset the value Z to 0. Step S556 is followed by step S508.

Referring again to FIG. 28, step S511 adopts the traction control ignition timing $C\theta$ ig(n) as the ignition timing $\theta$ ig(n). Step S511 is followed by step S512 where a check is made to see if it is time to perform ignition according to the determined ignition timing $\theta$ ig(n). If this condition is met, step S513 is reached in which ignition is effected, followed by step S514. If this condition is not met, step S514 is reached immediately.

Step S514 checks whether the traction control ignition timing $C\theta$ ig(n) is adopted as the ignition timing $\theta$ ig(n). If the traction control ignition timing $C\theta$ ig(n) is not adopted, step S517 is reached. Step S517 then turns off the ON lamp (of FIG. 26), and the process of FIG. 28 comes to an end.

If step S514 detects the adoption of the traction control ignition timing $C\theta$ ig(n), step 515 is reached. Step S515 checks whether the absolute difference between $C\theta$ ig(n) and $S\theta$ ig(n) is equal to or greater than a predetermined angle R. If the absolute difference is found to be less than the predetermined angle R, step S517 is reached. If the absolute difference is found to be equal to or greater than the angle R, step S516 is reached. Step S516 turns on the ON lamp 1012. The process of FIG. 28 then comes to an end.

How the above-described control scheme proceeds will now be described further with reference to FIG. 37. In this FIG. 37, a timing chart of changes in the slip ratio of the two-wheeled vehicle in the second embodiment of the present invention provides traction control. In FIG. 37, the y axis is the slip ratio Sb and the x axis is time.

Referring to FIG. 37, ignition timing control is started according to the standard ignition timing. It is assumed that the two-wheeled vehicle 1 starts traveling at a time T0. It is also assumed that the throttle valve is opened excessively, raising the slip ratio Sb abruptly.

When the slip ratio Sb exceeds the first slip ratio S1 and when the rear wheel velocity HB exceeds the predetermined vehicle velocity HBon (i.e., at T1 in FIG. 30), ignition timing control according to the traction control ignition timing $C\theta$ ig(n) computed in step S509 is introduced. The increase in the slip ratio Sb lowers the value of $C\theta$ ig(n) and thus delays the ignition timing involved.

If the slip ratio Sb keeps increasing even after the above discussed control phase, whereby the sum of the target slip ratio S and the third slip ratio S3 is exceeded (i.e., at T2), the subtraction correction value Z is subtracted from the computed $C\theta$ ig(n) according to the front wheel velocity HA. The value Z is gradually decreased to 0. While the value Z is above 0, the resetting of the value Z is inhibited (as shown in FIG. 33). Setting the value Z further delays the ignition timing and thus increases constraints on output.

After the Z value reaches 0 (at T3), the slip ratio Sb may again exceed the sum of the target slip ratio S and the third slip ratio S3 (at T4). In that case, the value Z is again set in accordance with the front wheel velocity HA.

Thereafter, if the two-wheeled vehicle meets various conditions given in FIG. 40 (at T6), ignition timing control based on the timing $C\theta$ ig(n) will be replaced with standard ignition timing control based on the timing $S\theta$ ig(n). If the excess opening of the throttle valve persists, the two-wheeled vehicle is controlled so that its slip ratio Sb will coincide with the target slip ratio S, as illustrated with a two-dot chain line in FIG. 37.

In FIGS. 43a, 43b, 44a and 44b, a functional block diagram of the second embodiment of the present invention and a modified form thereof is shown. In FIGS. 43a, 43b, 44a and 44b as well as in FIGS. 1 and 27, like reference characters designate like or corresponding parts.

In FIGS. 43a, 43b, 44a and 44b, an Ne detecting means 1021 detects engine revolutions Ne using the output signals PC1 and PC2 from the first pulser 1002A and the second pulser 1002B. A slip ratio computing means 1024 computes the slip ratio Sb(n) of the two-wheeled vehicle using the velocities HA and HB as well as the equation (7) described above.

A control term computing means 1025 computes the feedback control terms Tp, Td and Td2 using equations (8) through (10). A Ktotal computing means 1026 computes the total value Ktotal using equation (11).

Using the Ktotal and Ne thus computed, a $\Delta\theta$ ig setting means reads the basic correction value $\Delta\theta$ ig from a basic correction value table such as the one given in FIG. 34. The basic correction value $\Delta\theta$ ig is output to a traction control ignition timing computing means 1034.

A status determining means 1028 determines whether or not to set the value Z depending on the currently computed slip ratio Sb(n), on the last computed slip ratio Sb(n−1), and on whether the value Z is 0.

Figure 38:
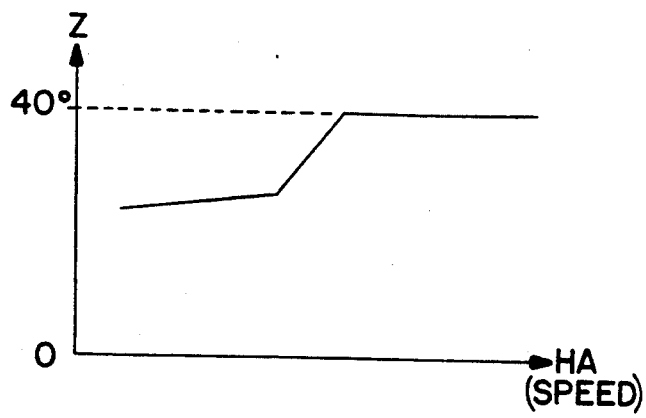
FIG. 38 is a table showing the contents of the subtraction correction value Z.

A Z setting means 1029 is activated with the status determining means 1028 to set the subtraction correction value Z according to the value HA. The setting is carried out, as shown in FIG. 38, by reading the data Z from the table in which values of Z corresponding to values of HA were previously stored.

A decrement control means 1030 decreases the value Z output by the Z setting means 029. This decreasing is performed at regular intervals (e.g., every time the computing means 1034 carries out its computing). The decreased value is output to the traction control ignition timing computing means 1034. This decrement control means 1030 inhibits the Z setting means 1029 from again setting the Value Z until Z reaches 0.

A GR computing means 1032 computes the gear ratio GR using the engine revolutions Ne, the rear wheel velocity HB and equation (12).

A Kg setting means 1033 sets the gear ratio factor Kg in accordance with the gear ratio GR. The setting is carried out, as depicted in FIG. 39, by reading the data of Kg from the table in which values of Kg corresponding to ratios of GR are stored. The factor Kg thus set is output to the above-described computing means 1034.

A standard ignition timing computing means 1035 computes the standard ignition timing $S\theta$ ig(n) from the engine revolutions Ne using a known method. The result is output to both the traction control ignition timing inputting means 1034 and the switching means 36. For the arrangement of FIG. 43a, as described in connection with FIG. 1a, the dynamic center value computing means 211 computes the dynamic center value $\theta$ dcd using the output signals from the handlebar steering angle sensor 32 and front wheel velocity sensor 1003 (i.e., vehicle velocity sensor 31). The result is stored in the dynamic center value storing means 113 as $\theta$ dc. The handlebar steering angle computing means 202 computes the handlebar steering angle $\theta$ h using the output signal from the handlebar steering angle sensor 32 and the dynamic center value $\theta$ dc.

The banking angle computing means 203A computes the banking angle $\theta$ b using the vehicle's velocity V and the handlebar steering angle $\theta$ h.

Equipped with the table of FIG. 29, a $K\theta$ setting means 501 sets the banking angle correction factor $K\theta$ according to the banking angle b. The banking angle correction factor $K\theta$ is output to a $K\theta$ correcting means 1502. Using the map from FIG. 41, the $K\theta$ correcting means 1502 corrects the value $K\theta$ using the input $K\theta$ and the fifth correction factor $\gamma'$ as the parameters. The result is output to the traction control ignition timing computing means 1034.

A $\gamma'$ storing means 212A stores 1 as the fifth correction factor $\gamma'$. A $\gamma'$ correcting means 213A corrects or sets the factor $\gamma'$ using the process of step S705 or S703 in FIG. 31 or 32. The $\gamma'$ storing means 212A and the $\gamma'$ correcting means 213A are connected to the $K\theta$ correcting means 1502 via the switching means 214.

Figure 31:
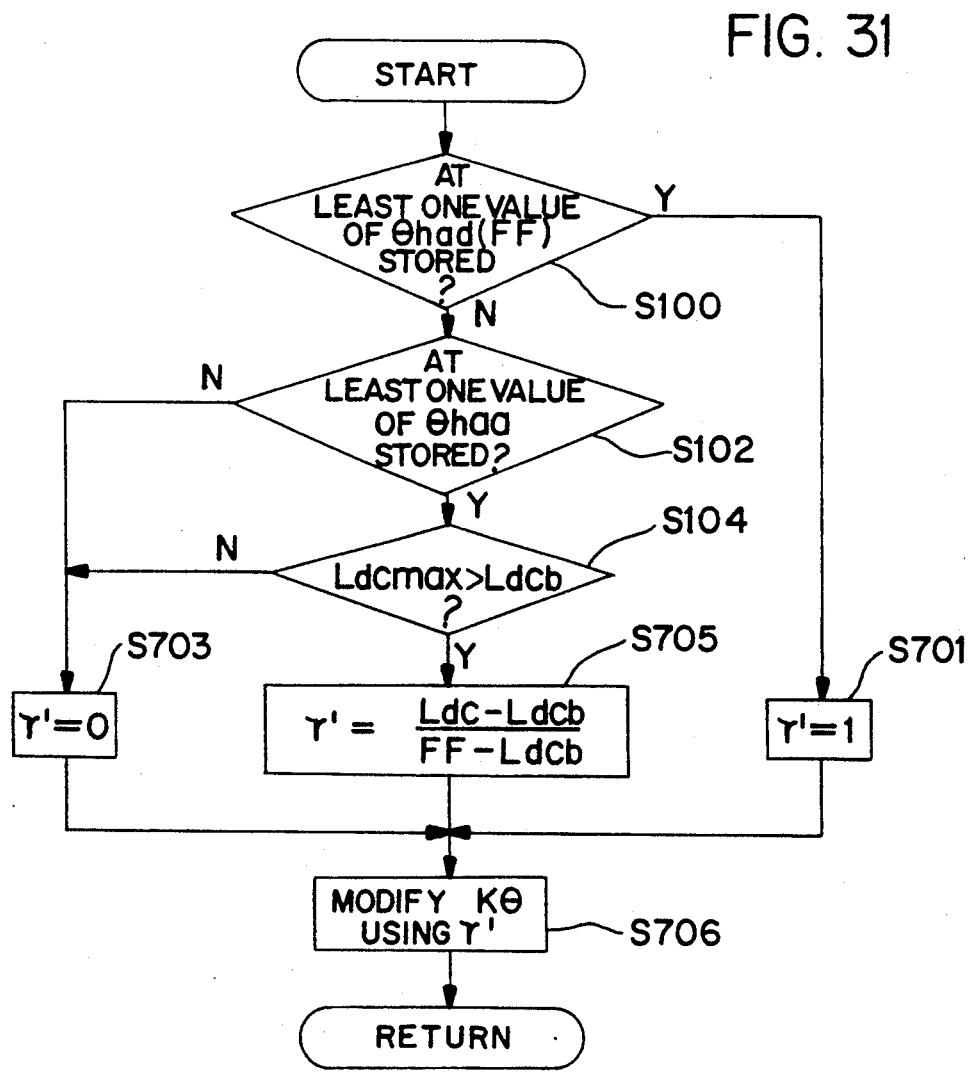
FIG. 31 is a flowchart of an alternative series of steps corresponding to step S607, the steps modifying the banking angle correction factor $K\theta$.
Figure 32:
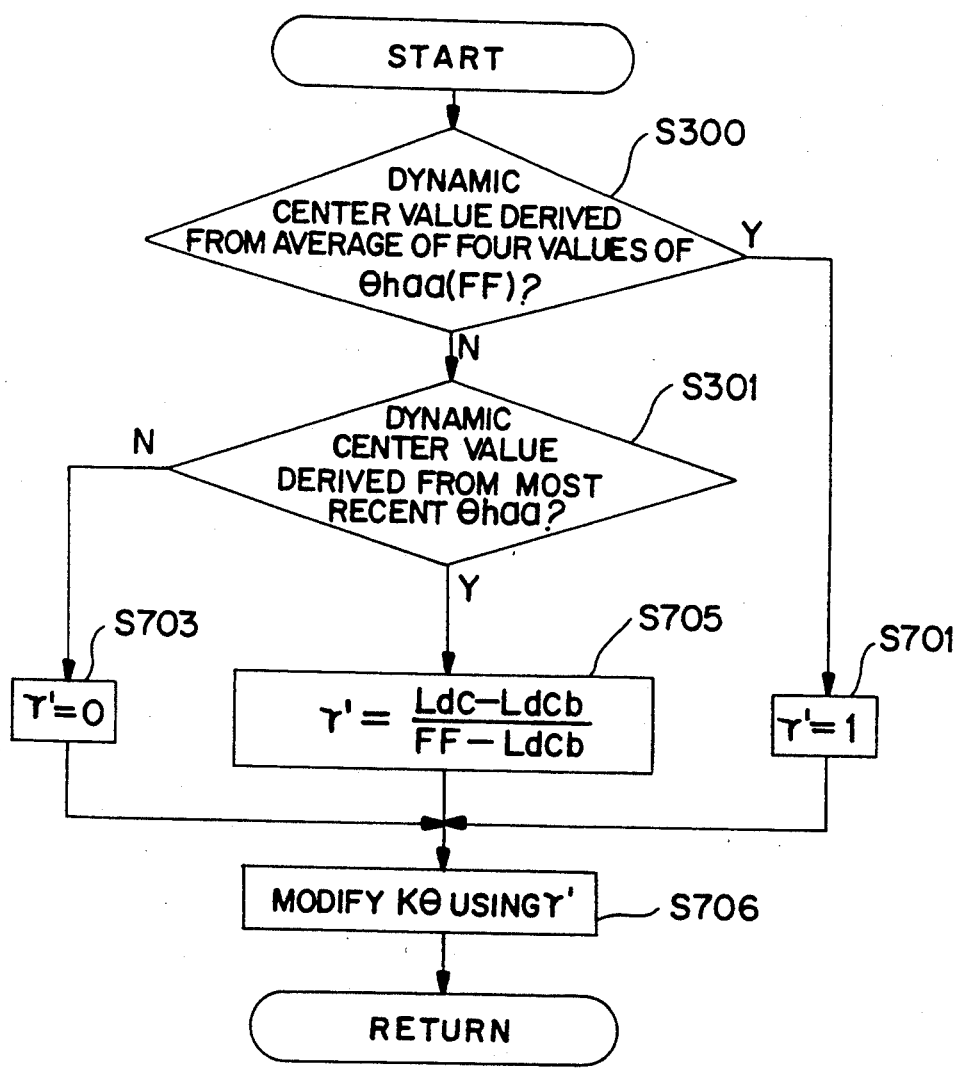
FIG. 32 is a flowchart of yet another alternative series of steps corresponding to step S607, the steps modifying the banking angle correction factor $K\theta$.

If the accuracy of the dynamic center value is judged to be high (i.e., if the condition of step S100 or S300 of FIG. 31 or 32 is met), the dynamic center value computing means 211 activates the switching means 214 to connect the $\gamma'$ storing means 212A to the $K\theta$ correcting means 1502. If the accuracy of the dynamic center value is not judged to be very high or judged to be low (i.e., if the condition of step S100 or S300 of FIG. 31 or 32 is not met), the dynamic center value computing means 211 activates the switching means 214 to connect the $\gamma'$ correcting means 213A to the $K\theta$ correcting means 1502.

When selected, the $\gamma'$ correcting means 213A executes step S705 or S703 in accordance with the accuracy information about the dynamic center value output by the dynamic center value computing means 211. Where step S705 is carried out, the dynamic center value computing means 211 outputs Ldc (or Ldcmax) to the $\gamma'$ 213A.

Figure 44A:
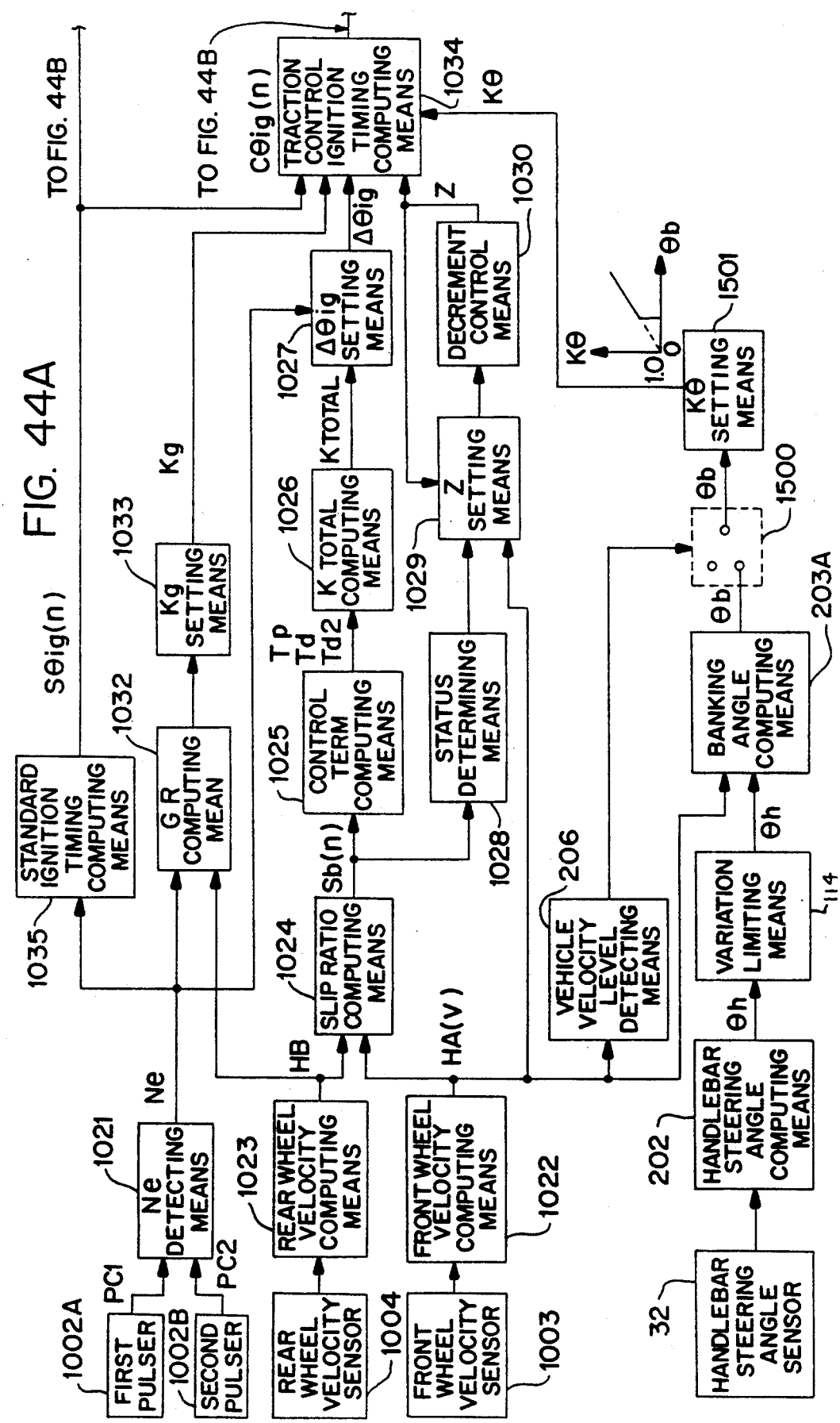
FIGS. 44a and 44b are a functional block diagram of a modified form of the second embodiment of the present invention.
Figure 44B:
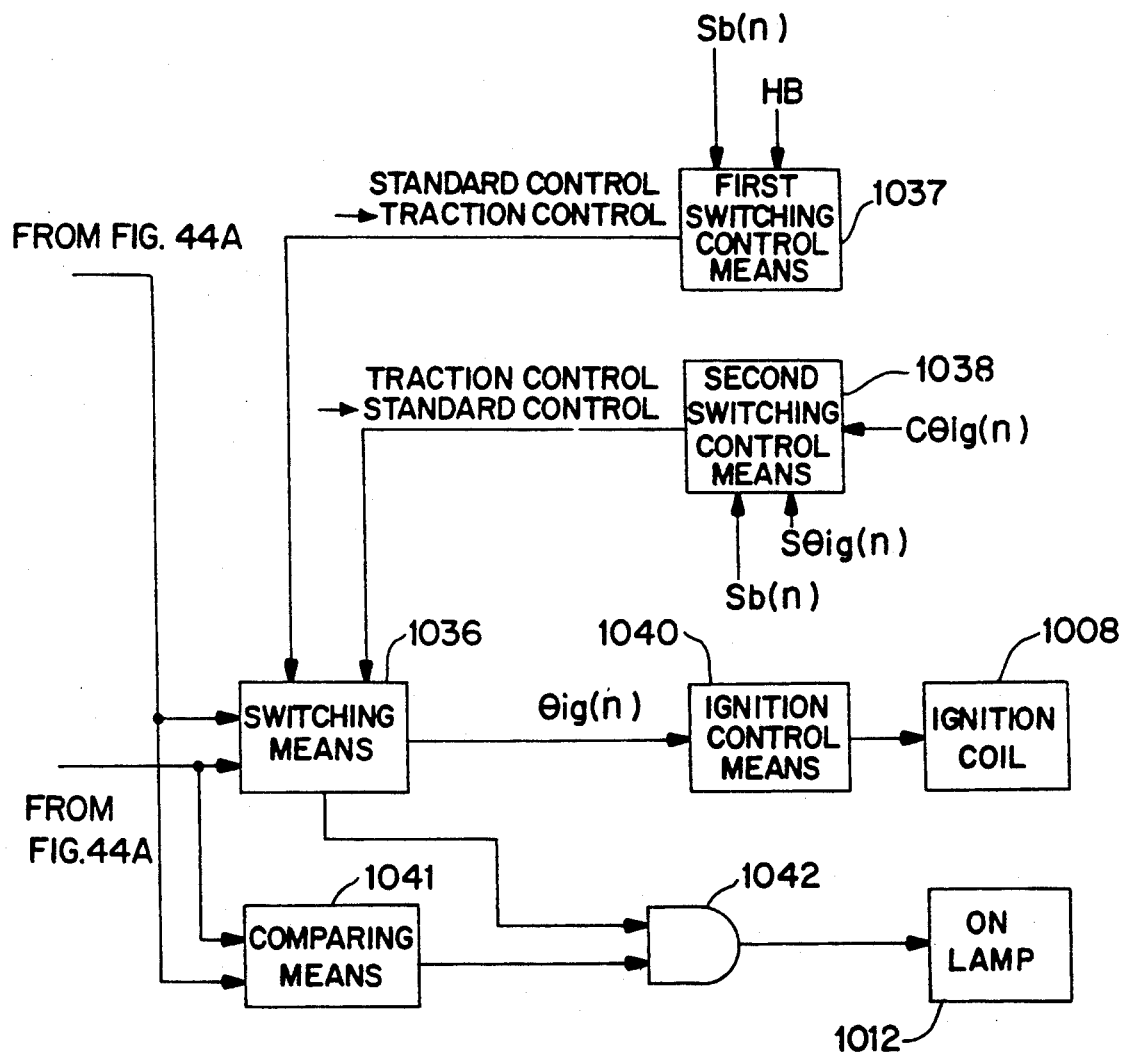

Referring to FIGS. 44a and 44b, the handlebar steering angle computing means of FIG. 1b will compute the handlebar steering angle $\theta$ h using the signal from the steering wheel sensor 32. The result is output to variation limiting means 114 in FIG. 1b. If the variation in the currently input handlebar steering angle is found to exceed a predetermined level, the variation limiting means 114 modifies the currently input handlebar steering angle so that the variation will become lower than the predetermined level.

In the modified form of the second embodiment shown in FIG. 44a, the variation limiting means 114 may be omitted. The handlebar steering angle data is output to the banking angle computing means 203A. The banking angle computing means 203A computes the banking angle $\theta$ b by using the handlebar steering angle $\theta$h and the vehicle's velocity (front wheel velocity). The banking angle $\theta$b is output to a K$\theta$ setting means 1501 through a switching means 1500. Using the table of FIG. 29, the K$\theta$ setting means 1501 computes the banking angle correction factor K$\theta$ in accordance with the banking angle $\theta$b. The result is output to the traction control ignition timing computing means 1034.

If the vehicle's velocity V is found to exceed a predetermined velocity level, the vehicle velocity level detecting means 206 activates the switching means 1500 to cut off the output of the bank angle $\theta$b from the banking angle computing means 203A to the K$\theta$ setting means 1501. This causes the K$\theta$ setting means to conclude that the input banking angle $\theta$b is 0.

In both forms of the second embodiment shown in FIGS. 43a, 43b, 44a and 44b, the traction control ignition timing computing means 1034 computes the traction control ignition timing C$\theta$ ig(n) using equation (13). The result is output to a switching means 1036.

The switching means 1036 usually outputs the timing S$\theta$ ig(n) to an ignition control means 1040. But upon receipt of a control signal from a first switching control means 1037, the switching means 1036 causes the timing C$\theta$ ig(n) to be output to the ignition control means 1040. If a second switching control means 1038 outputs a control signal in the above state, the switching means 1036 again causes the timing S$\theta$ ig(n) to be output to the ignition control means 1040.

According to the ignition timing that has been input, the ignition control means 1040 energizes the ignition coil 1008.

The first switching control means 1037 has the function depicted in FIG. 30. If the condition in step S522 of FIG. 30 is met, the first switching control means 1037 outputs its control signal to the switching means 1036.

The second switching control means 1038 has the function shown in FIG. 40. If the condition in step S554 of FIG. 40 is met, and the process of up to step S556 is completed, the second switching control means 1038 outputs its control signal to the switching means 1036. By this time, the value Z has been reset to 0.

A comparing means 1041 executes the process of step S515 in FIG. 28. If the condition in step S515 is met, the comparing means 1041 generates an output at the other input terminal of the AND gate 1042. Where the timing C$\theta$ig(n) is selected, the switching means 1036 generates an output at the other input terminal of the AND gate 1042. The ON lamp 1012 is then turned on when the AND gate 1042 yields its output.

As described in connection with FIG. 1a, when the power-on detecting means 131A detects the activated state of the combination switch 49, the backup timer 133 is reset, the switching circuit 46 is deactivated, and the direction connection of the battery 44 with the constant voltage circuit 47 is cut off. The power-off detecting means 132A detects the deactivated state of the combination switch 49 and activates the switching circuit 46. This connects the battery 44 directly to the constant voltage circuit 47 and turns on the backup timer 133. The direct connection keeps supplying power at least to the dynamic center value storing means 113. Upon the elapse of a predetermined period of time, the backup timer 133 deactivates the switching circuit 46 to disconnect the constant voltage circuit 47 from the battery 44.

In the description above, the subtraction correction value Z was determined according to the vehicle's velocity. Alternatively, the value Z may remain fixed regardless of the vehicle's velocity.

The gear ratio GR was shown to be computed from equation (12). Alternatively, if the two-wheeled vehicle has a manual transmission, the gear ratio GR may be set simply from the gear position of the transmission without recourse to the computation of equation (12). Furthermore, the values $\Delta \theta$ ig, Kg, Z and K$\theta$ may be set from tables other than those given in FIGS. 34 through 36, 39, 38 and 29. Such tables are determined according to the traveling characteristics and other factors relevant to the two-wheeled vehicle in question.

Figure 41:
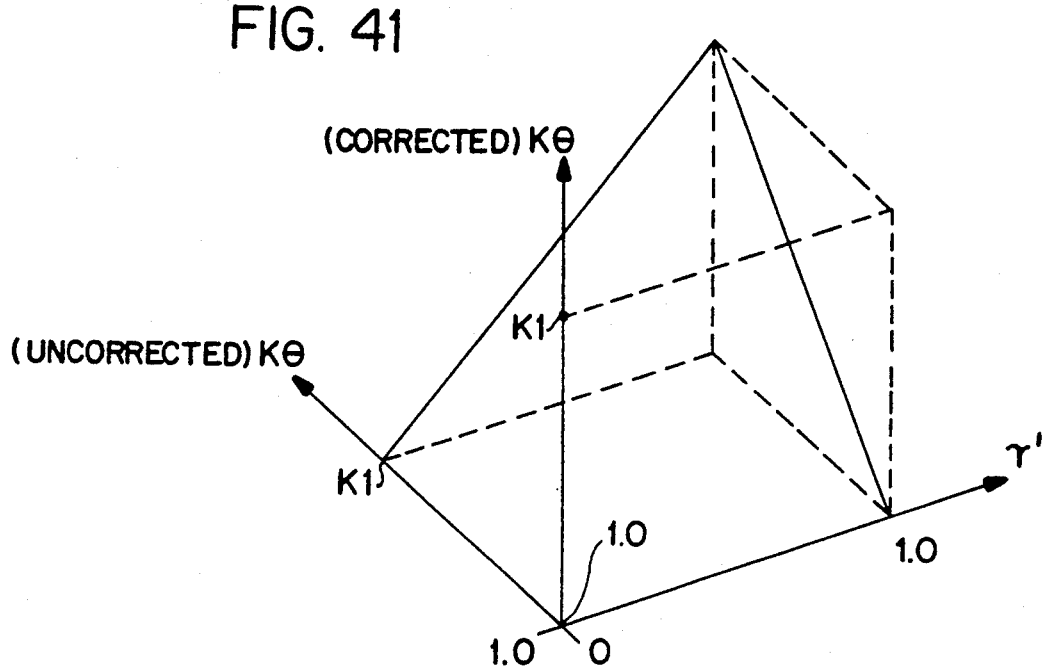
FIG. 41 is a graph having the fifth correction factor $\gamma'$ and the uncorrected $K\theta$ as its parameters, the fifth correction $\gamma'$ being used to correct the $K\theta$ that was set in step S604.

Also, the K$\theta$ correcting means 1502 may correct the value K$\theta$ not with the map of FIG. 41 but by use of some other appropriate method.

In the description above, traction control was effected through the lag angle of the ignition timing. Alternatively, traction control may be provided in the form of thinned-out ignition control, throttle valve opening control, or control over some other engine device.

In the above-described step S531 of FIG. 33, equations (8) through (10) were used to compute the feedback control terms Tp, Td and Td2, the results providing the total value Ktotal. Alternatively, the following equations (14) through (16) may be used to compute PID feedback control terms Tp, Ti and Td, and the results may be used to calculate the total value Ktotal:

$$Tp = (Vb(n) - VT(n)) \times Gp \quad (14)$$
$$= \Delta V(n) \times GP$$
$$Ti = (\Delta V(n) + \Delta V(n-1) + \Delta V(n-2) + \ldots + \Delta V(1)) \times Gi = dt\Sigma \Delta V(n) \times Gi \quad (15)$$
$$Td = (\Delta V(n-1) - \Delta V(n)) \times Gd \quad (16)$$

where, Gp, Gi and Gd are predetermined control gains; Vb(n) is the current actual slip amount obtained by subtracting the front wheel velocity from the rear wheel velocity; and VT(n) is the target slip amount. The difference between the current actual slip amount Vb(n) and the target slip amount VT(n) is $\Delta$ V(n). The total of values ranging from $\Delta$ V(n) computed at the first regular interruption (i.e., $\Delta$ V(1)) to $\Delta$ V(n) computed upon the current regular interruption is dt$\Sigma$ $\Delta$ V(n).

As has been described, the two-wheeled vehicle control apparatus according to the present invention stops or moderates various kinds of control such as headlight distribution control and banking angle-based traction control, or connects a backup power supply to an internal dynamic center value storing means, if the current type of control is predicted to suffer in accuracy depending on the vehicle's current status. This affords the vehicle's rider the kind of control that keeps him or her comfortable in all phases of traveling. Further, this two-wheeled vehicle control apparatus can use those parameters such as those for headlight distribution control and traction control if found to be excessive to moderate or stop such control. Thereby, the vehicle will not be excessively controlled.

The two-wheeled vehicle control apparatus has several advantages. This control can stop controlling the vehicle if no dynamic center value is computed immediately after the vehicle has started traveling. This feature allows the two-wheeled vehicle to be appropriately controlled.

Also, the two-wheeled vehicle control apparatus can moderate control of the vehicle if a short distance is traveled to ensure the computation of an accurate dynamic center value. This feature also allows the two-wheeled vehicle to be appropriately controlled.

Power in this two-wheeled vehicle control apparatus can be supplied for a predetermined period of time to at least the dynamic center value storing means if the combination switch is opened. If the rider puts the combination switch in its opened state to take a short break, the dynamic center value computed and stored so far is therefore retained throughout the break. This feature allows the two-wheeled vehicle to be appropriately controlled immediately after the rider resumes running the vehicle following the break.

This control apparatus can also step headlight distribution control and banking angle-based traction control during high velocity travel. These types of control are not needed while the vehicle is traveling at high velocity. Thus, the rider of the two-wheeled vehicle traveling at high velocity does not feel uncomfortable about excessive control of the vehicle. With the unnecessary types of control inhibited, other types of control (e.g., ignition timing control, fuel injection control) may be executed on short notice. Another benefit of inhibiting unnecessary types of control is that the two-wheeled vehicle control apparatus does not dissipate unnecessary power.

The two-wheeled vehicle control apparatus also stops controlling the vehicle in view of vehicle velocity or handlebar steering angle if the amount of vehicle control to be set with any of these parameters is less than a predetermined level. For example, if the two-wheeled vehicle is traveling on a bumpy road and the rider is manipulating the handlebar in a marginal or minute manner, the control status of the vehicle remains unchanged. Excessive control and rider discomfort are therefore avoided.

Finally, the two-wheeled vehicle control apparatus of the present invention will modify the handlebar steering angle if an amount of change in the angle exceeds a predetermined level. Accordingly, angle change will not exceed this predetermined level and controls based on handlebar steering angle data and vehicle velocity can better be controlled. Such controls include headlight distribution control and traction control. Excessive changes in handlebar steering angle is avoided such as when the two-wheeled vehicle is traveling on a bumpy road, making a quick lane change or abruptly turning the handlebar to correct further banking angle during a cornering run. Again, rider comfort is improved because the vehicle is not excessively controlled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A two-wheeled vehicle control apparatus for a two-wheeled vehicle having a handlebar, the two-wheeled vehicle being movable in a traveling state and then having a velocity, the control apparatus comprising:
    vehicle velocity computing means for computing the velocity of the two-wheeled vehicle;
    a handlebar steering angle sensor mounted on the handlebar of said two-wheeled vehicle;
    dynamic center value computing means for computing a dynamic center value for the handlebar, the dynamic center value having a signal output by said handlebar steering angle sensor when said handlebar is in a central position, said computing means computing the dynamic center value in response to the traveling state of the two-wheeled vehicle;
    handlebar steering angle computing means for computing steering angle of the handlebar using the signal output by the handlebar steering angle sensor and the dynamic center value;
    vehicle control means for controlling the two-wheeled vehicle in accordance with the velocity and handlebar steering angle of the two-wheeled vehicle; and
    control stopping means for stopping control by the vehicle control means over the two-wheeled vehicle until the dynamic center value computing means computes the dynamic center value.

2. A two-wheeled vehicle control apparatus for a two-wheeled vehicle having a handlebar, the two-wheeled vehicle being movable in a traveling state and then having a velocity, the control apparatus comprising:
    vehicle velocity computing means for computing the velocity of the two-wheeled vehicle;
    a handlebar steering angle sensor mounted on the handlebar of said two-wheeled vehicle;
    dynamic center value computing means for computing a dynamic center value for the handlebar, the dynamic center value being a signal output by said handlebar steering angle sensor when the handlebar is in a central position, said computing means computing the dynamic center value in response to the traveling state of the two-wheeled vehicle;
    handlebar steering angle computing means for computing the steering angle of the handlebar using the signal output by the handlebar steering angle sensor and the dynamic center value;
    vehicle control means for controlling said two-wheeled vehicle in accordance with the velocity and handlebar steering angle of the two-wheeled vehicle; and
    control moderating mean for moderating the control by said vehicle control means over the two-wheeled vehicle when the dynamic center value computed by the dynamic center value computing means is judged to have a low level of reliability.

3. A two-wheeled vehicle control apparatus for a two-wheeled vehicle having a handlebar, the two-wheeled vehicle being movable in a traveling state and then having a velocity, the control apparatus comprising:

vehicle velocity computing means for computing the velocity of the two-wheeled vehicle;

a handlebar steering angle sensor mounted on the handlebar of said two-wheeled vehicle;

dynamic center value computing means for computing a dynamic center value for the handlebar, the dynamic center value being a signal output by said handlebar steering angle sensor when the handlebar is in a central position, said computing means computing the dynamic center value in response to the traveling state of the two-wheeled vehicle;

dynamic center value storing means for storing said dynamic center value;

handlebar steering angle computing means for computing the steering angle of the handlebar using the signal output by the handlebar steering angle sensor and said dynamic center value stored in said dynamic center value storing means;

vehicle control means for controlling said two-wheeled vehicle in accordance with the velocity and handlebar steering angle of the two-wheeled vehicle;

power-off detecting means for detecting an open state of a combination switch of the two-wheeled vehicle; and power backup means for supplying power to at least said dynamic center value means for a predetermined period of time while the combination switch is in the open state.

4. A two-wheeled vehicle control apparatus for a two-wheeled vehicle having a handlebar, the vehicle being movable and then having a velocity, the control apparatus comprising:

handlebar steering angle computing means for computing the steering angle of the handlebar of the two-wheeled vehicle;

vehicle control means for controlling said two-wheeled vehicle in accordance with the velocity of the vehicle and with the handlebar steering angle;

vehicle velocity level detecting means for determining whether the vehicle velocity exceeds a predetermined velocity level; and control stopping means for stopping control of the vehicle by the vehicle control means when the vehicle velocity level detecting means determines the vehicle velocity exceeds the predetermined velocity level.

5. A two-wheeled vehicle control apparatus for a two-wheeled vehicle having a handlebar, the vehicle being movable and then having a velocity, the control apparatus comprising:

handlebar steering angle computing means for computing the steering angle of the handlebar of the two-wheeled vehicle;

vehicle control means for controlling said two-wheeled vehicle in accordance with the velocity of the vehicle and with the handlebar steering angle;

control amount level detecting means for determining whether an amount of control output by the vehicle control means is one of equal to and lower than a predetermined level; and control stopping means for stopping control operations on said vehicle by the vehicle control means if the amount of control is determined to be lower than said predetermined level.

6. A two-wheeled vehicle control apparatus for a two-wheeled vehicle having a handlebar, the vehicle being movable and then having a velocity, the control apparatus comprising:

vehicle velocity computing means for computing the velocity of the two-wheeled vehicle;

handlebar steering angle computing means for computing the steering angle of the handlebar of the two-wheeled vehicle;

vehicle control means for controlling the two-wheeled vehicle in accordance with the velocity of said vehicle and with the handlebar steering angle; and variation limiting means for computing variation in the computed handlebar steering angle and, if the variation is one of equal to and greater than a predetermined level, the variation limiting means modifies the handlebar steering angle whereby the variation attains the predetermined level.

* * * * *